US011873740B2

(12) United States Patent
Buscheck et al.

(10) Patent No.: US 11,873,740 B2
(45) Date of Patent: Jan. 16, 2024

(54) MULTI-FLUID, EARTH BATTERY ENERGY SYSTEMS AND METHODS

(71) Applicant: Lawrence Livermore National Security, LLC, Livermore, CA (US)

(72) Inventors: Thomas A. Buscheck, Pleasanton, CA (US); Ravindra Shrikrishna Upadhye, Pleasanton, CA (US)

(73) Assignee: Lawrence Livermore National Security, LLC, Livermore, CA (US)

( * ) Notice: Subject to any disclaimer, the term of this patent is extended or adjusted under 35 U.S.C. 154(b) by 124 days.

(21) Appl. No.: 17/397,515

(22) Filed: Aug. 9, 2021

(65) Prior Publication Data

US 2021/0372668 A1 Dec. 2, 2021

Related U.S. Application Data

(63) Continuation-in-part of application No. PCT/US2020/064495, filed on Dec. 11, 2020, and a
(Continued)

(51) Int. Cl.
*F01K 25/10* (2006.01)
*F24T 10/20* (2018.01)
(Continued)

(52) U.S. Cl.
CPC ............ *F01K 25/103* (2013.01); *F01K 27/00* (2013.01); *F03G 7/04* (2013.01); *F03G 7/06* (2013.01);
(Continued)

(58) Field of Classification Search
CPC .......... F01K 25/103; F01K 7/32; F01K 23/10; F02C 1/10; Y02E 10/46; Y02E 20/16; Y02E 60/14
See application file for complete search history.

(56) References Cited

U.S. PATENT DOCUMENTS

| 4,357,802 A | 11/1982 | Wahl, III et al. |
| 6,244,341 B1 | 6/2001 | Miller |

(Continued)

FOREIGN PATENT DOCUMENTS

| EP | 1930587 A2 * | 6/2008 | ................ F02C 1/05 |
| EP | 2703607 A1 | 3/2014 | |

(Continued)

OTHER PUBLICATIONS

Kundtz, N., and Smith, D. R. "Extreme-angle Broadband Metamaterial Lens." Nature Materials, vol. 9, No. 2, 2010, pp. 129-132.
(Continued)

*Primary Examiner* — Wesley G Harris
(74) *Attorney, Agent, or Firm* — HARNESS, DICKEY & PIERCE, P.L.C.

(57) ABSTRACT

The present disclosure relates to a system for storing and time shifting at least one of excess electrical power from an electrical power grid, excess electrical power from the power plant itself, or heat from a heat generating source, in the form of pressure and heat, for future use in assisting with a production of electricity. An oxy-combustion furnace is powered by a combustible fuel source, plus excess electricity, during a charge operation to heat a reservoir system containing a quantity of a thermal storage medium. During a discharge operation, a discharge subsystem has a heat exchanger which receives heated $CO_2$ from the reservoir system and uses this to heat a quantity of high-pressure, supercritical $CO_2$ ($sCO_2$) to form very-high-temperature, high-pressure $sCO_2$ at a first output thereof. The very-high-temperature, high-pressure $sCO_2$ is used to drive a Brayton-cycle turbine, which generates electricity at a first output thereof for transmission to a power grid. The Brayton-cycle turbine also outputs a quantity of $sCO_2$ which is reduced in temperature and pressure to a heat recuperator subsystem.
(Continued)

The heat recuperator subsystem circulates the $sCO_2$ and re-heats and re-pressurizes the $sCO_2$ before feeding it back to the heat exchanger to be even further reheated, and then output to the Brayton-cycle turbine as a new quantity of very-high-temperature, high-pressure $sCO_2$, to assist in powering the Brayton-cycle turbine.

21 Claims, 22 Drawing Sheets

Related U.S. Application Data continuation-in-part of application No. 16/711,288, filed on Dec. 11, 2019, now Pat. No. 11,137,169, which is a continuation-in-part of application No. PCT/US2019/022416, filed on Mar. 15, 2019.

(60) Provisional application No. 63/114,279, filed on Nov. 16, 2020, provisional application No. 62/644,064, filed on Mar. 16, 2018.

(51) Int. Cl.
  *F03G 7/04* (2006.01)
  *F03G 7/06* (2006.01)
  *F28D 20/00* (2006.01)
  *H01M 6/34* (2006.01)
  *F01K 27/00* (2006.01)

(52) U.S. Cl.
  CPC .............. *F24T 10/20* (2018.05); *F28D 20/00* (2013.01); *F28D 20/0052* (2013.01); *H01M 6/34* (2013.01); *Y02E 20/16* (2013.01); *Y02E 60/14* (2013.01)

(56) References Cited

U.S. PATENT DOCUMENTS

| | | |
|---|---|---|
| 6,389,995 B1 | 5/2002 | Adams et al. |
| 9,181,930 B2 | 11/2015 | Klemencic |
| 2008/0134681 A1 | 6/2008 | Nayef et al. |
| 2008/0275278 A1 | 11/2008 | Clark |
| 2010/0071366 A1 | 3/2010 | Klemencic |
| 2012/0222415 A1 | 9/2012 | Glynn et al. |
| 2013/0056171 A1 | 3/2013 | Klemencic |
| 2014/0130498 A1* | 5/2014 | Randolph ............... F03G 4/026 166/267 |
| 2014/0238672 A1 | 8/2014 | Buscheck |
| 2016/0146061 A1* | 5/2016 | Kalra ...................... F28D 20/00 60/671 |
| 2016/0177697 A1 | 6/2016 | Looijer et al. |
| 2017/0299226 A1* | 10/2017 | Buscheck ............... F24T 10/20 |

FOREIGN PATENT DOCUMENTS

| | | |
|---|---|---|
| JP | 2002206704 A | 7/2002 |
| WO | WO-2014059231 A1 | 4/2014 |

OTHER PUBLICATIONS

Born, Max and Wolf, Emil. "Principals of Optics: Electromagnetic Theory of Propagation, Interference and Diffraction of Light." Pergamon, 6th Edition, 1980, pp. 146-149.

International Search Report and Written Opinion regarding International Application No. PCT/US2020/064495, dated May 3, 2021.

* cited by examiner

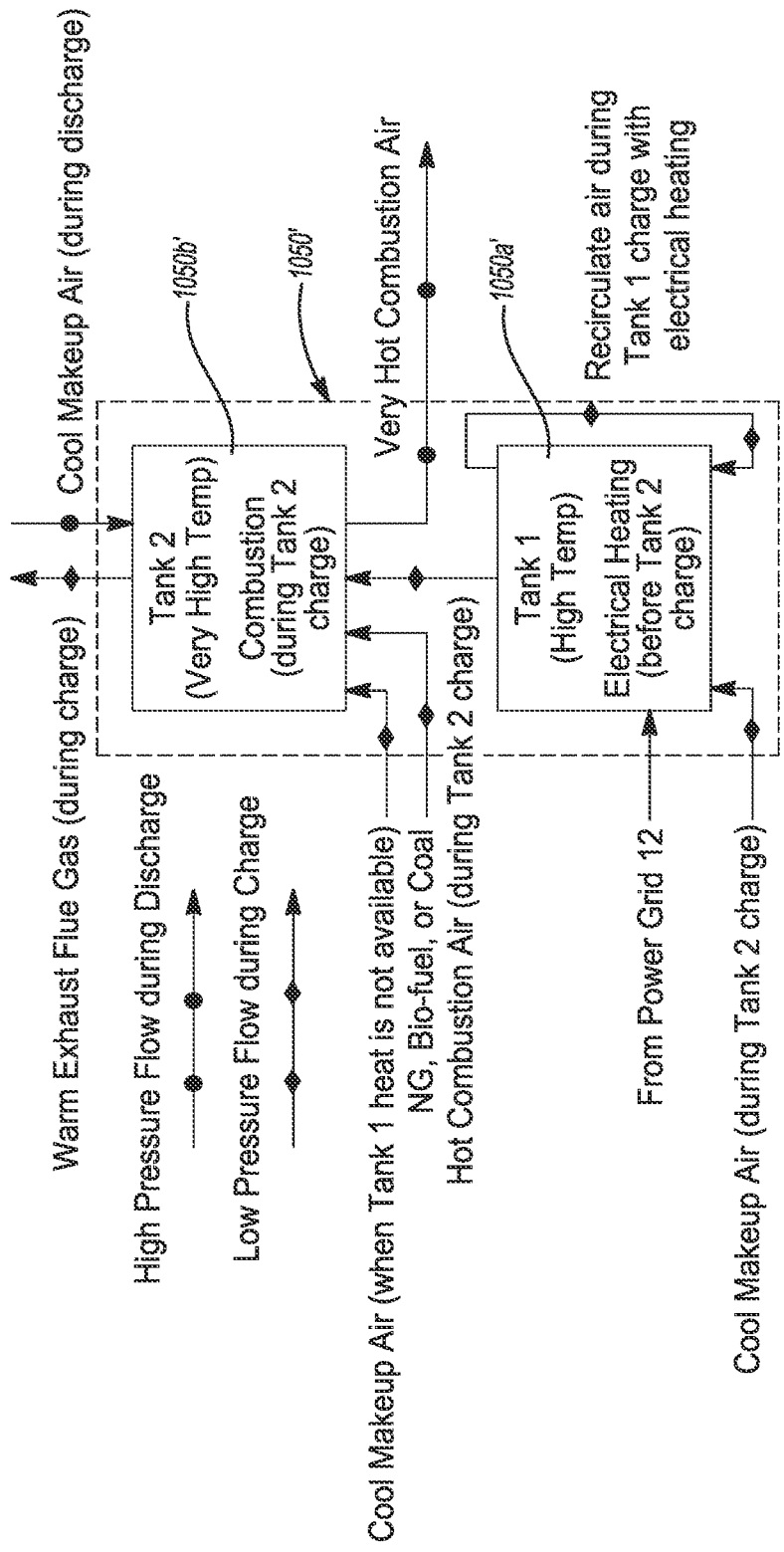

MULTI-FLUID, EARTH BATTERY ENERGY SYSTEMS AND METHODS

CROSS-REFERENCE TO RELATED APPLICATIONS

This application is a bypass continuation-in-part application having a first priority claim to PCT/US2020/064495, filed Dec. 11, 2020, which claims priority to U.S. Provisional Application No. 63/114,279, filed on Nov. 16, 2020. This continuation-in-part application also has a second independent priority claim to U.S. application Ser. No. 16/711,288, filed Dec. 11, 2019, which is a continuation-in-part application and claims priority to PCT/US2019/022416, filed Mar. 15, 2019, which claims the benefit of U.S. Provisional Application No. 62/644,064, filed on Mar. 16, 2018. The entire disclosure of each of the above applications are incorporated herein by reference.

STATEMENT OF GOVERNMENT RIGHTS

This invention was made with Government support under Contract No. DE-AC52-07NA27344 awarded by the United States Department of Energy. The Government has certain rights in the invention.

FIELD

The present disclosure relates to energy storage systems and methods, and more particularly to systems and methods for storing energy, and in some instances excess energy, in permeable geologic formations using compressed non-aqueous fluids and pressurized heated aqueous fluids, as well as using heated sand-filled or rock-filled reservoirs to augment operation of an earth-based energy storage/production system, and where the systems and methods involve the use of either steam turbines that make use of steam as the working fluid, or Brayton-cycle turbines that make use of supercritical $CO_2$ as the working fluid.

BACKGROUND

The statements in this section merely provide background information related to the present disclosure and may not constitute prior art.

Limiting global warming requires new measures enabling increased use of renewable and low-carbon energy, along with reducing greenhouse gas (GHG) emissions from fossil energy use. Fossil energy systems, integrated with $CO_2$-capture, use, and storage (CCUS), directly reduces GHG emissions, but current CCUS options lack a business case to justify $CO_2$-capture costs. The high capital cost of low-carbon, high-efficiency power requires running at full capacity for economic viability. Current energy-storage options, primarily deployed above-ground, lack the capacity to address both diurnal and seasonal supply/demand mismatches driven by variable renewable energy (VRE), while getting full value from high-efficiency, low-carbon power. Below-ground concepts, such as compressed air energy storage (CAES), offer greater storage capacity.

Energy-storage technologies often have high fabrication cost and can have a large above-ground (surface) footprint. Even those with the greatest storage capacity and duration, CAES and pumped hydro energy storage (PHES), cannot address seasonal energy storage. In addition, CAES in salt caverns and PHES require specific geographic conditions that limit their deployment opportunities.

It will also be appreciated that cost-effective reductions in greenhouse gas (GHG) emissions are best achieved when all low-carbon energy resources are fully utilized. This includes baseload power: nuclear energy (NE) and fossil energy (FE), integrated with $CO_2$-capture, use, and storage (CCUS), and variable renewable energy (VRE) (wind and solar). However, current CCUS options do not justify $CO_2$-capture costs and existing energy-storage approaches lack the capacity and storage duration needed to fully utilize all forms of low-carbon energy without curtailment.

Accordingly, challenges remain in further improving the capability of an Earth Battery system to optimize the utilization of available energy sources for the purpose of energy production. These improvements are also designed to substantially reduce the cost of $CO_2$-capture.

Still further efforts and interest are being directed to limiting global warming through the use of power sources that are carbon neutral. Attaining the goal of carbon neutrality requires an ambitious range of measures that reduce $CO_2$ emissions. These measures can include increased use of renewable energy, including variable renewable energy (VRE), such as wind and solar. Enabling VRE to be available when it is demanded requires increased use of bulk energy storage (BES). Measures to reduce $CO_2$ emissions can also include replacing carbon-emitting electricity with power plants equipped to capture $CO_2$ and have it sent to a geologic $CO_2$ storage (GCS) reservoir. When post-combustion $CO_2$ capture is used, up to 90% of the $CO_2$ can be removed. Although such post-combustion $CO_2$-capture technologies do not capture all generated $CO_2$, they are sometimes labeled a zero-carbon electricity technology. The goal of carbon neutrality will be better achieved with technologies that remove 100% of the generated $CO_2$. The systems and methods of this disclosure provide zero-carbon technology pathways.

Another challenge is that many $CO_2$ emission sources are too widely distributed to be captured and sent to a GCS reservoir. For this reason, the combination of VRE, BES, and other zero-carbon technologies, such as nuclear energy, is not enough to attain carbon neutrality. Additional measures are needed to offset emitted $CO_2$ that cannot be captured and sent to a GCS reservoir. To attain carbon neutrality, negative-carbon technologies are needed, which can include those that capture $CO_2$ directly from air and those that generate biofuels from biomass, such as in hydrogen fuel-cell technology, which can be used to power transportation. The systems and methods of this disclosure provide additional negative-carbon technology pathways.

While most decarbonization efforts have focused on $CO_2$ emissions from electricity and transportation, nearly a third of $CO_2$ emissions are from industrial processes, with high-grade heat generation being a major contributor. For example, cement manufacturing requires high-grade heat and presently generates about 7% of global $CO_2$ emissions. Accordingly, there is considerable pressure on cement manufacturers to develop "green" cement. To achieve this goal, cement manufacturers are investigating using alternative materials to reduce $CO_2$ intensity. About 60% of $CO_2$ emissions are from chemical processes, with the rest from heat generation and power.

The cement industry has been modifying the chemical composition of cement to reduce process $CO_2$ emissions. Unfortunately, this has resulted in trade-offs with respect to durability, strength, and cost for the cement. For current practice, combustion heat comes primarily from $CO_2$-intensive fuels: coal, petroleum coke, tires, and solid waste, plus some natural gas. Alternative fuel sources, such as biomass, can reduce $CO_2$ emissions or even result in negative $CO_2$ emissions when the systems and methods of this disclosure are used. The systems and methods of this disclosure provide zero-carbon and negative-carbon technology pathways for the manufacture of cement and for a wide range of heat-intensive industrial applications.

It will also be appreciated that attaining the goal of carbon neutrality requires an ambitious range of measures that reduce $CO_2$ emissions. These measures include increased use of VRE sources such as wind and solar. Enabling VRE to be available when it is demanded requires increased use of BES. Measures to reduce $CO_2$ emissions also include replacing $CO_2$-emitting electricity with power plants equipped to capture $CO_2$ and have it sent to a GCS reservoir. When post-combustion $CO_2$ capture is used, up to 90% of the $CO_2$ can be removed. It would also be highly desirable to make use of pre-combustion $CO_2$-capture technology for the purpose of trapping 100% of the generated $CO_2$, so the trapped $CO_2$ can be deployed as a near-zero, $CO_2$-emissions electricity technology when fossil fuel is used. It would also be highly desirable to provide a system and method which also is able to use biomass as a replacement energy source for fossil fuel for oxy-combustion, which would provide the benefit of a system and method which operates as a negative $CO_2$-emissions system and method.

One significant drawback when attempting to use $CO_2$ emission sources is that they are often too widely distributed to be captured and sent to a GCS reservoir. For this reason, the combination of VRE, BES, and other low-carbon energy technologies, such as nuclear energy, is not enough to attain carbon neutrality. Additional measures are needed to offset emitted $CO_2$ that cannot be captured and sent to a GCS reservoir. To attain carbon neutrality, negative emissions technologies are needed, which can include those that capture $CO_2$ directly from air and those that generate biofuels from biomass, such as in hydrogen fuel-cell technology, which can be used to power transportation. The systems and methods in this disclosure can be used to provide additional negative-emissions pathways needed to achieve carbon neutrality.

SUMMARY

This section provides a general summary of the disclosure and is not a comprehensive disclosure of its full scope or all of its features.

In one aspect the present disclosure relates to a method for storing excess energy from at least one energy producing source, as thermal energy, using an existing geologic formation. The method may comprise using a first storage zone formed in the geologic formation for storing high temperature brine having a temperature within a first temperature range and using a second storage zone formed in the geologic formation adjacent the first zone for storing medium high temperature brine having a temperature within a second temperature range less than the first temperature range. When excess energy is available from the energy producing source, the method may provide for withdrawing a quantity of the medium high temperature brine and heating the withdrawn quantity of withdrawn medium high temperature brine using the excess energy to produce a first new quantity of high temperature brine and injecting the first new quantity of high temperature brine back into the first storage zone. The method may further provide for using the injection of the first new quantity of high temperature brine to force a quantity of medium high temperature brine present in the first storage zone into the second storage zone, to maintain a desired quantity of high temperature brine in the first storage zone and a desired quantity of medium high temperature brine in the second storage zone.

In another aspect the present disclosure relates to a method for storing excess energy from at least one energy producing source, as thermal energy using an existing geologic formation. The method may comprise using a first storage zone formed in the geologic formation for storing high temperature brine having a temperature within a first temperature range, and using a second storage zone formed in the geologic formation adjacent the first storage zone for storing medium high temperature brine having a temperature within a second temperature range less than the first temperature range. The method may further include using a third storage zone formed in the geologic formation adjacent the second storage zone for storing warm brine having a temperature with a third temperature range less than the second temperature range. When excess energy is available from the energy producing source, the method may provide for withdrawing a quantity of at least one of the warm brine or the medium high temperature brine, heating the withdrawn quantity of warm brine or the withdrawn quantity of medium high temperature brine using the excess energy to produce a first new quantity of high temperature brine, and injecting the first new quantity of high temperature brine back into the first storage zone. The method may further include using the injection of the first new quantity of high temperature brine to force a quantity of medium high temperature brine present in the first storage zone into the second storage zone, to maintain a desired quantity of high temperature brine in the first storage zone and a desired quantity of medium high temperature brine in the second storage zone.

In another aspect the present disclosure relates to a system for using storing excess energy from an energy producing source. The system may comprise at least one first well for withdrawing and injecting high temperature brine having a first temperature within a first temperature range into a first geologic storage zone. The system may further include at least one second well for withdrawing and injecting medium high temperature brine having a second temperature within a second temperature range less than said first temperature range into a second geologic storage zone adjacent the first geologic storage zone. The system may further include using a third plurality of wells to both withdraw warm brine and inject cool and/or warm brine into a third geologic storage zone adjacent the second geologic storage zone, with the warm brine and the cool brine having temperatures within a third temperature range less than the second temperature range. The system may also include a heat exchanger responsive to an excess energy from the energy producing source which heats a withdrawn quantity of the medium high temperature brine and/or a withdrawn quantity of the warm brine into a new quantity of high temperature brine. The system may also include a pump which injects the new quantity of high temperature brine into the first geologic storage zone.

In another aspect the present disclosure relates to an Earth battery system for storing at least one of excess electrical power from an electrical power grid, or heat from a heat generating source, in the form of pressure and heat, within the Earth, for future use in assisting with a production of electricity. The system may comprise at least one huff/puff well for injecting and withdrawing a compressed, supplemental, non-aqueous fluid, the non-aqueous fluid comprised of at least one of air, $CO_2$, $N_2$, or a mixture of $CO_2$ and $N_2$, in a first storage reservoir in the Earth. The system may further include at least one hot brine huff/puff well for injecting and withdrawing hot brine, heated using at least one of excess power from the electrical power grid and heat from a heat generating source, to and from a second storage reservoir in the Earth, at least at one of the same elevational level as the first storage reservoir or at a different elevational level than the first storage reservoir. The system may further include at least one cool brine huff/puff well for injecting and withdrawing cool brine to and from a third storage reservoir at a different elevational level than the first and second storage reservoirs, for pressure support needed to sustain the withdrawal of the at least one of the supplemental non-aqueous fluids and hot brine and for cooling the supplemental non-aqueous fluids in conjunction with an at least one compression stage. The system may further include at least one cool brine huff/puff well for injecting and withdrawing cool brine to and from the at least one of the first and second storage reservoirs, for the pressure management needed to sustain the injection and withdrawal of the at least one of the supplemental non-aqueous fluids and hot brine and for cooling the supplemental non-aqueous fluids in conjunction with an at least one compression stage. Still further, the system may use a power generating subsystem configured to use hot brine withdrawn from the second storage reservoir to pre-heat at least one of air, $CO_2$, $N_2$, or a mixture of $CO_2$ and $N_2$, withdrawn from the first reservoir, to drive a power generating component for generating electrical power back on to the electrical power grid upon demand.

In another aspect the present disclosure relates to a method for forming an Earth battery for storing at least one of excess electrical power from an electrical power grid, or heat from a heat generating source, in the form of pressure and heat, within the Earth, for future use in assisting with a production of electricity. The method may comprise using at least one huff/puff well for injecting and withdrawing a compressed, supplemental, non-aqueous fluid, the compressed, supplemental, non-aqueous fluid comprised of at least one of air, $CO_2$, $N_2$, or a mixture of $CO_2$ and $N_2$, in a first storage reservoir in the Earth. The method may further include using at least one hot brine huff/puff well for injecting and withdrawing hot brine, heated using at least one of excess power from the electrical power grid and heat from a heat generating source, to and from a second storage reservoir in the Earth, at least at one of the same elevational level as the first storage reservoir or at a different elevational level than the first storage reservoir. The method may further include using at least one of a cool brine huff/puff well for injecting and withdrawing cool brine to and from a third storage reservoir in the Earth, at a different elevational level than the first and second storage reservoirs, or cool brine imported from a separate brine source, for pressure support needed to sustain the withdrawal of at least one of the supplemental non-aqueous fluids and hot brine, and for cooling the supplemental non-aqueous fluids in conjunction with an at least one compression stage. The method may further include using at least one cool brine huff/puff well for injecting and withdrawing cool brine to and from the at least one of the first and second storage reservoirs, for the pressure management needed to sustain the injection of the at least one of the supplemental non-aqueous fluids and hot brine and for cooling the supplemental non-aqueous fluids in conjunction with an at least one compression stage. The method may further include using a power generating subsystem configured to use hot brine withdrawn from the second storage reservoir to pre-heat at least one of air, $CO_2$, $N_2$, or a mixture of $CO_2$ and $N_2$ withdrawn from the first reservoir, to drive a power generating component for generating electrical power back on to the electrical power grid upon demand.

The method for high- and very-high-temperature thermal energy storage (TES) in sand- or rock-filled tanks (called TES/HTX tanks, where HTX stands for heat exchanger) is added to all three Earth Battery versions. This high-/very-high-temperature heat can be derived from several sources, including electrical heaters and fossil energy (FE) combustion. These tanks can be placed above ground or partially or completely below ground. It should be appreciated that in addition to the combustion of fossil fuel, all combustion devices described in the present disclosure may also be used for the combustion of biomass or for the combustion of combinations of fossil fuel and biomass.

The method for using pressurized hot brine or water to preheat boiler feedwater (BFW) in the Thermal Earth Battery. This hot brine or water is stored either above ground in tanks or below ground in porous reservoirs, as disclosed in Buscheck and Upadhye (2019b).

The method to directly use short- and long-duration stored heat to provide the thermal energy required for $CO_2$-capture is added to all three Earth Battery versions. The parasitic cost of $CO_2$-capture is comprised primarily of heat (~90%), with the rest being electrical. This heat can be stored either above ground in tanks or below ground in porous reservoirs, as disclosed in Buscheck and Upadhye (2019b). This heat can be derived from several sources, including solar thermal energy (STE), the heat of air and/or $CO_2$ compression, FE combustion, as well as the combustion of biomass. The use of excess energy to provide the energy required for $CO_2$-capture enables a significant portion of the electricity dispatched from an Earth Battery FE plant to be from renewable (wind and solar) energy sources, as well as from other very low-carbon energy sources, such as nuclear energy (NE). The direct use of stored heat in the amine-reboiler process utilizes that heat more efficiently than if it were used to generate electricity.

The method of using hot fluid recirculation to keep the combustors and pre-heaters in steam turbines hot enough to mitigate issues associated with thermal cycling. This method applies primarily to the Thermal Earth Battery.

The method of using booster heat exchangers is added between steam-turbine stages in the Thermal Earth Battery. These heat exchangers use medium-hot flue gas to boost the steam temperature between steam-turbine stages.

The method of using medium-hot flue gas leaving the pre-heater to supply some of the heat required for $CO_2$-capture.

The method of using some of the steam from the heat recovery steam generator (HRSG) to supply some of the heat required for $CO_2$-capture.

The method of using the heat of air compression from compressed air energy storage (CAES) to supply some of the heat required for $CO_2$-capture.

The method of using solar thermal energy (STE) to supply some of the heat required for $CO_2$-capture.

The method of using organic Rankine cycle turbines in the Thermal Earth Battery.

High-temperature TES/HTX tanks use electrical heaters to store heat powered by excess electricity from the grid or from a baseload power plant. Very-high-temperature TES/HTX/combustion tanks store heat generated by FE combustors that use biomass, natural gas (NG), or coal. A key principal is to time-shift energy from when it is available to when it is demanded. High-/very-high-temperature TES/HTX tanks can time-shift VRE, NE power, and FE combustion so that it does not need to coincide with electricity demand. Time-shifting FE and/or biomass combustion can enable a constant stream of $CO_2$ in the exhaust flue gas, allowing the $CO_2$-capture system to run continuously at full capacity. This also allows the $CO_2$-capture system to be sized to the average electricity dispatch rate, rather than the peak dispatch rate, which would maximize the return on capital investment. Time-shifting FE and/or biomass combustion can also enable the parasitic load of $CO_2$-capture to be imposed during periods of oversupply, such as when VRE is abundant. Thus, otherwise wasted VRE and NE can be used to satisfy the energy requirements for $CO_2$-capture. Time-shifting $CO_2$-capture to periods of oversupply, increases net power from a FE plant during peak demand. High-/very-high-temperature TES/HTX tanks can also be used to increase peak power from FE power, enabling a dispatchable baseload plant to function as a peaker plant, without increasing $CO_2$ generation in real time. The addition of high-/very-high-temperature TES/HTX tanks to gas-turbine and combined-cycle power plants enables combustion heat to be generated 100% of the time at a constant rate, allowing $CO_2$-capture operations to run continuously at full capacity. This allows the $CO_2$-capture facility to be sized to the average electricity dispatch rate, rather than the peak dispatch rate, which would maximize the return on capital investment.

Further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

FIG. 11a shows an optional embodiment of the thermal energy storage reservoir system that employs two serially-connected, sand- and/or rock-filled tanks for the steam-turbine version of the Thermal Earth Battery, a first tank operating as a high temperature thermal storage tank and which feeds a second tank operating as a very high temperature thermal storage tank;

DETAILED DESCRIPTION

Figure 1:
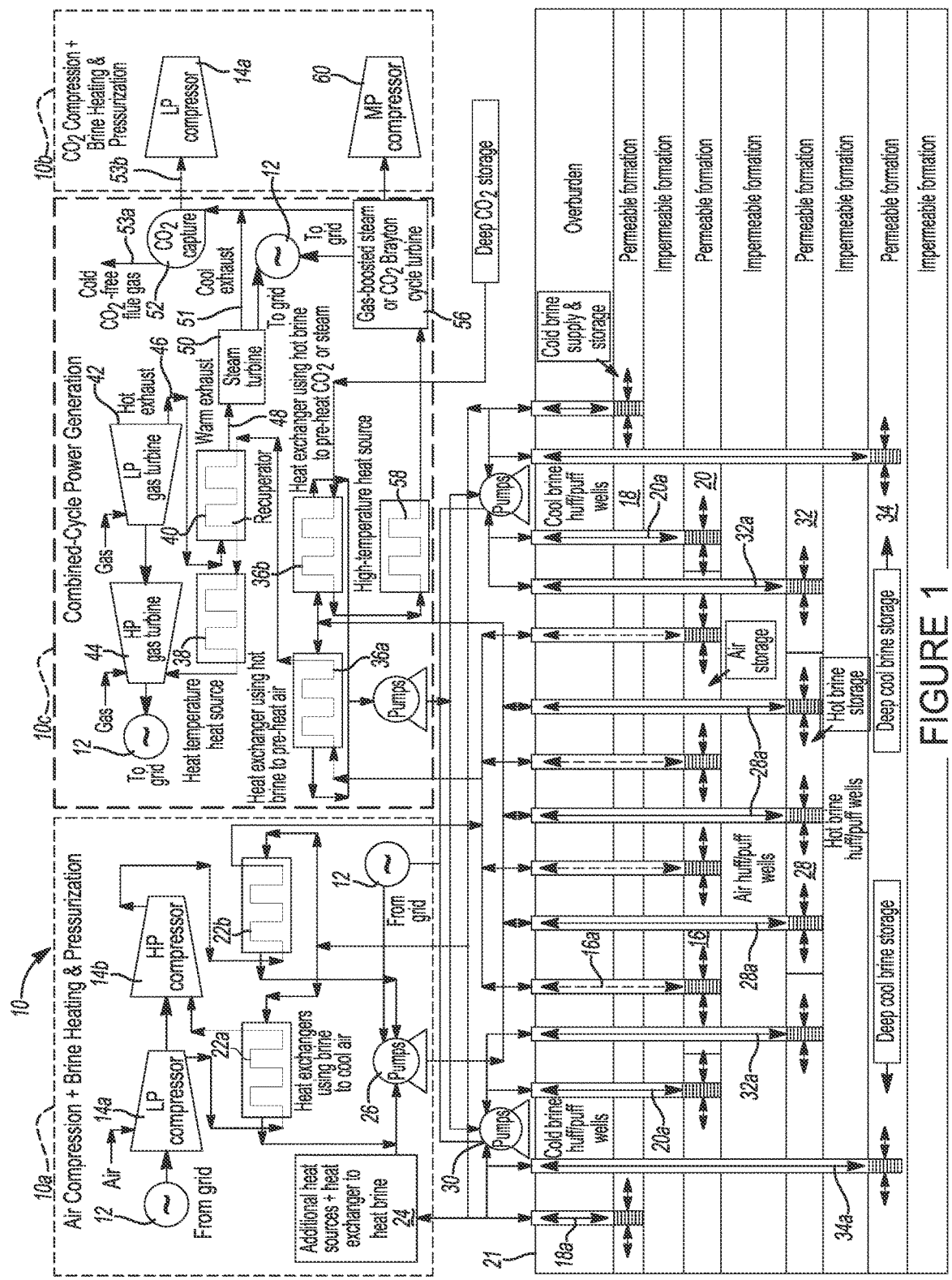
FIG. 1 is a high level block diagram illustrating one embodiment of the present disclosure relating to a multi-fluid, Earth Battery energy system, which can be called the CAES Earth Battery with Combined Cycle Power Generation, including recharging systems for air compression, plus brine heating and pressurization, and the discharging, power-generation system, with natural gas (NG) turbines, steam turbines, and $CO_2$ Brayton-cycle turbines, pre-heated by stored hot brine. In the drawing Figures and following text, it will be noted that "Brayton cycle" has been used, but it will be understood that this may include Rankine cycle systems, such as the $CO_2$ Allam cycle.

The following description is merely exemplary in nature and is not intended to limit the present disclosure, application, or uses. It should be understood that throughout the drawings, corresponding reference numerals indicate like or corresponding parts and features.

Unlike pumped hydro energy storage (PHES), the systems and methods of the present disclosure require a permeable geologic formation, which is overlain by an impermeable geologic formation (also referred to as the "caprock"), and a surface power system having only a minimal surface footprint, compared to the subsurface storage aspects. The systems and methods disclosed herein are deployable in saline aquifers suitable for $CO_2$ storage that occur over half of the contiguous U.S. The systems and methods disclosed herein can also work in widespread hydrocarbon reservoirs, where resources and infrastructure can be leveraged to reduce cost and risk. Many geothermal reservoir systems are in low-to-medium temperature resources that limit power-conversion efficiency, using conventional systems and methods. Some saline aquifers and hydrocarbon reservoirs can be efficiently utilized by the systems and methods of the present disclosure as low- to medium-temperature geothermal resources, because those resources are used as a bottoming cycle before higher temperature thermal resources are used. Battery storage is associated with short operating lifetimes. Based on relevant well-field and power-system experience, operating lifetimes of the systems and methods disclosed herein may significantly exceed those of battery storage.

CAES Earth Battery and Combined-Cycle Power Generation

Figure 2:
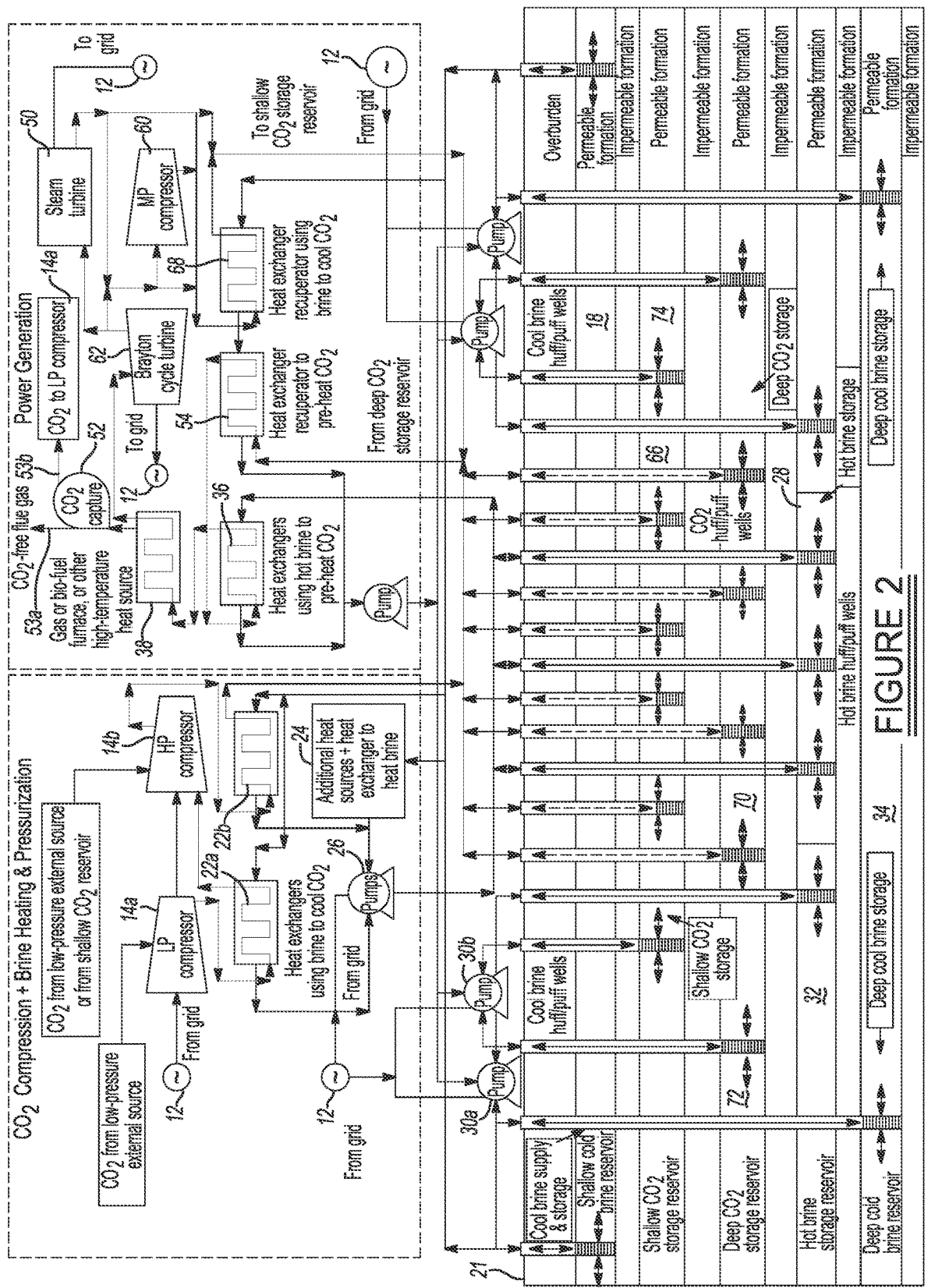
FIG. 2 is a high level block diagram showing another embodiment of the present disclosure relating to a $CO_2$ Earth Battery energy system, including a recharging system for $CO_2$ compression, plus brine heating and pressurization, and the discharging, power-generation system, with $CO_2$ Brayton-cycle turbines and steam turbines, pre-heated by stored hot brine.

Referring to FIG. 1, an Earth Battery system 10 in accordance with one embodiment of the present disclosure is shown. More broadly, the Earth Battery system 10 is used to store excess electricity by using it to compress and store air and $CO_2$ in underground permeable reservoir formations (FIGS. 1 and 2). It will be understood that a reservoir formation can comprise either a geologic formation that has never been used in a reservoir operation or one that has been used in a reservoir operation. In the embodiment shown in FIG. 1, where it is used to store air underground, it is referred to as the CAES Earth Battery. The Earth Battery system 10 integrates conventional and renewable energy resources, allowing each resource to contribute more efficiently to an electric power grid than if operated independently of, or separately from, one another. The Earth Battery system 10 involves technology which makes use of existing technology that, when efficiently integrated, results in major, transformational advances for clean energy production and storage. To this end, the Earth Battery system 10 has a number of distinct advantages over previously developed systems which attempt to store energy using the Earth, some of which may be summarized as follows:

most of the wells used with the present disclosure may be termed "huff/puff" wells, which are used both for fluid injection and fluid production (also referred to as fluid withdrawal throughout this disclosure);

the heat of air, $N_2$, and $CO_2$ compression is used to heat formation brine, which is pressurized with excess electricity and stored in a reservoir;

when energy is needed, nonaqueous fluids (either air, $N_2$, $CO_2$, or mixtures of $N_2$ and $CO_2$) plus hot aqueous fluids (hot brine and/or hot water) are produced, with any of these nonaqueous fluids being pre-heated with hot aqueous fluids before, in the case of air, entering a either a NG turbine or an expander which does not include NG combustion, or, in the case of $N_2$ or $CO_2$ or mixtures of $N_2$ and $CO_2$, a coal-, biomass-, or NG-fired Brayton-cycle turbine, or a Brayton-cycle turbine that does not include NG combustion (in the drawing Figures it will be noted that "$CO_2$" has been used, but it will be understood that this includes $CO_2$, $N_2$ or mixtures thereof);

the compressed air energy storage (CAES)/NG-turbine system can provide short-duration (diurnal to several days) energy storage and the $N_2/CO_2$ Brayton-cycle power system can provide combinations of short-duration (diurnal to several days), medium-duration (week-long), and long-duration (seasonal) energy storage;

a steam turbine power system can also be used to provide combinations of short-duration, medium-duration, and long-duration energy storage;

the Earth Battery system 10 can also store heat from other sources, such as baseload or solar thermal energy (STE) thermo-electric power when heat is not needed to generate electricity from those resources;

all heat sources are sequentially used (from low- to high-temperature) to pre-heat air, $N_2$, $CO_2$, or mixtures of $N_2$ and $CO_2$, providing a bottoming cycle for either an expander, a NG turbine, a coal-, biomass-, or NG-fired $N_2/CO_2$ Brayton-cycle turbine, or a coal-, biomass-, or NG-fired steam turbine. Coal, biomass, or NG may be used in a topping cycle, so their value is even greater than in conventional power systems;

all $CO_2$ from flue gas may be captured and stored in the reservoir, enabling zero-carbon operation;

besides on-site and imported NG, the Earth Battery system 10 can make use of biomass for the topping cycle, adding a bioenergy (BE), $CO_2$-capture and storage (BECCS) operation, resulting in negative $CO_2$ emissions;

CO$_2$ can be imported to increase CO$_2$ and energy-storage capacity; CO$_2$ may also be stored at different depths underground to create a potential energy difference, similar to pumped hydro energy storage (PHES); but unlike PHES, the Earth Battery system 10 forms a subsurface approach which has a minimal surface footprint, compared to the subsurface storage aspects of the Earth Battery; and while the Earth Battery system 10 can use two or more permeable reservoir formations, with each overlain by an impermeable caprock formation, it can also be deployed in just one permeable reservoir formation overlain by an impermeable caprock if huff/puff wells are used for a three-cycle process of thermal recharge, supplemental, non-aqueous fluid (air, N$_2$, CO$_2$, or mixtures of N$_2$ and CO$_2$) recharge, and energy discharge. Furthermore, it will be appreciated that any reference herein to an aqueous fluid shall encompass brine, or combinations of brine and fresh water, or fresh water.

Referring further to FIG. 1, the Earth Battery system 10 thus forms a combined-cycle CAES Earth Battery which is able to receive excess electricity from an electric power grid 12. The system 10 may be viewed as including an air compression and brine heating and pressurization subsystem 10*a*, a CO$_2$ compression and brine heating and pressurization subsystem 10*b*, and a combined-cycle power generation subsystem 10*c*. The system 10 may use the excess electricity to compress air in one or more compression stages 14*a*,14*b*, with the compressed air being injected, using one or more huff/puff wells 16*a*, into a permeable reservoir formation 20 which forms an air storage zone 16. As is well known, the compression of air causes its temperature to rise. For efficient compression, air should be cooled after each compression stage. For cooling purposes, cool brine may be produced using one or more huff/puff wells 18*a*, from shallow permeable reservoir formations 18 below a ground surface 21, and/or deeper permeable reservoir formations 20,32,34 via one or more pluralities of huff/puff wells 20*a*, 32*a* and 34*a*, respectively. Cool brine can also be imported from an SBS ("separate brine source") 340, which can comprise at least one of a separate geologic formation or a separate brine reservoir, including man-made structures. It will be understood what is meant by "cool" brine is brine at an ambient temperature from where it was produced underground, which is called "cool" brine because it is cooler than stored hot brine. In this disclosure we also call this ambient-temperature brine "warm" brine because it is derived from geologic formations that are typically warmer than room-temperature water and can be useful in pre-heating room-temperature fluids, such as boiler feedwater. The use of a shallow permeable reservoir formation may be particularly useful where such formations contain fresh water and where fresh water resources are abundant. Initially, the extraction of brine or fresh water may require down-hole pumps in the wells to extract the brine or fresh water, but eventually these permeable formations will become sufficiently overpressured with the storage of either air, cool brine, or hot brine to cause the cool brine to flow to the ground surface 21 under artesian conditions. The cool brine, or cool fresh water if it is available, may be put through heat exchangers 22*a*,22*b* that follow each compression stage. It should be noted that it may be necessary to use one or more booster pumps 13 so that the pressure of the cool brine is high enough to prevent the brine from flashing to steam when the cool brine is put through and heated in heat exchangers 22*a*,22*b*.

Figure 1A:
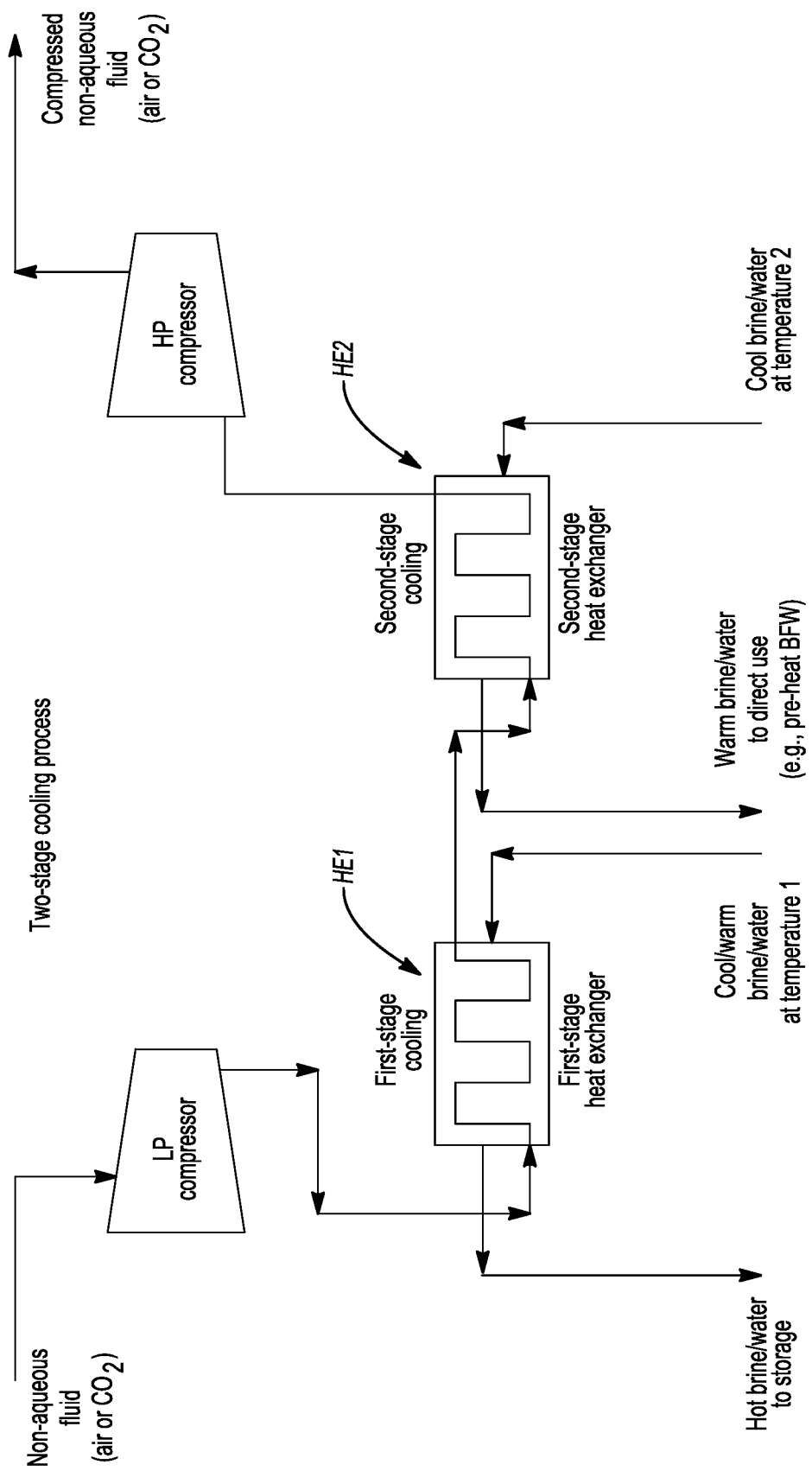
FIG. 1a is a high level block diagram illustrating one optional cooling subsystem that may be incorporated into the various embodiments described in the present disclosure, which involves a two-stage heat exchanger system in which water or brine at different temperatures may be used to help achieve the second stage cooling.

Following one or more compression stages, it is optional, but potentially desirable, to use a two-stage, air-cooling process that uses heat exchangers coupled in series, such as shown in FIG. 1*a*. In FIG. 1*a*, a first cooling stage, represented by a first stage heat exchanger HE1, and a second cooling stage, represented by a second stage heat exchanger HE2, are shown. Air (or even CO$_2$) is put through the first-stage heat exchanger HE1 where it is cooled by either cool or warm brine (as described above). The air that exits the first-stage heat exchanger HE1 may be put through the second-stage heat exchanger HE2 where it is cooled further. The additional cooling may be achieved using either cool water or brine having a temperature lower than the temperature of the cool or warm brine used in the first cooling stage with the first heat exchanger HE1. The two-stage cooling process improves the overall efficiency of the air-compression system. The two-stage cooling process also produces a stream of high-temperature brine, which may be pressurized and sent into storage, and a stream of medium-temperature water or brine, which can be used for some other purpose, such as pre-heating boiler feedwater in a steam-turbine power system in accordance with other embodiments of the present disclosure.

With further reference to FIG. 1, in addition to the heat of air compression, other sources of heat 24 may be used by our technology, such as from a baseload thermo-electric power plant when it is generating too much power for the demand on the electric power grid 12. Such power plants may include nuclear, coal-fired, NG-fired, biomass-fired, or solar thermal energy. Other heat sources may include geothermal energy.

As air is cooled, brine, or fresh water, is heated in the heat exchangers 22*a*,22*b*. The heated brine may be pressurized using one or more pumps 26 so that the heated brine can be injected, using one or more huff/puff wells 28*a*, into an underground permeable reservoir formation which forms a hot brine, or hot water, storage zone 28. In addition to the option of storing pressurized hot brine or water underground in the hot brine storage zone 28, the hot brine or water, which was pressurized using pump 26, may be sent to one or more insulated, hot brine/water storage tanks 27, which is/are part of the two-tank, insulated, pressurized, aqueous fluid storage embodiment described later. Whether done underground or above-ground, this process enables the storage of energy as pressurized hot brine or pressurized hot water. For the following discussion, it will be appreciated that while cool brine or hot brine may be referenced, that fresh water (i.e., for example water of drinking quality) could also be used, and the following references to cool brine or hot brine are intended to encompass the uses of cool fresh water and hot fresh water as well.

Excess electricity from the grid 12 may be used to power one or more pumps 30 to pressurize cool brine produced from the shallow permeable reservoir formation 18 and/or the deeper 20,32 permeable reservoir formations, for injection into a deep permeable reservoir formation 32, or an even deeper permeable warm brine, reservoir formation 34, for the purpose of storing energy as pressurized cool brine. The use of huff/puff wells 18*a*,20*a*,32*a*,34*a* enables efficient recovery of the stored, pressurized energy.

When electricity is demanded by the grid 12, pressurized air is allowed to flow from the air storage zone 16 up to the ground surface 21, after which it enters heat exchangers 36*a* and 36*b*. To assist the upward flow of air, pressurized warm brine from the deep permeable reservoir formation 34 may be produced, using one or more huff/puff wells 34*a*, and allowed to flow under pressure, or be further pressurized (if necessary) by one or more pumps 30, so that it can be injected into the air storage reservoir 20, using one or more huff/puff wells 20*a*, which is/are just outside of the air storage zone 16. Thus, the warm brine acts like a piston, providing pressure support to sustain the upward flow of air. Pressurized hot brine is allowed to flow up one or more huff/puff wells 28a from the hot brine storage zone 28 up to the heat exchangers 36a,36b to heat the air. In addition, pressurized hot brine or hot water may be allowed to flow from the one or more insulated hot brine/water storage tanks 27 to the heat exchangers 36a,36b to heat the air. The cool brine leaving the heat exchangers 36a,36b is pressurized using one or more pumps 37 so it can be injected, using at least one of huff/puff wells 20a,32a, into the permeable reservoir formations 20,32 to provide pressure support to assist in the upward flow of air from the air storage zone 16 and the upward flow of hot brine from the hot brine storage zone 28. Some of the cool brine or cool water pressurized by pump 37 may also be sent to one or more cool brine/water storage tanks 35, which is/are part of the two-tank, insulated, pressurized, aqueous fluid storage embodiment described later. To further assist the upward flow of hot brine from the hot brine storage zone 28, pressurized warm brine from the deep permeable reservoir formation 34 may be produced, using one or more huff/puff wells 34a, and allowed to flow under pressure, or be further pressurized (if necessary) using one or more pumps 30, so that it can be injected into the hot brine storage reservoir 32, using one or more huff/puff wells 32a, which is/are just outside of the hot brine storage zone 28. Thus, warm brine acts like a piston, providing pressure support to sustain the flow of hot brine and to help prevent hot brine from flashing to steam. One such set of heat exchangers 38 may be heated by various above-ground high-temperature heat sources, such as from solar thermal energy. Still another set of heat exchangers 40 may form a "recuperative" set of heat exchangers and may be heated by the hot exhaust 46 from the final NG turbine 42. The heat-exchanger sequence in this example is from the lowest to the highest temperature heat source (i.e., from low-temperature heat exchanger 36 to medium-temperature heat exchanger 40 to high-temperature heat exchanger 38).

After the air exits one or more of the high-temperature heat exchangers 38, it enters a high-pressure NG turbine 44, or it may enter an expander (not shown) that does not include NG combustion. The air goes through one or more stages of the NG turbines 42 and/or 44, or expanders that do not include NG combustion, or an expander (not shown) that does not include NG combustion, which feeds one or more stages of the NG turbines. The NG turbines 42/44 and/or expanders may power generators that deliver electricity to the grid 12.

If NG turbines are used, hot exhaust flue gas 46 exiting the final NG turbine 42 enters the recuperator heat exchanger 40 that heats air prior to the air entering either the high-temperature heat exchanger 38, the NG turbine 44, or an expander that does not use NG combustion.

The warm exhaust flue gas 48 that exits the recuperator heat exchanger 40 may enter a heat recovery steam generator (HRSG) coupled to a steam turbine 50 to generate electricity for the grid 12. Cool exhaust flue gas 51 that exits the HRSG plus steam turbine 50 may enter a $CO_2$-capture system 52 that generates $CO_2$-free flue gas 53a and high-purity $CO_2$ (53b). The captured $CO_2$ enters a low-pressure compressor 14a where it is compressed for storage. Details of the $CO_2$ compression and storage process are described in the following paragraphs for the $CO_2$ Earth Battery embodiment.

The $CO_2$ Brayton-cycle turbine power system (components 56, 36b, 58, and 60) are described in greater detail in FIG. 2 and in the $CO_2$ Earth Battery embodiment.

$CO_2$ Earth Battery

Referring now to FIG. 2, a $CO_2$ Earth Battery system 100 is shown in FIG. 2. This embodiment makes use of certain of the same components as the system 10 of FIG. 1, and common components will be designated using the same reference numbers. The system 100 uses excess electricity from the grid 12 to compress $CO_2$ in one or more compression stages 14a,14b, with the compressed $CO_2$ being injected into a permeable reservoir formation 72 which forms a deep $CO_2$ storage zone 70, via one or more huff/puff wells 70a. The compression of $CO_2$ causes its temperature to rise. For efficient compression, $CO_2$ needs to be cooled after each compression stage. For cooling purposes, cool brine is produced, using one or more huff/puff wells 18a, from either the shallow permeable reservoir formation 18 or the deeper permeable reservoir formations 72,74, using at least one of huff/puff wells 72a,74a. Initially, this may require downhole pumps to extract the brine, but eventually these permeable formations will become sufficiently overpressured with the storage of either $CO_2$, cool brine, or hot brine to cause the cool brine to flow up to the ground surface 21 under artesian conditions. Cool brine can also be imported from an SBS ('separate brine source") 340, which can comprise at least one of a separate geologic formation or a separate brine reservoir, including man-made structures. The cool brine is put through heat exchangers 22a,22b that follow each compression stage. It should be noted that it may be necessary to use one or more booster pumps 25 so that the pressure of the cool brine is high enough to prevent the brine from flashing to steam when the cool brine is sent through and heated in heat exchangers 22a,22b. Following one or more compression stages, it may be possible to use a two-stage, $CO_2$-cooling process that uses heat exchangers coupled in series, such as describe above in connection with FIG. 1a. In the first cooling stage, $CO_2$ is put through the first-stage heat exchanger HE1 where it is cooled by either cool or warm brine (as described above). The $CO_2$ that exits the first-stage heat exchanger HE1 may be put through the second-stage heat exchanger HE2 where it is cooled further using either cool water or brine having a temperature lower than the temperature of the cool or warm brine used in the first cooling stage. The two-stage cooling process improves the overall efficiency of the $CO_2$-compression system, while producing a stream of high-temperature brine, which may be pressurized and sent into storage, and a stream of medium-temperature water or brine, which can be used for some other purpose, such as pre-heating boiler feedwater in a steam-turbine power system in accordance with other embodiments of the present disclosure.

In addition to the heat of $CO_2$ compression, other sources of heat 24 may be used, such as from a baseload thermoelectric power plant when it is generating too much power for the demand on the grid 12. Such power plants may include nuclear, coal-fired, NG-fired, biomass-fired, or solar thermal energy. The other heat sources 24 may include geothermal energy. As $CO_2$ is cooled, brine is heated in the heat exchangers 22a,22b. The heated brine is pressurized using one or more pumps 26 so that it can be injected, using one or more huff/puff wells 28a, into a permeable reservoir formation which forms a hot brine storage zone 28. In addition to the option of storing pressurized hot brine or water underground in the hot brine storage zone 28, the hot brine or water, which was pressurized using pump 26, may be sent to one or more insulated, hot brine/water storage tanks 27, which is/are part of the two-tank, insulated, pressurized, aqueous fluid storage embodiment described later. Whether done underground or above-ground, this process enables the storage of energy as pressurized hot brine or pressurized hot water.

Excess electricity from the electric power grid 12 is used to power the pumps 30a,30b to pressurize cool brine produced from the shallow and/or deeper permeable reservoir formations 18 and 72,74, using at least one of huff/puff wells 18a,72a,74a, respectively, for injection into a deep permeable reservoir formation 32, using one or more huff/puff wells 32a, and/or into the even deeper permeable reservoir formation 34, using one or more huff/puff wells 34a for the purpose of storing energy as pressurized cool or warm brine.

When electricity is demanded by the electric power grid 12, pressurized $CO_2$ is allowed to flow from the deep $CO_2$ storage zone 70 up to the ground surface 21, via one or more huff/puff wells 70a, and into one or more heat exchangers 36, or possibly into one or more heat exchangers 54, before entering one or more heat exchangers 36, and then possibly into one or more heat exchangers 38 (as discussed below). The cool brine leaving the heat exchangers 36 is pressurized using one or more pumps 37 so it can be injected into the permeable reservoir formations 32,72, using at least one of huff/puff wells 32a,72a, to provide pressure support to assist in the upward flow of $CO_2$ from the $CO_2$ storage zone 70, via one or more huff/puff wells 70a, and the upward flow of hot brine from the hot brine storage zone 28, via one or more huff/puff wells 28a. Some of the cool brine or cool water pressurized by one or more pumps 37 may also be sent to one or more cool brine/water storage tanks 35, which is/are part of the two-tank, insulated, pressurized, aqueous fluid storage embodiment described later. To further assist the upward flow of $CO_2$, pressurized warm brine from the deep permeable reservoir formation 34 may be produced, using one or more huff/puff wells 34a, and allowed to flow under pressure, or be further pressurized (if necessary) by one or more pumps 30a, so that it can be injected into the deep $CO_2$ storage reservoir, via one or more huff/puff wells 72a, which is/are just outside the deep $CO_2$ storage zone 70. This causes the warm brine to act like a piston, providing pressure support to sustain the upward flow of $CO_2$, via one or more huff/puff wells 70a. To further assist the upward flow of hot brine, pressurized warm brine from the deep permeable reservoir formation 34 may be produced, using one or more huff/puff wells 34a, and allowed to flow under pressure, or be further pressurized (if necessary) using one or more pumps 30a, so that it can be injected into the hot brine storage reservoir 32, via one or more huff/puff wells 32a, which is/are just outside of the hot brine storage zone 28. Thus, warm brine acts like a piston, providing pressure support to sustain the upward flow of hot brine, via one or more huff/puff wells 28a, and to prevent hot brine from flashing to steam. Pressurized hot brine is allowed to flow from the hot brine storage zone 28, via one or more huff/puff wells 28a, up to the heat exchangers 36 to heat the $CO_2$. Heated $CO_2$ may flow into the additional series of heat exchangers 38,54. One such set or series of heat exchangers 38 may be heated by various above-ground high-temperature heat sources, such as from solar thermal energy. The other set of heat exchangers 54 may be heated by hot $CO_2$ after it has exited a medium-pressure compressor 60. The series of high-temperature heat exchangers 38 may also include NG-fired, coal-fired, and/or biomass-fired furnaces. Thus, NG, coal, and/or biomass combustion may be used in the final stages of temperature boosting before the heated $CO_2$ enters one or more Brayton-cycle turbines 62. The heat-exchanger sequence is preferably always from the lowest to the highest temperature heat source.

If NG, coal, or biomass is combusted to heat the $CO_2$, the $CO_2$ that was generated during combustion may be sent to a $CO_2$-capture system 52, which generates $CO_2$-free flue gas 53a and high-purity $CO_2$ 53b, which is then sent to a low-pressure compressor 14a prior to storage in the shallow $CO_2$ storage zone 66.

After $CO_2$ is pre-heated by one or more heat exchanger stages 54,36,38 (from lowest to highest temperature) and exits the final stage, which is either the hot brine heat exchanger(s) 36 or the high-temperature heat exchanger(s) 38, it may enter one or more Brayton-cycle turbines 62 to generate electricity for the electric power grid 12. Note that the high-temperature heat exchangers 38 may comprise a series of heat exchangers with successively higher heat sources (not expressly shown). If it is sufficiently hot after exiting the Brayton-cycle turbine(s) 62, the $CO_2$ may be sent to the HRSG plus steam turbine 50 to generate electricity for the electric power grid 12. Depending on the depth of the shallow $CO_2$ storage zone 66, the $CO_2$ may be sent to the medium-pressure compressor 60. Depending on the temperature of the $CO_2$ exiting either the HRSG plus steam turbine 50 or the medium-pressure compressor 60, the $CO_2$ may be sent to one or more recuperator heat exchangers 68, where cool brine produced from either the shallow permeable reservoir formation 18 or the shallow permeable $CO_2$ storage reservoir formation 74 is used to cool the $CO_2$ prior to its storage in the shallow $CO_2$ storage zone 66, using one or more huff/puff wells 66a.

Brine that is heated in the recuperator heat exchangers 68 may be sent to the recuperator heat exchangers 54, where the heated brine may be used to pre-heat $CO_2$ produced from the deep $CO_2$ storage zone 70, prior to that $CO_2$ entering at least one of one or more heat exchangers 36 and one or more heat exchangers 38.

During periods of excess power supply, $CO_2$ may be produced from the shallow $CO_2$ storage zone 66, via one or more huff/puff wells 66a, and allowed to flow to the ground surface 21. From the ground surface 21 the $CO_2$ may continue on into the high-pressure compressor 14b. Excess electricity from the electric power grid 12 is used to compress the $CO_2$ for injection and storage in the deep $CO_2$ storage zone 70, using one or more huff/puff wells 70a. To assist the flow of $CO_2$ from the shallow $CO_2$ storage zone 66 to the deep $CO_2$ storage zone 70, pressurized cool brine may be allowed to flow under pressure from the deep $CO_2$ storage reservoir formation 72, via one or more huff/puff wells 72a, or cool or warm brine may be allowed to flow from the deep warm brine reservoir formation 34, via one or more huff/puff wells 34a, up to the surface 21, and then back down to the shallow $CO_2$ storage reservoir formation 74, via one or more huff/puff wells 74a. If further pressurization is needed, one or more pumps 30b may be used to pressurize the cool brine after it leaves either the deep $CO_2$ storage reservoir 72 or the deep warm brine reservoir 34, and before it enters the shallow $CO_2$ storage reservoir 74. Thus, stored cool or warm pressurized brine is used to function like a piston that provides pressure support, which reduces the power required to compress the $CO_2$, while moving it from the shallow $CO_2$ storage zone 66 to the deep $CO_2$ storage zone 70. It should be noted that it is far more efficient to pressurize brine than it is to compress $CO_2$.

Figure 3:
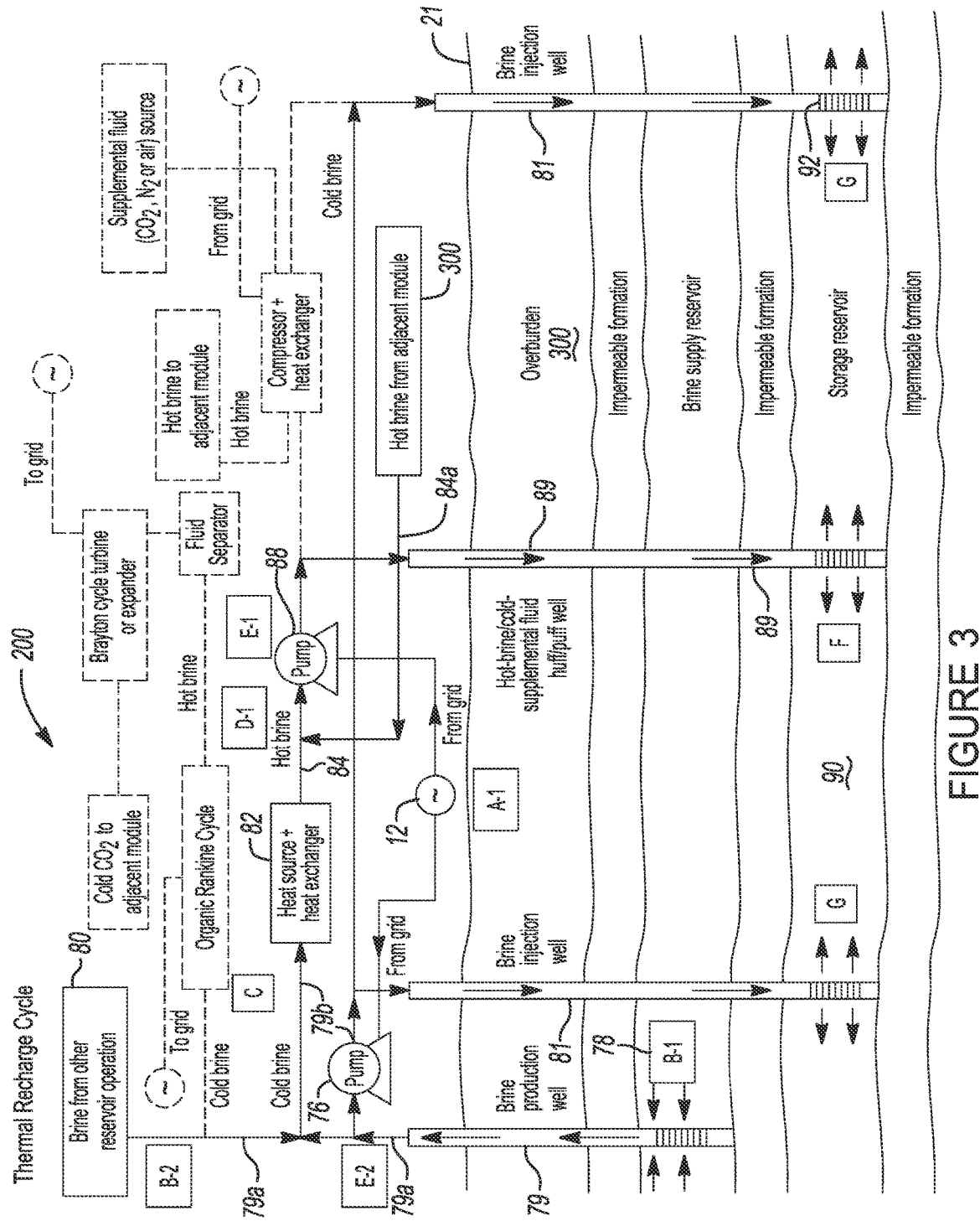
FIG. 3 is a high level diagram illustrating a thermal recharge cycle for the system of FIG. 1 and/or FIG. 2.

Multi-Use Huff/Puff Wells for Thermal and Supplemental, Non-Aqueous Fluid Recharge and Energy Discharge The present disclosure is able to utilize individual multi-use huff/puff wells for thermal recharge, supplemental, non-aqueous fluid recharge, and energy discharge. Referring to FIG. 3, a system 200 in accordance with another embodiment of the present disclosure is disclosed which implements thermal and supplemental, non-aqueous fluid recharge and energy discharge. Components in common with the systems 10 and 100 have been designated using the same reference numbers as those used to discuss the systems 10 and 100.

Excess electricity from the electric power grid 12 is used to power one or more pumps 76 that move cool brine 79a up through at least one brine production well 79 from at least one brine supply reservoir 78 and/or cool brine 80a from at least one separate reservoir operation 80, with one or more pumps 76 generating cool pressurized brine 79b, with is then sent into and through one or more brine injection wells 81, for use in the storage reservoir 90. Cool pressurized brine 79b may be fed to a heat exchanger 82, which uses a heat source to generate hot brine 84 for thermal energy storage. Hot brine 84a may also be brought in from at least one adjacent energy-storage module, which may comprise system 300 in FIG. 4, for thermal energy storage. Excess electricity from the electric power grid 12 is used to power one or more pumps 88 to pressurize the hot brine 84 (with or without hot brine 84a from an adjacent module) for injection into the storage reservoir 90 via at least one multi-use huff/puff well 89. Excess electricity from the electric power grid 12 may also be used to power one or more pumps 76 to inject cool pressurized brine 79b into one or more brine injection wells 81 for pressure support in the storage reservoir 90.

Supplemental, Non-Aqueous Fluid Recharge

Figure 4:
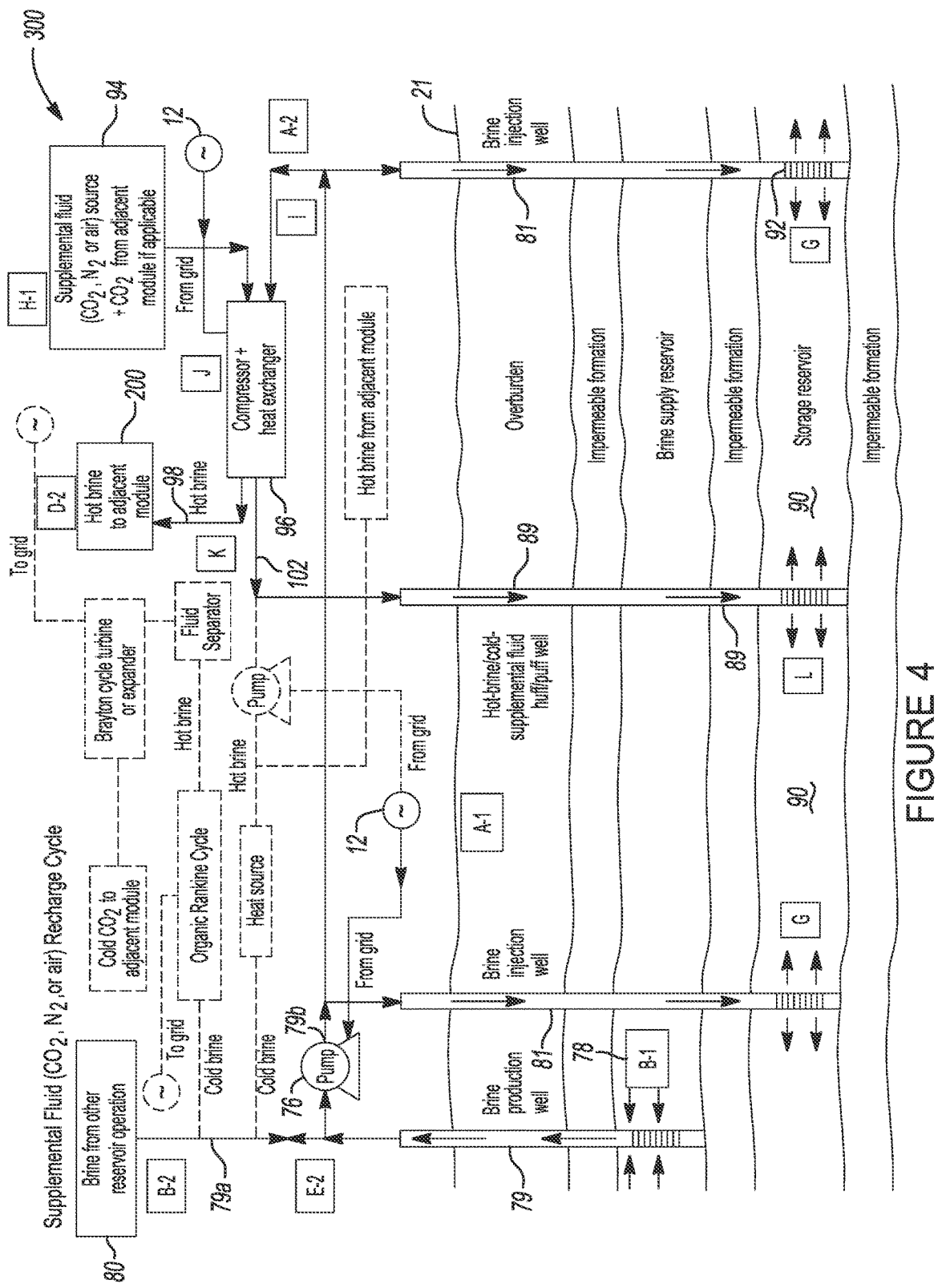
FIG. 4 is a high level diagram illustrating operations associated with a supplemental, non-aqueous fluid recharge cycle for the system shown in FIG. 1 and/or FIG. 2.

Referring to FIG. 4, a system 300 in accordance with another embodiment of the present disclosure is shown for performing supplemental, non-aqueous fluid recharging. Supplemental, non-aqueous fluid ($CO_2$, $N_2$, or air) is brought in from an external source 94, which is fed to a compressor and heat exchanger 96 powered with excess electricity from the electric power grid 12. Note that in the case of $CO_2$, the external source may be a $CO_2$ storage reservoir operated in conjunction with a geological $CO_2$ storage (GCS) operation. Excess electricity from the grid 12 is used to power one or more pumps 76 that move cool brine 79a from the brine supply reservoir 78 up through at least one brine production well 79, and/or cool brine 80a from at least one separate reservoir operation 80, with one or more pumps 76 generating cool pressurized brine 79b that is sent down through one or more brine injection wells 81 for use in the storage reservoir 90. Some of the cool brine 79a and/or 80a may also be put through one or more pumps 76 to generate cool pressurized brine 79b, which is used to cool compressed, supplemental, non-aqueous fluid flowing through the compressor and heat exchanger 96, which generates hot brine 98 and cooled, compressed, supplemental, non-aqueous fluid 102. The hot brine 98 may be sent to at least one adjacent energy-storage module, which may be system 200 discussed in connection with FIG. 3. It will be appreciated that a three-cycle system works especially well when deployed as two parallel modules. Thus, while module 300 is in cycle two, module 200 is in cycle one, and vice versa. The cooled, compressed, supplemental, non-aqueous fluid 102 may be injected into the storage reservoir 90, via at least one multi-use huff/puff well 89. Excess electricity from the electric power grid 12 may also be used to power the one or more pumps 76 to pressurize and inject cool brine 79b into one or more brine injection wells 81 to provide pressure support in the storage reservoir 90.

Energy Discharge System

Figure 5:
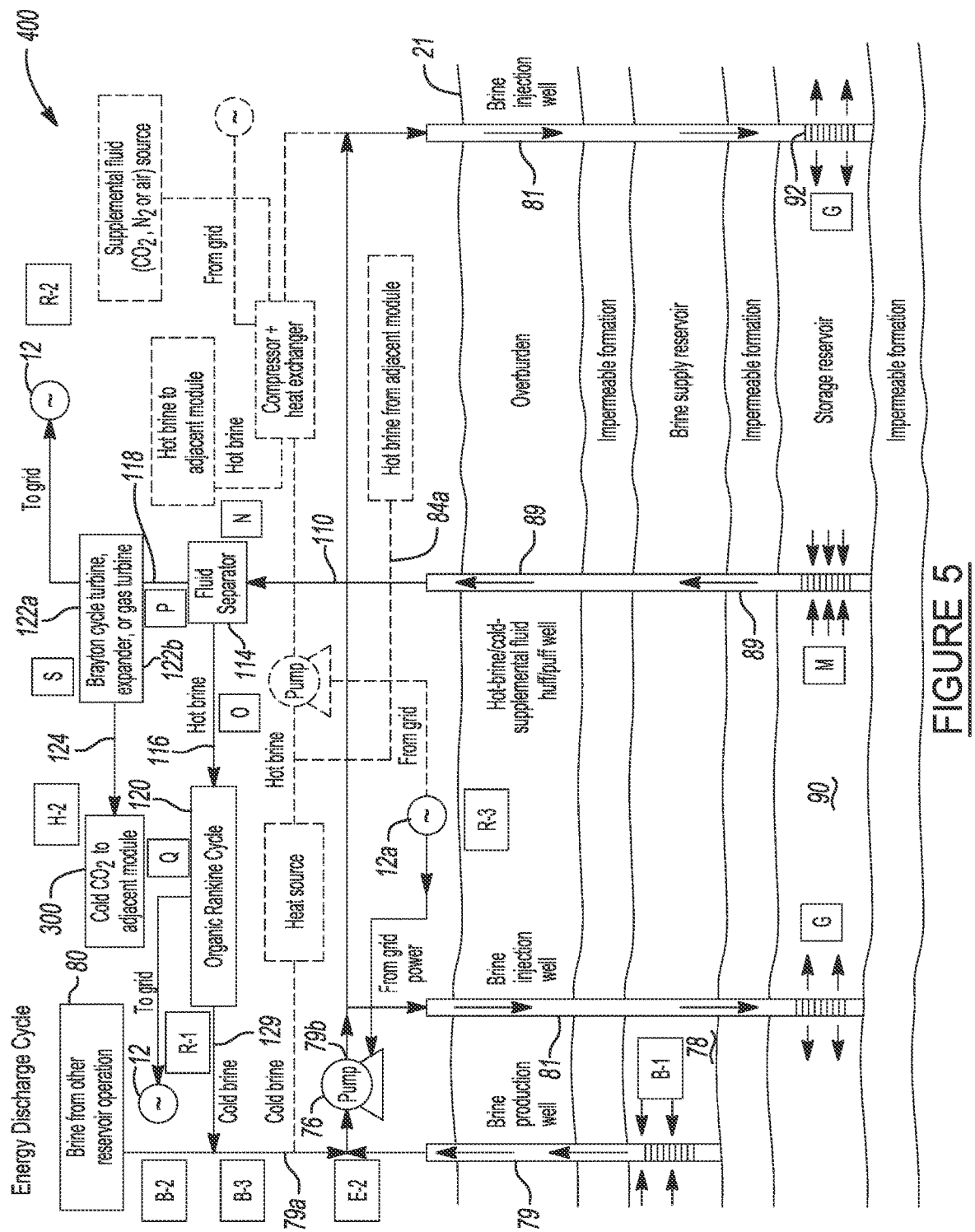
FIG. 5 is a high level diagram illustrating operations associated with an energy discharge cycle for the system shown in FIG. 1 and/or FIG. 2.

Referring to FIG. 5, an energy discharge system 400 is shown in accordance with still another embodiment of the present disclosure. The system 400 operates such that when electricity is needed, a mixture of pressurized fluids, including hot brine and hot, supplemental, non-aqueous fluid 110, is allowed to flow up at least one multi-use huff/puff well 89. The hot mixture of brine and supplemental non-aqueous fluid 110 is fed into a fluid separator 114 which separates hot brine 116 from hot, supplemental, non-aqueous fluid 118. The hot brine 116 may be fed to a conventional geothermal power system, such as an Organic Rankine Cycle system 120 or steam turbine system (not expressly shown), which generates electricity for the electric power grid 12. If the supplemental, non-aqueous fluid is $N_2$, $CO_2$, or a mixture of $N_2$ and $CO_2$, it may be fed to a Brayton-cycle turbine 122a, which generates electricity for the grid 12. If the supplemental, non-aqueous fluid is air, it may be fed to an expander or to a NG turbine 122b, which generates electricity for the grid 12. If air is used, it may be exhausted to the atmosphere (not expressly shown). If $CO_2$ is used, cold $CO_2$ 124 may be sent to at least one adjacent energy-storage module, which may be system 300 in FIG. 4, for compression and storage or it may be sent to a GCS operation. Some of the gross generated electric power 12a may be used to power the one or more pumps 76 to move cool brine from at least one brine supply reservoir 78 via at least one brine production well 79, and/or cool brine 80a imported from at least one separate reservoir operation 80, and/or cool brine 129 from the conventional geothermal power system (i.e., Organic Rankin Cycle system 120). This cool brine 129 may be sent to one or more pumps 76 to generate cool pressurized brine that is injected into the storage reservoir 90 via one or more brine injection wells 81 to provide pressure support in the storage reservoir 90.

Two-Tank, Insulated, Pressurized, Aqueous Fluid Storage

Figure 6:
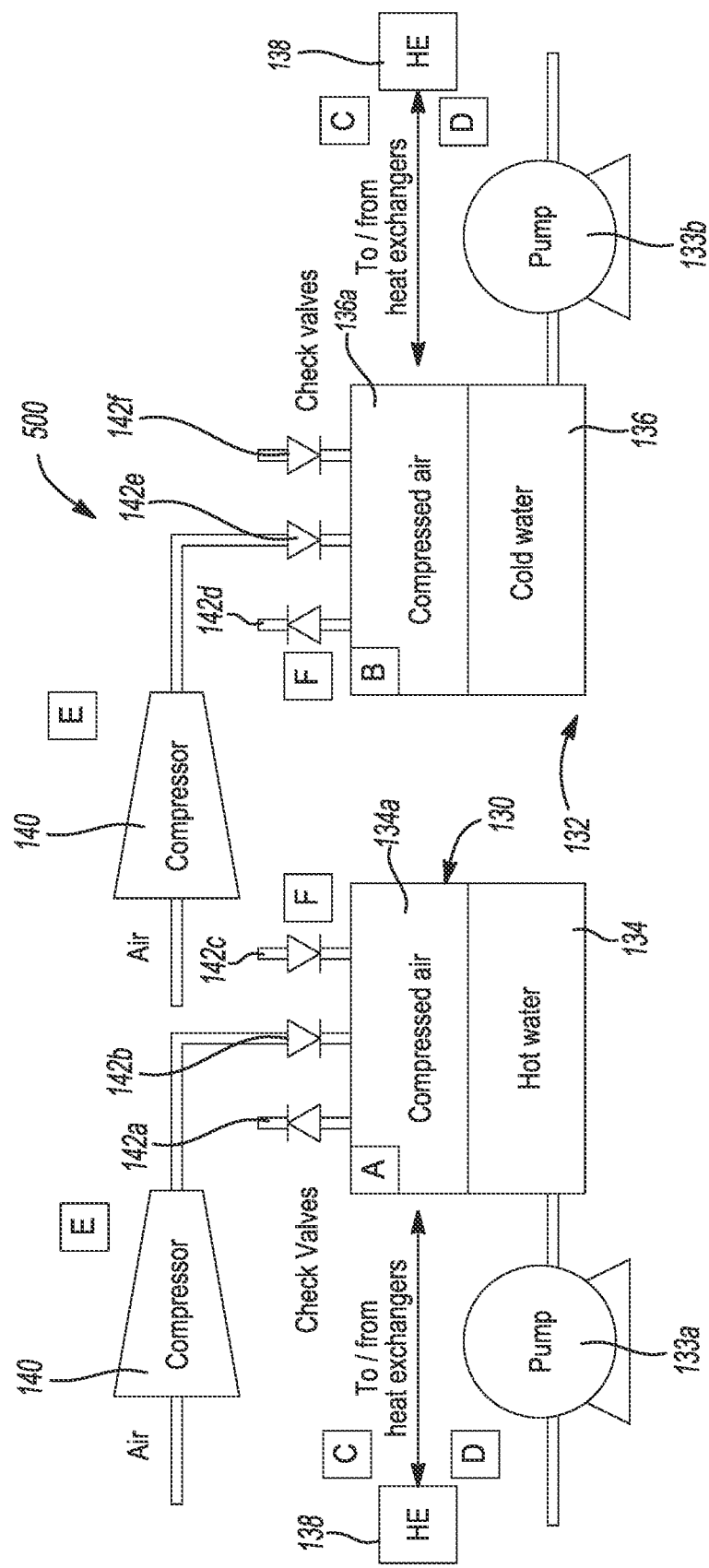
FIG. 6 shows another embodiment of the present disclosure relating to a two-tank, insulated, pressurized, hot aqueous fluid storage system.

Referring now to FIG. 6, a two-tank, insulated, pressurized aqueous fluid (water, brine, or mixtures thereof) storage system 500 in accordance with another embodiment of the present disclosure is shown. Components used in this embodiment which are in common with one or more previously described embodiments are denoted with the same reference numbers.

The system 500 makes use a pair of insulated tanks, one being a hot tank 130 and one being a cool tank 132. (While the following description refers to water, it will be understood that this includes water, brine, or mixtures thereof.) The hot tank 130 may be used to store hot water 134 and the cool tank 132 may be used to store cool water 136. Both of the tanks 130 and 132 also serve to store their respective quantities of water under pressurization. It should be noted that these tanks may be located entirely above-ground, or they can be located either partially or fully underground. The high-temperature, pressurized water 134 may be fed to one or more heat exchangers 138, arranged in a loop, to transfer stored thermal energy from the hot water 134 to a supplemental, non-aqueous fluid (e.g., $CO_2$, $N_2$, or air). Each tank 130 and 132 is partially filled with pressurized water (i.e., either hot water 134 or cool water 136) and partially filled with quantities of compressed air 134a and 136a, respectively. To circulate fluids between the hot and cool storage tanks 130 and 132, and the heat exchangers 138, the pressure in the cool tank 132 needs to be close to that of the hot tank 130. One or more pumps 133a,133b do most of the work required to circulate water through the heat exchangers 138. Air compressor(s) 140 is/are operated to maintain adequate pressure to prevent the hot water 134 from flashing to steam. Check valves 142a-142f may be used to protect the tanks 130 and 132 from over or under pressurization.

Thermal Earth Battery

To even further augment the above-described Earth Battery system 10, additional new aspects of thermal energy storage (TES) can be used to form new Earth Battery energy systems which even further augment and enhance the capabilities of the Earth Battery system 10 described above. Such Earth Battery energy systems may be deployed using mature steam-turbine or compressed air energy storage (CAES) technologies, as well as with emerging $CO_2$ power technology. Because TES is the primary means of energy storage in this new form of the Earth Battery energy systems, we refer to our new system as the Thermal Earth Battery.

In this regard, the Thermal Earth Battery energy systems which will be discussed in the following paragraphs are designed to be highly flexibly, capable of being adapted to a wide range of thermo-electric power systems, including nuclear energy (NE), fossil fuel energy (FE) or solar thermal energy (STE) power systems, as well as combinations of such power systems. The underlying principal is to employ "time-shifting" techniques to enable full utilization of the heat generated by any given thermo-electric power system, such as STE. Thus, during those times when excess energy is being produced, for example when excess electricity is being produced, the excess heat is stored underground, and/or possibly above-ground, rather than being immediately converted to electricity and sent either to an electric power grid or to bulk energy storage, such as battery storage. It should be noted that battery storage is less efficient and more expensive than using TES to time-shift when heat is converted to electricity to correspond to when it is demanded. Time shifting when available heat is converted to electricity enables full utilization of the heat generated by any given thermo-electric power system, such as STE, without resorting to less efficient and more costly energy-storage means, such as battery storage.

In addition to time-shifting heat sources, the Thermal Earth Battery energy systems can also time-shift from when natural gas (NG) is available to when electricity that can be generated by NG combustion is required by an electric power grid. This is useful in regions, such as the Permian Basin, where NG that is co-produced with oil production often does not have a market, and because it can be costly to re-inject NG back into the hydrocarbon reservoir, NG may be flared off with no energy-resource benefit. Time-shifting the energy contained in NG to correspond to periods of energy demand enables better utilization of that energy resource and avoids wasteful flaring of that resource, with the flaring generating $CO_2$ with no energy-resource benefit. Because the Thermal Earth Battery energy systems include provisions to capture and geologically sequester the $CO_2$ generated by NG combustion, they can be deployed as a zero-carbon energy system.

For STE, which is an IRE source, as well as for baseload, thermo-electric power plants, one goal of the present disclosure is to store heat either underground or above-ground whenever energy supply exceeds demand. This approach aims to prevent STE from being wasted and to allow thermo-electric power plants (baseload in particular) to continuously generate heat at the full rated thermal capacity. The overarching goal is for heat generated by low-carbon, thermo-electric power resources to be converted to electricity only when demand exceeds energy supply. Another underlying principal is to efficiently sequence the utilization of heat sources in power generation, starting with the lowest-grade heat source, then progressing to successively higher-grade heat sources. By doing this, the highest-grade heat source, which can come from the combustion of FE and/or biomass, can be utilized with the greatest incremental value to generating power. This sequencing process also allows each heat source to be utilized with the greatest incremental value for power generation.

The process of sequencing heat sources can leverage considerable value from marginal geothermal resources, geographically broadening where the Earth Battery energy systems can be implemented. The Earth Battery system 10 and the following new embodiments of the Earth Battery can be configured to include the use of emerging $CO_2$ power-system technology to (1) improve efficiency, (2) reduce water consumption, and (3) add $CO_2$-capture, use, and storage (CCUS) benefits of enhanced oil recovery and $CO_2$ sequestration. The Earth Battery system 10 and the following new embodiments thereof can be operated as a self-contained, zero-carbon energy system without importing NG and $CO_2$ over long pipelines to reduce GHG leakage risk.

Figure 7:
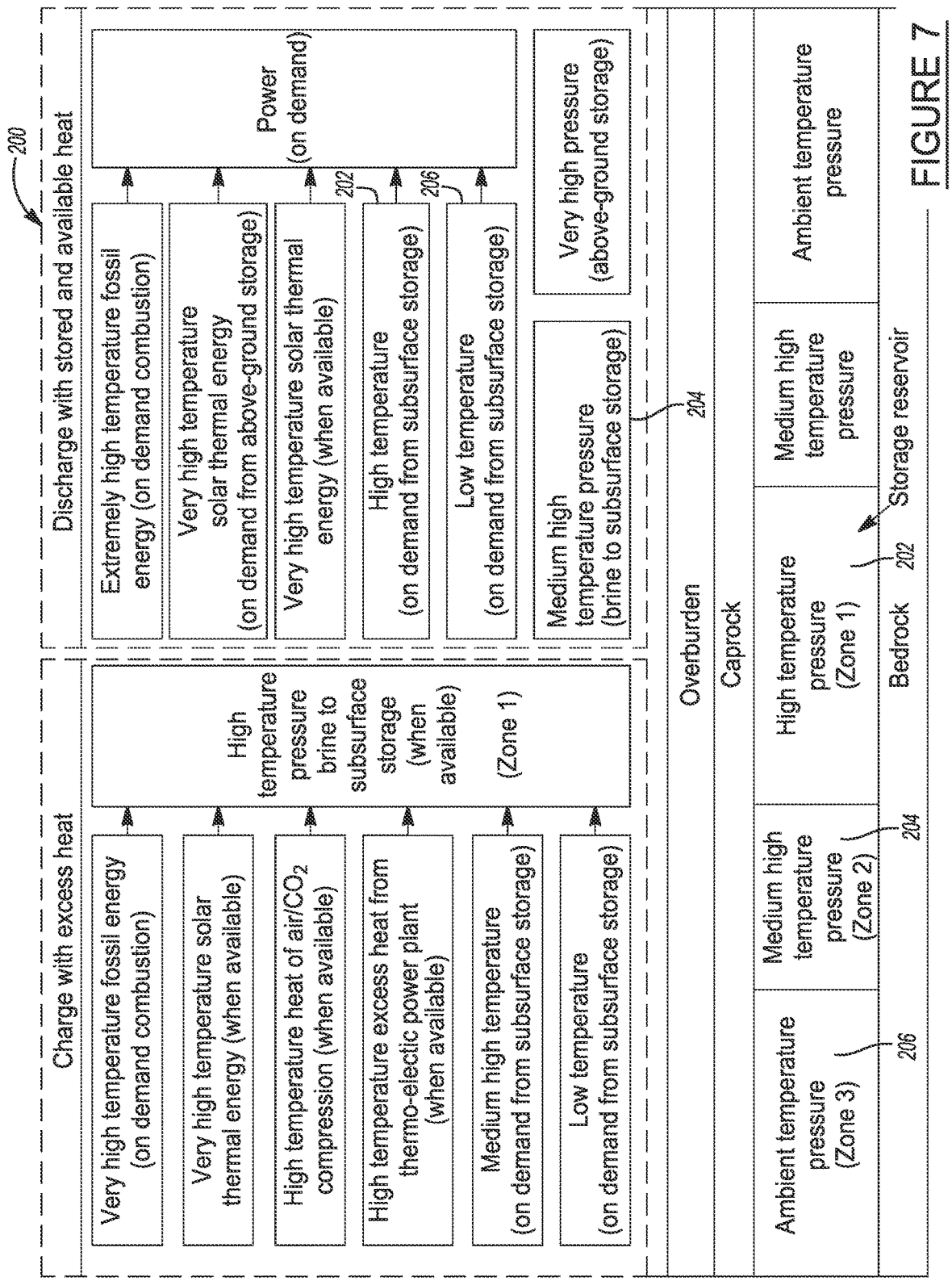
FIG. 7 is a high level block diagram showing another system in accordance with the present disclosure for storing excess energy as thermal energy in a plurality of distinct storage zones within a geologic region, and moving brine within the storage zones as needed to balance the quantities of different temperature stored brine.

Three-Zone, Heated Brine, Thermal Energy Storage with Sequencing of Heat Sources Referring to FIG. 7, a high level new thermal energy storage (TES) system called the Thermal Earth Battery system 600 is shown which converts hot brine to power with even greater efficiently, and with even less pressure oscillations, by using a plurality of distinct brine-temperature zones within a permeable reservoir formation. The system 600 is shown in one specific implementation as system 700 in FIG. 8. In the examples shown in FIGS. 7 and 8, the distinct brine-temperature zones are generally formed as distinct, concentric zones, preferably within a horizontally common permeable geologic region, which is overlain by an impermeable geologic region (also called the caprock as shown in FIG. 7), although some of the third zone (Zone 3) need not be within that horizontally common permeable geologic region. A key function for Zone 3 is to provide enough warm brine for the first and second zones (Zones 1 and 2) to function efficiently. To assure an adequate supply of warm brine, the systems 600 and 700 may also import supplemental brine from one or more separate sources (SBS 340 in FIG. 8), which can comprise a separate geologic formation or brine reservoir, including man-made structures. In this example, the Thermal Earth Battery system 600, and the specific Thermal Earth Battery system 700 implementation shown in FIG. 8, make use of three distinct concentric brine-temperature zones, as shown in both of FIGS. 7 and 8: (1) an inner Zone 1 (region 202) of hot, high-pressure brine having a temperature within a first temperature range; (2) an intermediate Zone 2 (region 204) of medium-hot, medium-high-pressure brine having a temperature within a second temperature range less than the first temperature range; and (3) an outer Zone 3 (region 206) of warm, ambient brine having a third temperature within a third temperature range less than the second temperature range. Furthermore, it will be appreciated that any reference herein to hot brine comprises high-temperature brine and any reference herein to medium-hot brine comprises medium-high-temperature brine. The first temperature range may typically be within a range of about 240° C.-300° C.; the second temperature range may typically be within about 180° C.-220° C., and the third temperature range may typically be within about 40° C.-200° C., although it will be appreciated that these ranges may vary somewhat.

There are several reasons for arranging the three brine-temperature zones in a concentric configuration, with the primary reason being pressure management. To avoid high-temperature brine from flashing to steam, it is necessary for the brine pressure to always exceed the saturation pressure, which, as is well known, increases with brine temperature. In the three brine-temperature-zone configuration the highest brine pressure is needed in the center where brine has the highest temperature. Thus, hot brine in Zone 1 requires a higher pressure than medium-hot brine in Zone 2. Warm ambient brine in Zone 3 does not require very high pressure to prevent that brine from flashing to steam. However, for Zone 2 to have high enough pressure to prevent medium-hot brine from flashing to steam, the pressure within the portion of Zone 3 that is adjacent to Zone 2 needs to be relatively high, compared to ambient pressure conditions. Thus, as described below in greater detail, it is preferred to re-inject cool brine in wells that are in Zone 3, but relatively close to Zone 2, so that enough pressure support is provided to prevent medium-hot and hot brine from flashing to steam in Zones 2 and 1, respectively. For pressurized hot brine to reach the heat exchangers and deliver heat to the power-generation equipment, it is important that pressurized hot brine not flash to steam within the (1) permeable geologic formation, (2) huff/puff wells, and (3) piping through which hot brine flows. Avoiding hot brine from flashing to steam in the huff/puff wells and piping is also needed to limit chemical scale and plugging of the wells and piping, as well as any equipment that may be in contact with the hot brine, such as the heat exchangers. It should also be noted that it is preferred that Zones 1 and 2 lie directly below an impermeable geologic region to contain the pressurized, buoyant medium-hot and hot brine.

The concentric configuration of three brine-temperature-zone zones is also aimed at limiting thermal losses that result from convective mixing of hot brine with ambient-temperature warm brine. Thus, hot brine in Zone 1 mixes with medium hot brine in Zone 2, rather than with warm ambient-temperature brine in Zone 3, while medium-hot brine in Zone 2 mixes with warm brine in Zone 3.

Figure 8:
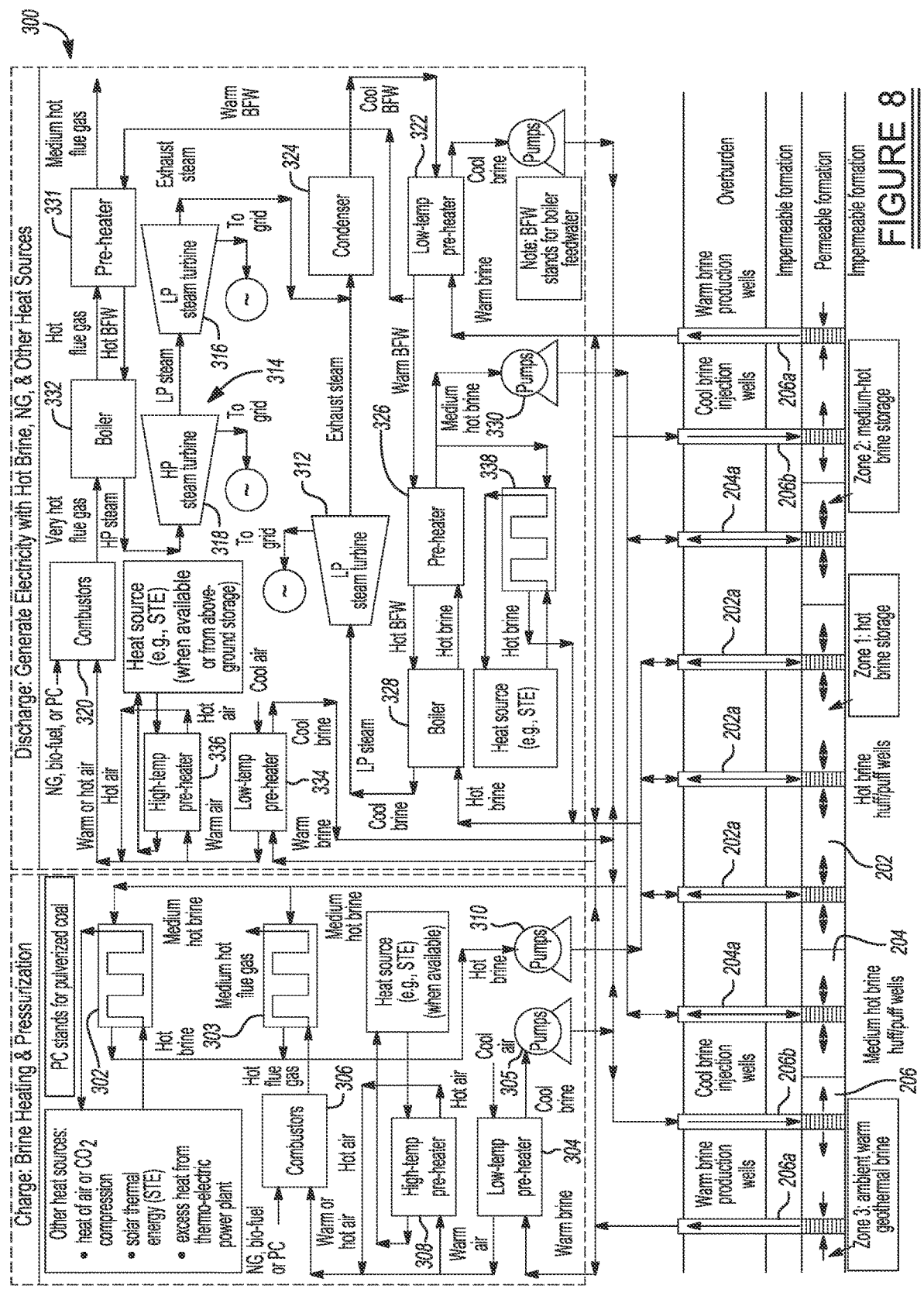
FIG. 8 is a more detailed block diagram of a system similar to that shown in FIG. 7 for storing excess energy in three distinct brine-temperature storage zones within a permeable geologic region.

Before steady-state, cyclical charge/discharge occurs, the systems 600 and 700 are charged by storing heat in two pre-steady-state charging stages (Stages 1a and 1b). The multiple stages in the Thermal Earth Battery systems 600 and 700, shown in FIGS. 7 and 8, are described below in greater detail.

Pre-Steady-State Stage 1a Charging

It should be noted that pre-steady Stages 1a and 1b are one-time processes, which are required prior to conducting the steady-state charge/discharge stages, which are conducted in a cyclical manner, as discussed below. Warm ambient geothermal brine is supplied from at least one of produced brine from Zone 3 (region 206 in FIGS. 7 and 8), via one or more production wells 206*a*, and imported brine, via one or more separate brine sources (SBS) 340, pressurized to medium-high pressure brine via one or more booster pumps 311 (FIG. 8), heated to medium-hot brine (e.g., 200° C.) using one or more heat exchangers 302,303, possibly pressurized further via one or more pumps 310, and injected using one or more huff/puff wells 202*a* into the center of Zone 1 (region 202). The heat exchangers 302,303 (FIG. 8) may use one or more heat sources such as combustion of FE and/or biomass, and/or STE, and/or excess heat from thermo-electric power plants. Also, during charging, warm ambient brine may be produced from Zone 3 (region 206), via one or more production wells 206*a*, and fed into one or more low-temperature pre-heaters 304 (called Low-temp pre-heaters in FIG. 8) to pre-heat cool air to warm air, which may be used as inlet combustion air in one or more FE combustors 306 (FIG. 8). It should be appreciated that although we refer to the combustors as FE combustors in the current discussion, they can also be used for the combustion of biomass. The one or more low-temperature pre-heaters 304 also generate cool brine that may be pumped via one or more pumps 305 into one or more cool brine injection wells 206*b* to be injected back into Zone 3 (region 206). The one or more cool brine injection wells 206*b* provide pressure support for Zones 1 and 2 (regions 202 and 204). It is preferred that one or more cool brine injection wells 206*b* be located close enough to Zone 2 to provide the pressure support needed to prevent hot and medium-hot brine from flashing to steam in Zones 1 and 2.

Collectively, the one or more FE combustors 306 may use one or more FE sources, such as pulverized coal (PC), biomass, or NG. If STE is available either directly or indirectly from either shallow below-ground or above-ground storage, it may be fed into one or more high-temperature pre-heaters 308 (called High-temp pre-heater in FIG. 8) to heat warm air to hot air, which may be used as inlet combustion air in one or more FE combustors 306. Hot flue gas leaving the one or more FE combustors 306 may be fed into one or more heat exchangers 303 to heat warm ambient brine produced from Zone 3 (region 206), via one or more production wells 206*a*, and/or brine imported from one or more separate brine sources 340, to either medium-hot brine or hot brine, which is injected via one or more pumps 310 into the center of Zone 1 (region 202), via one or more huff/puff wells 202*a*. Medium hot flue gas leaving one or more heat exchangers 303 may enter a $CO_2$-capture operation (not expressly shown) that generates $CO_2$-free flue gas and high-purity $CO_2$, which may be compressed for storage or export.

Pre-Steady-State Stage 1b Charging

Stage 1a described above is repeated with the change that during Stage 1b, warm geothermal brine is produced from Zone 3 (region 206) using one or more production wells 206*a*, pressurized to high-pressure brine via one or more booster pumps 311 (FIG. 8), heated to hot brine (e.g., 250° C.) using one or more heat exchangers 302,303, possibly pressurized further via one or more pumps 310, and re-injected into the center of Zone 1 (region 202) using one or more huff/puff wells 202*a*. The heat exchangers 302,303 may use a combination of heat sources, as in Stage 1a. Also, during charging, warm ambient brine may be produced from one or more production wells 206*a* of Zone 3 (region 206) and fed into one or more low-temperature pre-heaters 304 to pre-heat cool air to warm air, which may be used as inlet combustion air in the one or more FE combustors 306. Collectively, the FE combustors 306 may use one or more FE sources, such as PC, biomass, or NG. If STE is available either directly or indirectly from either shallow below-ground or above-ground storage, it may be fed into one or more high-temperature pre-heaters 308 to heat warm air to hot air, which may be used as inlet combustion air in one or more FE combustors 306. Hot flue gas leaving one or more FE combustors 306 may be fed into one or more heat exchangers 303 to heat warm ambient brine produced from Zone 3 (region 206), via one or more production wells 206*a*, and/or warm brine imported from one or more separate brine sources 340, to hot brine, which is pressurized via one or more pumps 310 and injected into the center region of Zone 1 (region 202), via one or more huff/puff wells 202*a*. Because high-pressure, hot brine is injected into the center of Zone 1, it displaces the medium-high-pressure, medium-hot brine radially outward, so that medium-high-pressure, medium-hot brine flows into Zone 2 (region 204), with Zone 1 then being fully occupied with high-pressure, hot brine (FIG. 8). After Zones 1 and 2 are charged with enough quantities of hot and medium-hot brine, respectively, the subsurface Thermal Earth Battery systems 600 and 700 are ready for steady-state charge/discharge operations.

Steady-State Stage 2 Charging

Medium-high-pressure, medium-hot brine is produced from the huff/puff wells 204a of Zone 2 (region 204), pressurized to high-pressure brine via one or more booster pumps 311 (FIG. 8), heated to high-pressure hot brine (e.g., 250° C.), using one or more heat exchangers 302,303 and a combination of heat sources, as in Stages 1a and 1b, possibly sent through one or more pumps 310, where it is further pressurized and re-injected back into the center of Zone 1 (region 202), via one or more huff/puff wells 202a. Also, during charging, warm ambient brine may be produced from Zone 3 (region 206) via one or more production wells 206a and fed into one or more low-temperature pre-heaters 304 to pre-heat cool air to warm air, which may be used as inlet combustion air in one or more FE combustors 306. Collectively, the FE combustors 306 may use one or more FE sources, such as PC, biomass, or NG. When STE is available either directly or indirectly from shallow below-ground or above-ground storage, it may be fed into one or more high-temperature pre-heaters 308 to heat warm air to hot air, which may be used as inlet combustion air in one or more FE combustors 306. Hot flue gas leaving the FE combustors 306 may be fed into one or more heat exchangers 303 to heat medium-hot brine produced from Zone 2 (region 204), via one or more huff/puff wells 204a, to hot brine, which, if necessary, is further pressurized via one or more pumps 310 before being injected into the center of Zone 1 (region 202), via one or more huff/puff wells 202a.

Steady-State Stage 3 Discharging

The discharge process may involve two parallel power-generating systems. The first power system is a low-pressure (LP) steam-turbine system 313 (FIG. 8), which is primarily heated with hot brine produced from Zone 1 (region 202). It may also be heated with STE, either directly when STE is available or indirectly with STE taken from shallow below-ground or above-ground storage. The second power system is a multi-stage, steam-turbine system 314, with at least LP steam turbines 316 and high-pressure (HP) steam turbines 318, and optionally medium-pressure (MP) turbines (not expressly shown). If one or more medium-pressure turbines are used, it/they may be placed in series between turbines 316 and 318.

The multi-stage LP-/HP-turbine power system 314 may be heated primarily by FE combustion. It may also be heated primarily by STE, either directly when STE is available or indirectly with STE taken from shallow below-ground or above-ground storage. It may also be heated by STE, either directly when STE is available or indirectly with STE taken from shallow below-ground or above-ground storage, before it is heated by FE combustion. Collectively, the FE combustors 320 may use one or more FE sources, such as PC, biomass, or NG. Both the LP-turbine power system 313 and multi-stage LP-/HP-turbine power system 314 may utilize warm ambient brine produced from Zone 3 (region 206) for pre-heating purposes. Warm ambient brine produced from Zone 3 may be fed into one or more low-temperature pre-heaters 322 to heat initially cool boiler feed water (BFW) that has exited condensers 324 to warm BFW. Warm BFW is fed to at least one of pre-heaters 326,331 where it is heated to hot BFW, using at least one of hot brine produced from Zone 1 (region 202), via one or more huff/puff wells 202a, and very hot flue gas from one or more FE combustors 320. Hot BFW is fed to at least one of boilers 328,332 and heated by at least one of hot brine produced by Zone 1, via one or more huff/puff wells 202a, and very hot flue gas from one or more FE combustors 320. For the LP-turbine power system 313, hot brine produced from Zone 1 (region 202) is used to heat hot BFW so that it becomes LP steam, which is fed to the LP steam turbine 312 where it is used to generate electricity, which is then sent to the grid 12. LP steam leaves the LP steam turbine 312 as an exhaust steam, which is sent to one or more condensers 324. At the condensers 324, it is cooled to become cool BFW. After hot brine leaves one or more pre-heaters 326, it has become medium-hot brine, which is pressurized via one or more pumps 330 to become medium-high-pressure, medium-hot brine and injected into Zone 2, using one or more huff/puff wells 204a. For the LP-/HP-turbine power system, hot BFW is created using one or more preheaters 331 which heats warm BFW received from one or more low-temperature pre-heaters 322 to become hot BFW. It is also possible to send the warm BFW leaving one or more low-temperature pre-heaters 322 through one or more high-temperature pre-heaters (not expressly shown), which is heated using a heat source such as STE, either directly when that heat is available or indirectly with that heat is taken from shallow below-ground or above-ground storage, to create hot BFW, which is then sent to one or more pre-heaters 331. Medium hot flue gas leaving pre-heater 331 may enter a $CO_2$-capture operation (not expressly shown) that generates $CO_2$-free flue gas and high-purity $CO_2$, which may be compressed for storage or export. The hot BFW enters one or more boilers 332 where it is turned into high-pressure (HP) steam, which is fed to one or more HP steam turbines 318. The HP steam turbine 318 uses the HP steam to generate electricity, which is then sent to the grid 12. HP steam exits the HP steam turbine 318 as LP steam, which is fed to one or more LP steam turbines 316 where it also generates electricity, which is then sent to the grid 12. Exhaust steam leaving one or more LP steam turbines 316 is sent to one or more condensers 324 where it cools and becomes cool BFW. The multi-stage LP-/HP-turbine power system 314 may use warm ambient brine to pre-heat inlet combustion air for one or more FE combustors 320. Warm ambient brine is produced using one or more production wells 206a from Zone 3 (region 206) and sent to one or more low-temperature pre-heaters 334 to heat cool air to warm air, which may be sent to one or more FE combustors 320. When STE is directly available, or when STE is taken from shallow below-ground or above-ground storage, it may be sent to one or more high-temperature pre-heaters 336 where it is used to heat warm air to hot air, which may be fed to one or more FE combustors 320. The LP-turbine power system 313 may also use STE. When STE is directly available or when STE is taken from shallow below-ground or above-ground storage, it may be sent to one or more heat exchangers 338 to heat medium-hot brine, which has exited one or more pre-heaters 326. This results in the medium-hot brine becoming hot brine, which is sent to one or more boilers 328 to heat hot BFW to LP steam, which is then sent to one or more LP steam turbines 312 to generate electricity which may be sent to the grid 12. Note that this may require one or more booster pumps 329 to pressurize the medium-hot brine prior to entering the one or more heat exchangers 338.

The new Thermal Earth Battery systems 600 and 700 with three brine-temperature storage zones can be operated as a zero-net-injection, closed-loop process with Zones 1 (region 202) and 2 (region 204) interacting like a piston. Because during steady-state Stage 2 charging, the rate at which high-pressure, hot brine enters Zone 1 can be specified to be the same as the rate at which medium-high-pressure, medium-hot brine leaves Zone 2, the systems 600 and 700 can be operated with no net change in the quantity of stored brine contained within Zones 1 and 2 at any time during the steady-state Stage 2 charging period. Furthermore, because during steady-state Stage 3 discharging, the rate at which high-pressure, hot brine leaves Zone 1 can be specified to be the same as the rate at which medium-high-pressure, medium-hot brine enters Zone 2, the systems 600 and 700 can be operated with no net change in the quantity of stored brine contained within Zones 1 and 2 at any time during the steady-state Stage 3 discharging period. Keeping a constant quantity of stored brine contained within Zones 1 and 2 limits the magnitude of pressure oscillations within these two storage zones during the cyclical charge/discharge process. An important outcome of this approach is that by limiting pressure oscillations, the risk of induced seismicity can be significantly reduced.

The various embodiments described herein all enable a plurality of different, possibly separated, possibly at different elevations, storage zones within the Earth be used to temporarily store heated and/or cooled brine and/or compressed air, N2, $CO_2$, or mixtures of N2 and $CO_2$. Another significant advantage is the system 10 makes highly efficient use of the wells by implementing most of the wells as huff/puff wells, which are used both for fluid injection and for fluid production. The heat of air, N2, and $CO_2$ compression can be used to heat brine, which can also be pressurized using excess electricity, and then stored in a reservoir within the Earth. When energy is needed, either air, N2, $CO_2$, or mixtures of N2 and $CO_2$, plus hot brine, may be produced, with any of these being pre-heated with hot brine before entering an expander, a NG turbine or a PC-, biomass-, or NG-fired N2/CO2 Brayton-cycle turbine, or any other power generating implement. For the Thermal Earth Battery systems 600 and 700, a significant advantage is that it only requires the storage of pressurized, hot brine or hot water for storing energy and dispatching it as electricity when it is demanded by an electric power grid. In the Thermal Earth Battery systems 600 and 700, produced hot brine can be used to heat boiler feedwater in a steam-turbine power system or to heat N2 or $CO_2$, or mixtures of N2 and $CO_2$, in an N2- or $CO_2$-turbine power system. The various embodiments of the present disclosure provide the benefit of short-duration energy storage via the compressed air energy storage NG-turbine system, along with combinations of short-duration, medium-duration and long-duration energy storage via the N2/$CO_2$ Brayton-cycle power system. Optionally, a steam turbine power system can also be used to provide combinations of short-duration, medium-duration and long-duration (seasonal) energy storage. Still another advantage of the system 10 is that it enables heat from other sources, such as a baseload thermo-electric power plant or solar thermal energy, to be stored along with heated fluids (e.g., heated brine), which were heated by the heat of air and/or $CO_2$ compression. Still another advantage of the systems 600 and 700 is that it can store the energy contained in excess natural gas in the form of pressurized hot brine, which can be stored along with heat from other sources. The various embodiments of this disclosure therefore can leverage a plurality of different energy sources simultaneously, and in various combinations, to heat a fluid which can be stored in the Earth for either short or long durations, for the purpose of more efficiently producing electrical power on an electric power grid when needed.

Figure 9:
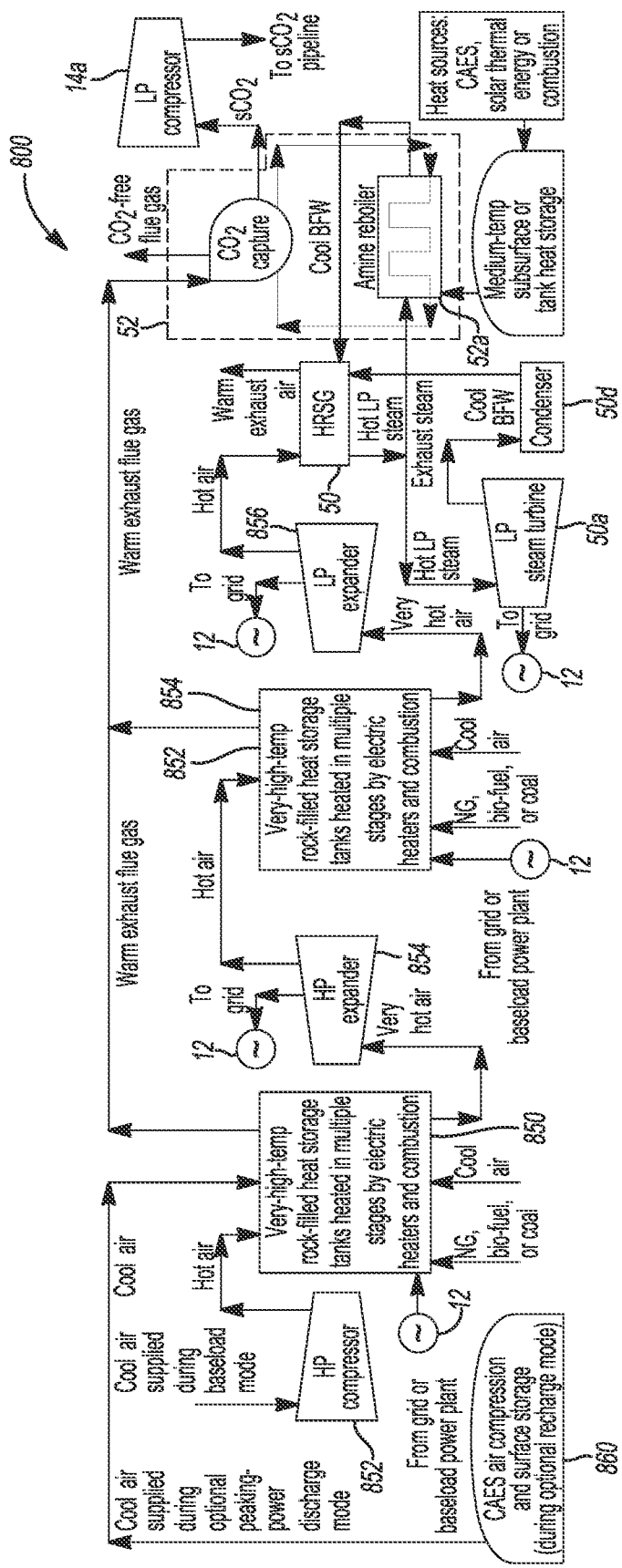
FIG. 9 is a high level block diagram of an embodiment of the compressed air energy storage (CAES) version of the Earth Battery of FIG. 1, which includes the option of operating in "baseload" mode where a high-pressure (HP) compressor is used to supply compressed air, rather than compressed air produced from the CAES subsurface storage reservoir, and which also incorporates the high-/very-high-temperature, thermal energy storage reservoir system to further enhance the overall efficiency of energy production of the CAES version of the system, and further illustrating with coded flow arrows the charge and discharge flows (high and low pressures, respectively) of the flows occurring in the overall system.
Figure 10:
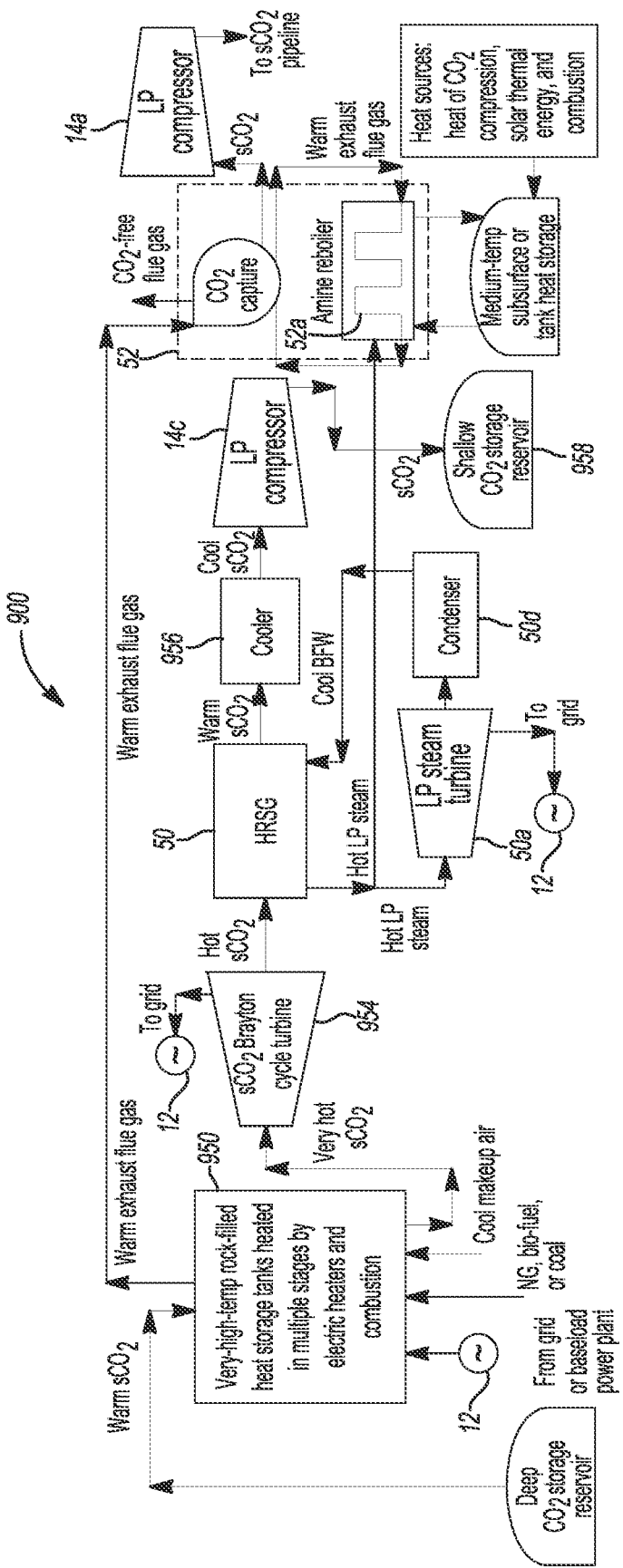
FIG. 10 is a high level block diagram of an embodiment of the $CO_2$ Brayton-cycle version of the Earth Battery of FIG. 2 which includes the high-/very-high-temperature, thermal energy storage reservoir system to further enhance the overall efficiency of energy production of the overall system, and further illustrating with coded flow arrows the charge and discharge flows during the charge and discharge modes of operation of the overall system.
Figure 11:
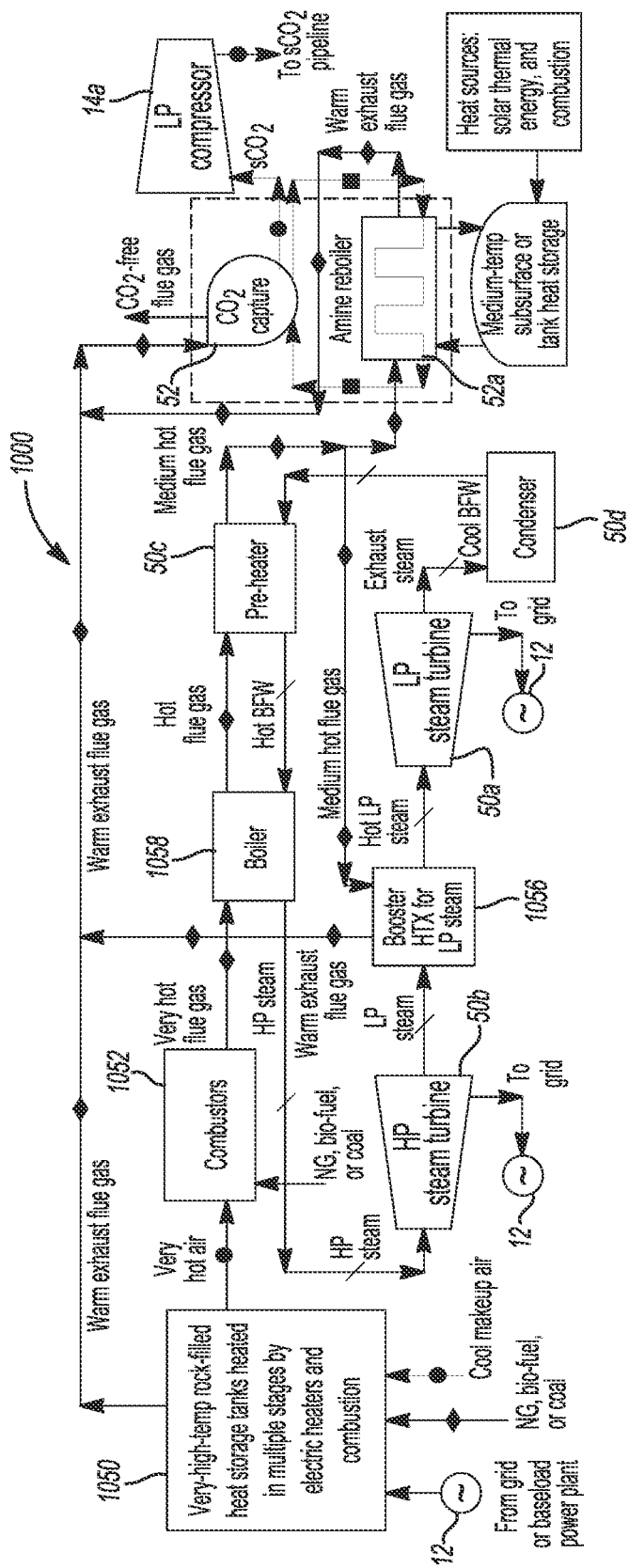
FIG. 11 is a high level process flow block diagram of an embodiment for a steam-turbine version of the Thermal Earth Battery of FIG. 8 which incorporates the high-/very-high-temperature, thermal energy storage reservoir system, and which also illustrates coded flow arrows to show the charge and discharge flows during charge and discharge modes of operation of the overall system.

Earth Battery Augmented with Thermal Energy Storage Granular-Medium-Filled Reservoirs Referring to FIGS. 9-11, further embodiments of a CAES Earth Battery system are shown. The embodiments of FIGS. 9-11 provide systems which meet present day challenges of providing low-cost, high-capacity energy storage by synergistically integrating conventional and renewable-energy resources, allowing each to contribute more efficiently to the grid than if operated independently.

In particular, the Earth Battery systems of FIGS. 9-11 provide large-scale, long-duration energy storage via a combination of bulk-energy-storage (BES) of excess electricity from the grid and power plants and thermal-energy-storage (TES) of various thermal resources, such as geothermal heat, solar thermal energy (STE), heat generated by nuclear energy (NE), the heat of air and $CO_2$ compression, and the heat of fossil energy (FE) combustion, as well as the heat of biomass combustion. These embodiments take advantage of the Earth's vast storage capacity, insulative properties, and ability to store fluids at high pressure (hundreds of bars) and intermediate temperature (up to ~270° C.), by storing heated pressurized brine in permeable geologic formations, overlain by impermeable caprocks. Such formations are found in hydrocarbon and saline reservoirs across much of the U.S. Above-ground, TES can use various approaches, such as medium-high temperature (up to ~565° C.) heat stored in tanks filled with hot (up to 565° C.) and cold (>260° C.) molten salt. Still another approach for high temperature, or very high temperature, TES is to use granular media, including sand or rocks, or even a mixture of sand and rocks, in reservoir storage devices (e.g., metal storage tanks). Sand and rocks are stable at very high temperature. For example, quartz sand melts to glass at temperature >1700° C. High temperature heat can be generated by electrical resistance heaters, while very high temperature heat can be generated by the heat of FE and biomass combustion. Earth-based granular materials offer the advantages of low cost and an abundant and readily available supply. The addition of above ground, high/very-high temperature TES means that the embodiments of the Earth Battery shown in FIGS. 9-11 can be deployed virtually anywhere, even in regions that do not have suitable geology for subsurface TES.

As will be discussed further in connection with the embodiment of FIG. 11, TES/HTX tanks can be used to retrofit a steam-turbine power plant for dispatchable electricity generation, to enable combustion and $CO_2$ generation to occur at a constant or specified rate, and to reduce thermal cycling. These TES/HTX tanks can also be applied to a gas peaker plant or a combined-cycle power plant (FIG. 9) to enable FE combustion to occur at a constant or specified rate, and to reduce thermal cycling. Because FE combustion can occur with minimal excess air, the concentration of $CO_2$ in the flue gas would be greater than in a conventional gas peaker or combined-cycle plant, which would reduce the cost of $CO_2$-capture. Continuous FE combustion at a constant rate allows for continuous $CO_2$ generation at a constant rate. This allows the $CO_2$-capture facility to be sized for the average electricity dispatch rate, rather than the peak dispatch rate, which would maximize the return on capital investment. For a CAES Earth Battery, the heat of air compression can be stored in the form of pressurized hot brine or hot water that may be used to supply the heat required for $CO_2$-capture. Thus, much of the power dispatched from a CAES Earth Battery power plant can be derived from excess electricity, which is used to compress and store air and to generate and store pressurized hot brine or hot water.

TES/HTX tanks can also be used in a $CO_2$ Earth Battery power plant (FIG. 10) for dispatchable electricity generation, to enable combustion and $CO_2$ generation to occur at a constant or specified rate, and to reduce thermal cycling. FE combustion may be implemented by using a conventional furnace that uses combustion air, or it instead may use the pressurized oxy-fuel combustion process that produces a high-purity stream of $CO_2$ in the flue gas.

Earth Battery technology can be used to upgrade a conventional steam-turbine power plant to become a cost-effective, zero-carbon power system that efficiently incorporates all forms of conventional and renewable energy whenever those sources are available, and allow electricity to be dispatched when it is demanded. Earth Battery technology can also be used to upgrade conventional gas-turbine and combined-cycle plants to become a cost-effective, zero-carbon power system that efficiently incorporates all forms of conventional and renewable energy sources whenever those sources are available, and allow electricity to be dispatched when it is demanded.

CAES Earth Battery with Combined-Cycle Power Generation

Referring now specifically to FIG. 9, a system 800 is shown for forming an Earth Battery which builds on the CAES Earth Battery 10 of FIG. 1 and uses additional resources to generate electricity for the power grid 12 using additional features and methods including high-/very-high-temperature, heat-storage reservoirs. Components shown in FIG. 9 which are common to those discussed in connection with FIG. 1 are designated using the same reference numbers used in discussing system 10 of FIG. 1.

Figure 9A:
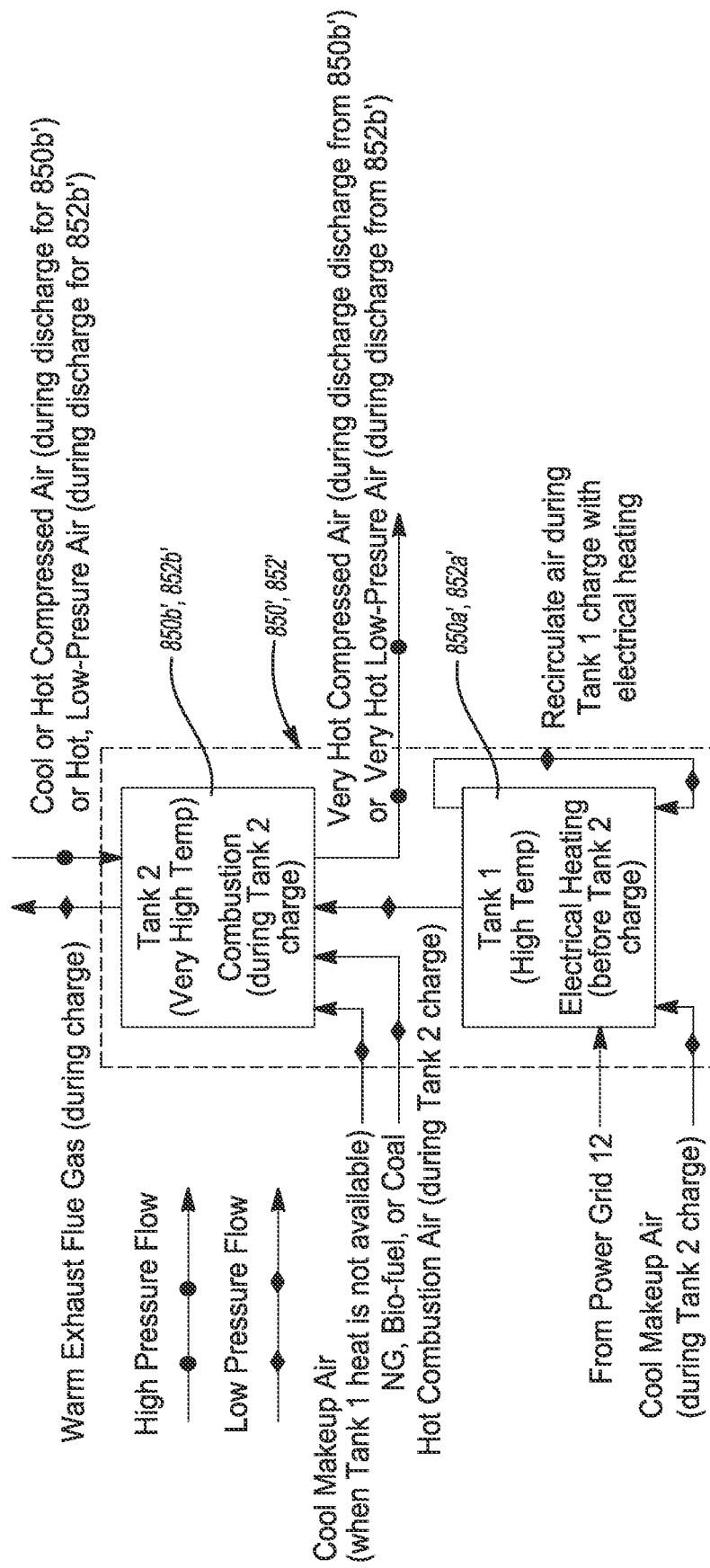
FIG. 9a shows an optional embodiment of the thermal energy storage reservoir system that employs a stack of two serially-connected, sand- and/or rock-filled tanks for the CAES version of the Earth Battery, a first tank operating as a high temperature thermal storage tank and which feeds a second tank operating as a very high temperature thermal storage tank.

The system 800 includes thermal storage reservoir systems 850 and 852, which can be used to further pre-heat the hot compressed air being supplied to a high-pressure (HP) expander 854 and a low-pressure (LP) expander 856, respectively. Each of the reservoir systems 850 and 852 will contain multiple (two or more) stacks of one, two or more distinct reservoirs that are arranged serially such that an output of one feeds another, and so forth. Multiple stacks of tanks are required because to enable continuous combustion there will always be at least one stack in charge mode until that stack is either partially or fully heated, while other stacks may be in discharge mode until the very-high-temperature heat contained in those stacks has been either partially or fully discharged. FIG. 9a shows such an embodiment of an individual stack of a multi-stack, multi-tank tank reservoir system 850' which incorporates independent, serially-connected first and second metal tanks forming separate reservoirs 850a' and 850b'. If at least two distinct reservoirs are formed by the reservoir system 850, then one (e.g., reservoir 850a') may form a high heat reservoir that outputs heated air to the input of a very high heat reservoir (i.e., reservoir 850b').

Referring to FIG. 9a, during the charge mode, reservoirs 850a' and 850b' may be heated successively in two stages. Optionally, reservoir 850b' may be heated in just one stage. During the first stage, reservoir 850a' may be heated with electrical heaters whenever excess electricity is available from the power grid 12. Air may be recirculated in reservoir 850a' to evenly distribute the heat. The second stage may begin after reservoir 850a' has been either partially or fully heated. During the second stage, cool makeup air is sent through reservoir 850a' to become hot combustion air, which is sent to reservoir 850b' where it is combusted with NG, biomass, or coal to form very-high-temperature flue gas that heats up the granular media in reservoir 850b' before the flue gas leaves reservoir 850b' as warm exhaust flue gas. If reservoir 850b' is heated in one stage, cool makeup air enters reservoir 850b' where it is combusted with NG, biomass, or coal to form very-high-temperature flue gas that heats up the granular media in reservoir 850b' before the flue gas leaves reservoir 850b' as warm exhaust flue gas.

Referring to FIG. 9a, during the discharge mode, cool compressed air from the CAES subsystem 860 or hot compressed air from the high-pressure HP compressor 858 enters reservoir 850b' where it is heated by the very-high-temperature heat stored in the granular media in reservoir 850b'. After it is heated by the granular media, very hot compressed air leaves reservoir 850b' and is sent to the high-pressure HP expander 854 where it is used to generate electricity for the grid 12.

Referring to FIG. 9a, reservoir system 852 may also be formed as a multi-stack, multi-tank reservoir system like that described above for reservoir system 850. The charge mode in reservoir system 852 is the same as that described above for reservoir system 850. The discharge mode in reservoir system 852 is similar to that described above for the reservoir system 850, but with the two following differences. Rather than being supplied by the cool compressed air from the CAES subsystem 860 or by the hot compressed air from the HP compressor 858, reservoir 852b' is supplied by the hot, low-pressure air that leaves the HP expander 854. After the hot, low-pressure air is further heated by the very-high-temperature granular media in reservoir 852b', very hot, low-pressure air leaves reservoir 852b' and is sent to the low-pressure LP expander 856 where it is used to generate electricity for the grid 12.

Each of the reservoir systems 850 and 852 (or reservoir tanks 850a' and 850b') may contain a thermal energy storage ("TES") medium that is able to store a large quantity of heat. For example, sand or rock may form the thermal storage medium, or even a combination of sand and rock may be used. Relatively small grain size is preferred for rapid thermal equilibration with the air or $sCO_2$ that is passing through. However, if the grain size is too small it will cause too much flow resistance, with the pressure loss decreasing system efficiency. The reservoir systems 850 and 852 may each be formed by one or more individual metal tanks, as noted above, which are filled with the selected thermal storage medium. For convenience, the following discussion of the operation of the system 800 will be made with reference to use of the reservoir systems 850 and 852.

The system 800 may operate in two distinct modes: a charge mode and a discharge mode. The system 800 shows flow arrows to help explain the flows for both the charge mode and the discharge mode. It will also be appreciated that the system 800 is for a compressed air energy storage (CAES) version of the Earth Battery system 10 of FIG. 1, which includes combined cycle power generation.

For the charge mode, air and flue gas flow under low pressure. For the discharge mode, compressed air flows under high pressure (e.g., typically, 100 bar or greater). Where local geologic conditions do not allow for a CAES subsystem 860, or when it is decided to operate the system in baseload mode (i.e., without the CAES subsystem 860), a high-pressure (HP) compressor 858 is used to supply compressed air in real time in place of the CAES subsystem 860. Some of the heat from the heat recovery steam generator (HRSG) 50 may be sent to amine reboilers 52a, which support the $CO_2$-capture system 52. Other medium-temperature heat sources for the $CO_2$-capture system 52 may include (1) heat of air compression from CAES, (2) solar thermal energy, (3) fossil fuel combustion, and (4) biomass combustion. The CAES subsystem 860 allows peaking power-discharge mode, which can discharge electricity at a higher rate than during the baseload mode, which uses compressed air supplied by the HP compressor 858, rather than compressed air supplied by the CAES subsystem 860. By "baseload" mode it is meant that the system is operating as a standard baseload power plant would, with no assistance from compressed air supplied from a CAES system, such as from the CAES subsystem 860 shown in FIG. 9.

The system of FIG. 9 also discloses that the HRSG 50 may incorporate a steam turbine system 50$a$ turbine and condenser 50$b$. The $CO_2$-capture system 52 may incorporate the $CO_2$-capture operation 52 and amine reboilers 52$b$. Furthermore, the option exists for using some or all steam from the HRSG 50 to supply heat to the amine reboilers 52$a$ used in the $CO_2$-capture process.

Cool air may enter the reservoir systems 850 and 852. Optionally, the reservoir system 850 may even be heated by electrical heaters powered by excess electricity from the grid 12 (as noted in FIG. 9$a$) or from a baseload power plant, which creates high temperatures in the sand and/or rock contained in the reservoir system 850.

Referring to FIGS. 1 and 9, very hot compressed air that leaves the reservoir system 850 may be used as combustion air for combustion in the NG-fired HP turbine 44 and the NG-fired LP turbine 42, respectively. The fossil fuel used to help heat the thermal storage medium in the reservoir system 850 may be biomass, NG, coal or virtually any other available fossil energy source. The sand, rock and/or sand/rock mixture in the reservoir system 850 serves as the TES storage medium.

Cool, makeup air may be sent to the reservoir systems 850 and 854 for combustion, which heats up the sand and/or rock in the reservoir system. Warm exhaust flue gas that leaves the reservoir systems 850 and 852 may be sent to the $CO_2$-capture system 52. The amine reboilers 52$a$, which supports the $CO_2$-capture system 52, may be heated by medium-temperature TES from either hot brine produced from a hot-brine storage reservoir or by hot brine or water from a hot brine/water two-tank system.

When hot brine from the subsurface hot-brine storage reservoir is used, it is possible to use seasonally-stored, medium-temperature heat to supply the heat needed by the amine reboilers 52$a$ throughout the year. This is particularly attractive for the case where solar thermal energy (STE) is the source of stored medium-temperature heat. The ability of the Earth Battery to store medium-temperature heat seasonally makes it possible for STE collected throughout the year to be available to supply the heat needed by the amine reboilers 52$a$ on a daily and hourly basis, regardless of whether the sun is shining. Thus, our technology enables STE, which is a VRE, to be utilized as a reliable energy source throughout the year, regardless of when it was collected and stored. Utilizing STE for the purpose of capturing $CO_2$ is very attractive, because it allows increased penetration of VRE without the typical burden that VRE imposes on electric grids.

The amine reboilers 52$a$ used in the $CO_2$-capture process, may also be pre-heated with warm geothermal brine prior to being heated by the hot brine and/or water. Nearly $CO_2$-free exhaust leaves the $CO_2$-capture system 52 and high-purity, cool $sCO_2$ is sent to the low-pressure (LP) compressor 14$a$ where it is compressed. Compressed $sCO_2$ leaving the LP compressor 14$a$ may be sent to a $sCO_2$ pipeline and/or a $sCO_2$ storage reservoir.

Cold, compressed air is produced from the CAES reservoir 860 and enters the reservoir system 850 where it becomes very hot compressed air by the time it is discharged. The very hot air leaves the reservoir system 850 and enters the HP expander 854, which is a fossil-fuel-free turbine, to generate electricity for the grid 12. The air leaves the HP expander 854 at reduced pressure and reduced temperature to form low-pressure (LP) hot air. The LP hot air enters the reservoir system 852 where it becomes very hot air. The very hot air enters the LP expander 856, which is a fossil-fuel-free turbine, to generate electricity for the grid 12. The air leaves the LP expander 856 at nearly atmospheric pressure and reduced temperature to form hot air. The hot air may enter the heat recovery steam generator (HRSG) 50, which is used to generate hot LP steam which is fed into the LP steam turbine 50$a$ to generate electricity for the grid 12. The air discharged from the HRSG 50 is cooled to warm exhaust air.

$CO_2$ Earth Battery

Referring now to FIG. 10, a system 900 is shown which augments the capabilities of the $CO_2$ Earth Battery system 100 of FIG. 2. Again, components in the system 900 in common with those of the system 100 will be denoted with the same reference numbers used to describe the system 100, and components in common with the system 800 will be denoted with the same reference number used to describe the system 800. The $CO_2$ Earth Battery system 100 (FIG. 2) combines energy resources to generate electricity for the grid 12, and further is adapted to use the additional features and methods described below to form the new system 900 of FIG. 10.

With reference to FIGS. 10 and 10$a$, as in the CAES Earth Battery system with combined-cycle power generation 800, a reservoir system 950, which may be the same in its construction, thermal storage medium, and operation as the reservoir system 850, is incorporated and operates in both of the above-described charge and discharge modes of operation. As is the case for the CAES Earth Battery, multiple (two or more) stacks of tanks are required because to enable continuous combustion there will always be at least one stack in charge mode until that stack is either partially or fully heated, while other stacks may be in discharge mode until the very-high-temperature heat contained in one or more of those stacks has been either partially or fully discharged. FIG. 10$a$ shows the two-stage heating process in an individual stack of serially-connected tanks for the $CO_2$ Earth Battery system.

Referring to FIG. 10$a$, during the charge mode, reservoirs 950$a'$ and 950$b'$ may be heated successively in two stages. Optionally, reservoir 950$b'$ may be heated in just one stage. During the first stage, reservoir 950$a'$ may be heated with electrical heaters whenever excess electricity is available from the power grid 12. Air may be recirculated in reservoir 950$a'$ to evenly distribute the heat. The second stage may begin after reservoir 950$a'$ has been either partially or fully heated. During the second stage, cool makeup air is sent through reservoir 950$a'$ to become hot combustion air, which is sent to reservoir 950$b'$ where it is combusted with NG, biomass, or coal to form very-high-temperature flue gas that heats up the granular media in reservoir 950$b'$ to very high temperature before the flue gas leaves reservoir 950$b'$ as warm exhaust flue gas. If reservoir 950$b'$ is heated in one stage, cool makeup air enters reservoir 950$b'$ where it is combusted with NG, biomass, or coal to form very-high-temperature flue gas that heats up the granular media in reservoir 950$b'$ before the flue gas leaves reservoir 950$b'$ as warm exhaust flue gas.

Referring to FIG. 10$a$, during the discharge mode, sCO2 enters reservoir 950$b'$ where it is heated by the very-high-temperature heat stored in the granular media in reservoir 950$b'$. After it is heated by the granular media, very hot $sCO_2$ leaves reservoir 950*b*' and is sent the sCO$_2$ Brayton-cycle turbine 954 where it is used to generate power for the grid 12.

Figure 10A:
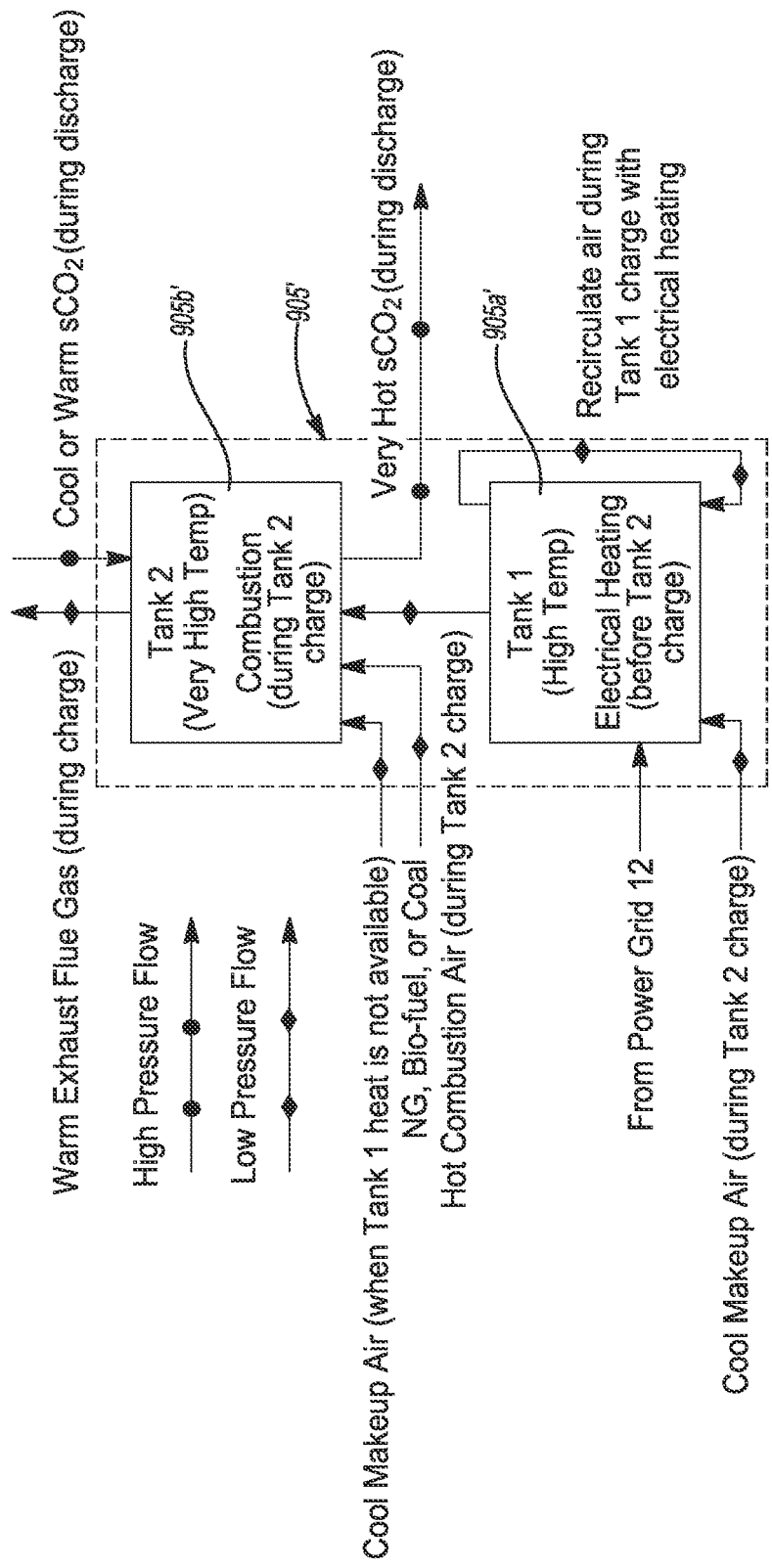
FIG. 10a shows an optional embodiment of the thermal energy storage reservoir system that employs a stack of two serially-connected, sand- and/or rock-filled tanks for the $CO_2$ Brayton-cycle version of the Earth Battery, a first tank operating as a high temperature thermal storage tank and which feeds a second tank operating as a very high temperature thermal storage tank.

FIGS. 10 and 10*a* show the process flow for both the charge and discharge mode with the CO$_2$ Brayton-cycle version of the Earth Battery (i.e., the underlying system 100 of FIG. 2). For the charge mode, air and flue gas flow under low pressure. For the discharge mode, sCO$_2$ flows under high pressure. Some of the heat from the HRSG 50 may be sent to the amine reboilers 52*a* used in the CO$_2$-capture process. Other medium-temperature heat sources for CO2-capture may include solar thermal energy, heat of CO$_2$ compression, and fossil fuel combustion.

For the charge mode, FE combustion occurs in the tank of the reservoir system 950, with very hot flue gas flowing through the reservoir system from bottom to top under low pressure as shown in the drawings of FIG. 10 and FIG. 10*a*. For the discharge mode, the tank of the reservoir system 950 may be filled with sCO$_2$, which flows from top to bottom under very high pressure (e.g., typically, 100 bar or more).

The flue gas loop for the charge mode is also indicated in FIGS. 10 and 10*a*. Cool air may enter the reservoir system 950 and may be optionally heated in multiple stages using electrical heaters powered by excess electricity from the grid 12 or from a baseload power plant, followed by combustion heating using NG, biomass, or coal as shown in FIG. 10*a*. Or, optionally, it may be heated in one stage by combustion using NG, biomass, or coal. The heating creates very high temperatures in the sand and/or rock contained in the reservoir system 950.

Warm exhaust flue gas that leaves the reservoir 950 may be sent to the CO$_2$-capture system 52. Optionally, the amine reboilers 52*a* used in the CO$_2$-capture process, may be heated by medium-temperature TES from either hot brine produced from a subsurface, hot-brine, storage reservoir or by hot brine or water from a hot brine/water two-tank system. The heat contained in the hot brine or hot water may also be used directly in the amine reboilers 52*a* used in the CO$_2$-capture process. Optionally, the amine reboilers 52*a* used in the CO$_2$-capture process may also be pre-heated with warm geothermal brine prior to being heated by the hot brine and/or water. Nearly CO$_2$-free exhaust leaves the CO$_2$-capture system 52 and cool, high-purity sCO$_2$ is sent to the LP compressor 14*a* where it is compressed. Compressed sCO$_2$ leaving the LP compressor 14*a* may be sent to a pipeline and/or a CO$_2$ storage reservoir.

The sCO$_2$ power cycle for the discharge mode is also shown in FIG. 10. Warm sCO$_2$ is produced from a deep, relatively-warm, CO$_2$ storage reservoir 952 and enters the reservoir system 950, and then flows through the reservoir system 950 where it becomes very hot sCO$_2$. Very hot sCO$_2$ leaves the reservoir system 950 and enters a sCO$_2$ Brayton-cycle turbine 954, which is a fossil-fuel-free turbine, to generate electricity for the grid 12. The sCO$_2$ leaves the sCO$_2$ turbine 954 at reduced pressure and temperature to form hot sCO$_2$.

The hot sCO$_2$ enters the heat recovery steam generator (HRSG) 50, where the hot sCO$_2$ is cooled to form warm sCO$_2$. Steam from the HRSG 50 is sent to the LP steam turbine 50*a* to generate electricity for the grid 12. The warm sCO$_2$ that leaves the HRSG 50 is input to a cooler 956, which turns it into cool sCO$_2$. The cool sCO$_2$ leaving the cooler 956 may then be sent to either a pump (not shown) where it is pressurized, or a LP compressor 14*c* where it is compressed, and sent to a CO$_2$ storage reservoir 958, which can be a shallow or deep reservoir. The purpose of using a shallow reservoir is to minimize the pumping or compression costs needed to store the sCO$_2$.

Thermal Earth Battery

Referring to FIG. 11, an Earth Battery system 1000 is shown which augments the Earth Battery system 700 of FIG. 8 through the use of a thermal energy storage reservoir system 1050. Components in common with the Earth Battery system 700 are shown in FIG. 11 using the same reference numbers, and components in common with those used to describe the system 700 are shown with the same numbers used in FIG. 8.

The reservoir system 1050, shown in FIG. 11*a*, may be similar to the reservoir system 850 described hereinbefore, shown in FIG. 9*a* and the reservoir system 950, shown in FIG. 10*a*. One noteworthy difference is that during discharge, reservoir system 1050 operates under low-pressure conditions (e.g., <10 bar), rather than under high-pressure conditions (100 bars or greater) for reservoir systems 850 and 950. The Earth Battery system 1000 combines energy resources to generate electricity for the grid using the reservoir system 1050 and may operate in the charge and discharge modes in a similar manner as described herein for the Earth Battery systems 800 and 900.

As described above for the reservoir system 850 and in connection with FIG. 9*a*, the reservoir system 1050 shown in FIG. 11*a* may also be formed from two or more stacks of serially-connected metal tanks. FIG. 11*a* shows one stack of serially-connected tanks for the Thermal Earth Battery. Multiple stacks of tanks are required because to enable continuous combustion there will always be at least one stack in charge mode until that stack is either partially or fully heated, while other stacks may be in discharge mode until the very-high-temperature heat contained in one or more of those stacks has been either partially or fully discharged. Continuous combustion at a constant rate generates a continuous and constant-rate stream of CO$_2$, which enables the full and continuous utilization of the amine reboilers 52*a* and the CO$_2$-capture system 52.

Referring to FIG. 11*a*, during the charge mode, reservoirs 1050*a*' and 1050*b*' may be heated successively in two stages. Optionally, reservoir 1050*b*' may be heated in just one stage. During the first stage, reservoir 1050*a*' may be heated with electrical heaters whenever excess electricity is available from the power grid 12. Air may be recirculated in reservoir 1050*a*' to evenly distribute the heat. The second stage may begin after reservoir 1050*a*' has been either partially or fully heated. During the second stage, cool makeup air is sent through reservoir 1050*a*' to become hot combustion air, which is sent to reservoir 1050*b*' where it is combusted with NG, biomass, or coal to form very-high-temperature flue gas that heats up the granular media in reservoir 1050*b*' before the flue gas leaves reservoir 1050*b*' as warm exhaust flue gas. If reservoir 1050*b*' is heated in one stage, cool makeup air enters reservoir 1050*b*' where it is combusted with NG, biomass, or coal to form very-high-temperature flue gas that heats up the granular media in reservoir 1050*b*' before the flue gas leaves reservoir 1050*b*' as warm exhaust flue gas.

Referring to FIG. 11, warm exhaust flue gas that leaves the reservoir system 1050 is sent to CO$_2$-capture system 52, which forms cool, high-purity sCO$_2$ and nearly CO$_2$-free exhaust that leaves the CO$_2$-capture system 52. Cool sCO$_2$ that leaves the CO$_2$-capture system 52 is sent to the LP compressor 14*a*. Cool sCO$_2$ that leaves the LP compressor 14*a* may be sent to a CO$_2$ storage reservoir and/or a sCO$_2$ pipeline.

Referring to FIG. 11*a*, during the discharge mode, cool makeup air enters reservoir 1050*b*' where it is heated by the very-high-temperature heat stored in the granular media in reservoir 1050b'. After it is heated by the very hot granular media, very hot air leaves reservoir 1050b' and is sent to the combustors 1052, shown in FIG. 11, where it is used as very-high-temperature combustion air for the combustion of fossil fuel, which can be NG, biomass, or coal. The combustors 1052 generate very high temperature flue gas, which is sent through the very hot flue gas loop, which heats the boiler feedwater (BFW)/steam loop as described below.

The very hot flue gas loop is shown as arrows with diamond-shaped indicators in FIG. 11. The BFW/steam loop is shown as arrows with slanted lines in FIG. 11. Very hot flue gas that leaves the combustors 1052 is sent to the boilers 1058 where it creates high-pressure (HP) steam and forms hot flue gas. The HP steam is sent to HP steam turbines 50b where it generates electricity for the grid 12 and forms low-pressure (LP) steam. Hot flue gas that leaves the boilers 1052 is sent to the pre-heaters 50c where it heats cool BFW to become hot BFW and forms medium hot flue gas. The hot BFW is sent to the boilers 1052 and some or all of the medium hot flue gas is sent to the booster HTX 1056, which may be used to boost the steam temperature between steam-turbine stages, such as between the high-pressure (HP) steam turbine 50b and the low-pressure (LP) steam turbine 50a. Optionally, some or all of the medium hot flue gas that leaves the pre-heater 50c may be sent to supply heat required by the amine reboilers 52a used in the $CO_2$-capture process. Optionally, the amine reboilers 52a that support the $CO_2$-capture system 52 may be heated by medium-temperature TES from either hot brine produced from a subsurface, hot-brine storage reservoir or by hot brine or hot water from a hot brine/water two-tank system. Also, optionally, the amine reboilers 52a used in the $CO_2$-capture process, may be pre-heated with warm geothermal brine prior to being heated by the hot brine and/or hot water.

Referring to FIG. 11, LP steam that leaves the HP turbine 50b may be sent directly to the LP turbine 50a where it is used to generate electricity for the grid 12 and to form exhaust steam that is sent to the condensers 50d where it becomes cool BFW. Optionally, LP steam that leaves the HP turbine 50b may be sent to the booster HTX 1056 where it becomes hot LP steam that is sent to the LP turbine 50a where it is used to generate electricity for the grid 12 and to form exhaust steam that is sent to the condensers 50d where it becomes cool BFW. Cool BFW that leaves the condensers 50d is sent to the pre-heaters where it is heated by hot flue gas to become hot BFW.

While not expressly shown in FIG. 11, when electricity is not being generated, high-temperature or very-high-temperature air may be recirculated between reservoir system 1050 and the combustors to maintain high enough temperatures in the combustors to mitigate thermal cycling. This enables the power system to quickly ramp up to create steam and to generate electricity when it is demanded.

While not expressly shown in FIG. 11, when electricity is not being generated, thermal cycling is mitigated by recirculating medium hot BFW between the medium-temperature subsurface reservoir or two-tank TES system and the pre-heaters and boilers.

In addition to steam turbines, the system 1000 may incorporate the option of using organic Rankine cycle (ORC) turbines and replacing BFW with an organic fluid, such as isopentane, or refrigerants, such as Freon. This option allows the Thermal Earth Battery system 1000 to operate efficiently at lower temperatures, when local conditions may dictate that.

Oxy-Combustion, Zero-Carbon and Negative Carbon Power and Heat Generation

Producing electric power from carbon neutral sources has been gaining significant interest in recent years. To attain carbon neutrality, in addition to zero-carbon technologies, negative-carbon technologies are also needed, which can include those that capture $CO_2$ directly from air and those that generate biofuels from biomass, such as in hydrogen fuel-cell technology, which can be used to power transportation. The systems and methods in the present disclosure can be used to provide new zero-carbon and negative-carbon pathways needed to achieve carbon neutrality. One such new zero-carbon and negative-carbon pathway that can be implemented by the present disclosure is to enable greater penetration of variable renewable energy (VRE) on grids. Rather than storing the excess electricity from VRE, the excess electricity is directly used to power air separation units (ASUs) and $CO_2$ compressors needed to generate zero-carbon and negative-carbon electricity on demand. This capability can be used instead of bulk energy storage (BES), such as battery storage. Because excess electricity is directly used for a valuable function, this eliminates the conversion and degradation losses inherent to BES. Rather than storing or wasting electricity generated by VRE during periods of oversupply, its direct, immediate use enables the delivery of zero-carbon and negative-carbon electricity when it is needed, including periods of high demand. This will assure a continuous, uninterrupted supply of zero-carbon and negative-carbon electricity, without resorting to BES.

Another pathway implemented by the present disclosure is the uninterrupted use of nuclear energy. A co-located nuclear-power facility, such as a small modular reactor, generates electricity continuously at its optimal design output. When there is excess electricity on the grid, the nuclear power facility has its power diverted to powering the ASUs and $CO_2$ compressors of the system described herein, thus allowing the generation of zero-carbon and negative-carbon electricity during periods of undersupply. The nuclear-power facility could be designed to deliver 100% of the power requirements for the ASU and $CO_2$ compressors. When there is a demand for electricity, the nuclear power facility delivers 100% of its power to the grid. Because the oxy-combustion system of the present disclosure can be configured to have its power output modulated, unlike nuclear power, the oxy-combustion power system can be operated to follow the load, while the co-located, nuclear-power facility can deliver electricity constantly at its optimal design output.

Still another pathway implemented by the present disclosure is expanded deployment of geothermal power. This is accomplished by using local geothermal resources (even those with relatively low temperatures) at a very high thermal efficiency (e.g., 35-40%) to pre-heat boiler feedwater (BFW), which reduces fuel consumption and the quantity of captured $CO_2$ that needs to be sent to a geological $CO_2$ storage (GCS) reservoir for zero-carbon or negative-carbon electricity.

Still another pathway implemented by the present disclosure is the expanded deployment of solar thermal energy (STE). Even if not strongly concentrated, STE can be used at a very high thermal efficiency (e.g., 35-40%) by boosting the temperature of boiler feedwater (BFW) before it is fed to a boiler to create steam for a steam turbine, which reduces fuel consumption and the quantity of captured $CO_2$ that needs to be sent to a GCS reservoir for zero-carbon or negative-carbon electricity.

Figure 12:
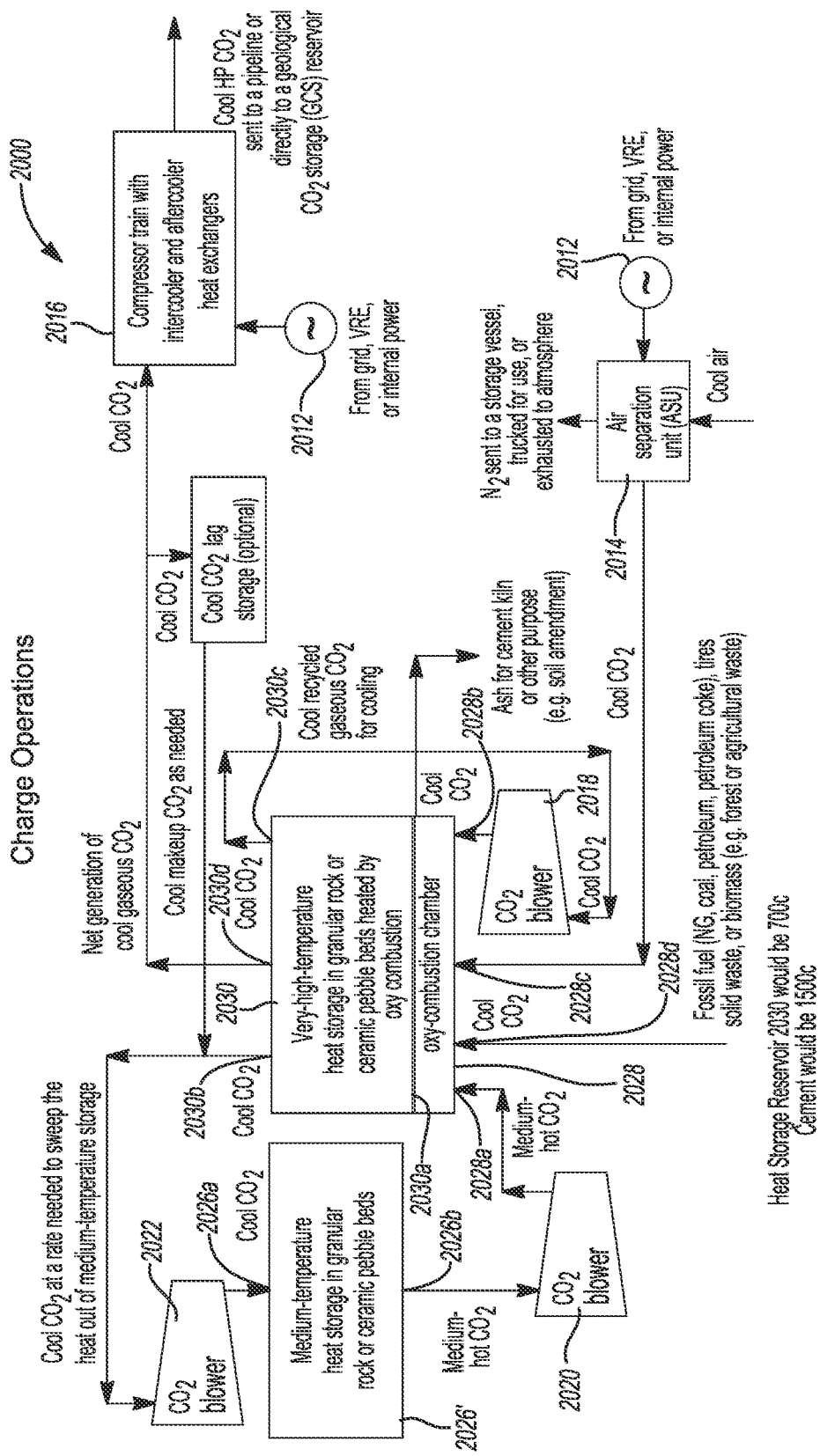
FIG. 12 is a high level block diagram of one embodiment of a system in accordance with the present disclosure, with operations labeled to explain a "charge" process with oxy-combustion that the system carries out.

Still another pathway implemented by the present disclosure is replacing carbon-emitting electricity and carbon-emitting transportation with zero-carbon electricity and zero-carbon transportation. For electricity generation, combustion with air is replaced with oxy-combustion. Also, combustion is moved from furnaces inside the power plant to outside the power plant in oxy-combustion chambers sitting beneath insulated heat-storage vessels filled with granular-rock or ceramic pebble beds that store high-grade heat (FIG. 12, to be discussed below). Although in the present disclosure we show the oxy-combustion chambers sitting beneath the insulated heat-storage vessels, there may be situations where it is preferred that the oxy-combustion chambers sit above, or possibly adjacent to, the insulated heat-storage vessels. It shall be also noticed that oxy-combustion chambers are also referred to as oxy-combustion furnaces in this disclosure and that they are meant to refer to the same component. Excess electricity, including excess electricity from VRE and nuclear energy, is directly and immediately used to power the ASUs needed to generate high-purity $O_2$. Electricity and excess electricity, including excess electricity from VRE, is also used to power the $CO_2$ compressors needed to send the $CO_2$ to a GCS reservoir. Combusting fossil fuel in high-purity $O_2$ generates high-purity $CO_2$, which is a pre-combustion, $CO_2$-capture process that captures 100% of the generated $CO_2$, without incurring an additional $CO_2$ separation cost. This is in contrast to post-combustion $CO_2$ capture systems, which can only capture about 90% of the generated $CO_2$ contained in the exhaust flue gas and which incur a large separation cost. The present system and method enables zero-carbon electricity to be dispatched on demand to electrical grids instead of electricity from carbon-emitting power plants, while zero-carbon electricity can be used to power (i.e., charge) electric vehicles and transportation systems that replace carbon-emitting vehicles and transportation systems.

Still another pathway enabled by the present disclosure is replacing carbon-emitting electricity and transportation with negative-carbon electricity and transportation. When biomass, including forest biomass, forest-waste biomass, agricultural-residue biomass, and municipal solid waste (MSW), replaces fossil fuel in an oxy-combustion power plant, negative-carbon electricity is generated, rather than zero-carbon electricity or carbon-emitting electricity from conventional power plants. The combustion of biomass, and the subsequent geologic sequestration of the generated $CO_2$, is a negative-carbon process because it prevents that biomass from naturally decaying, which would release $CO_2$ and methane (if attacked by termites) to the atmosphere. The combustion of MSW is also a negative-carbon process, because had that MSW been left in a landfill, it would degrade and release methane, which possibly could be emitted to the atmosphere. It should be noted that methane is a greenhouse gas (GHG) that is much more potent than $CO_2$ in trapping heat. When biomass or MSW displace natural gas from power production, the unused natural gas can remain underground, eliminating the possibility of methane leakage, which, as stated above, is a more potent GHG than $CO_2$. Negative-carbon electricity can be used to power electric vehicles and transportation systems instead of zero-carbon electricity; it can also be used in electric vehicles and transportation systems that replace carbon-emitting vehicles and transportation systems.

Figure 15:
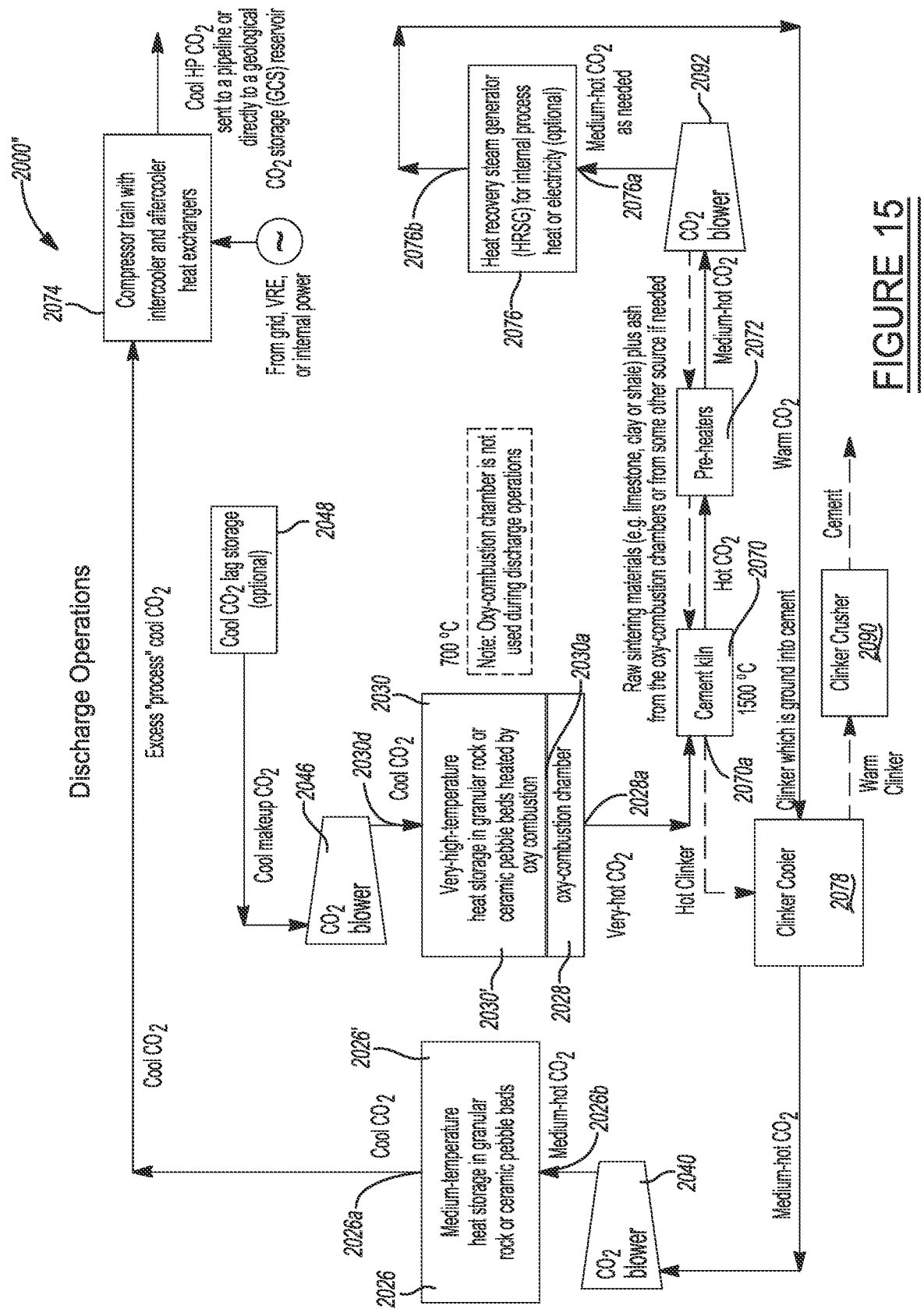
FIG. 15 is a high level block diagram of another embodiment of a system in accordance with the present disclosure which illustrate discharge operations undertaken for cement manufacture.

The systems and methods of this disclosure can be used to apply oxy-combustion, rather than combustion with air, for heavy industrial applications that require high-grade heat, such as cement manufacturing, which also generates "process" $CO_2$ from chemical processes (primarily the thermal decomposition of limestone). For cement manufacturing, combustion is moved from inside the cement kiln to outside the kiln in oxy-combustion chambers sitting beneath insulated heat-storage vessels filled with granular-rock or ceramic pebble beds that store high-grade heat (FIG. 12, to be discussed below). Although in the present disclosure we show the oxy-combustion chambers sitting beneath the insulated heat-storage vessels, there may be situations where it is preferred that the oxy-combustion chambers sit above, or possibly adjacent to, the insulated heat-storage vessels. Electricity and excess electricity, including excess electricity from VRE and nuclear energy, is used to power the ASUs used to generate high-purity $O_2$ for oxy-combustion of fuel mixtures, which may include coal, petroleum, petroleum coke, solid waste, tires, and biomass, to create hot, high-purity $CO_2$ to heat the granular beds. Electricity and excess electricity, including excess electricity from VRE and nuclear energy, is also used to power the $CO_2$ compressors needed to compress and send the high-purity $CO_2$ by pipeline to a GCS reservoir. Heat storage allows heat to be generated when it is advantageous, such as when there is excess electricity from VRE and nuclear energy, and/or the price of electricity to power the ASUs and compressors is low. Heat storage allows high-grade heat to be delivered continuously, enabling uninterrupted cement-plant operations. Very-hot $CO_2$ is sent through the kiln to heat and sinter the raw materials to form clinker, which is ground to cement (FIG. 15). Hot $CO_2$ leaving the kiln is sent to pre-heaters to pre-heat the raw materials, which may also include ash from the oxy-combustion chambers or from some other source. Medium-hot $CO_2$ leaving the pre-heaters is sent to a heat recovery steam generator (HRSG) to generate steam for process heat and/or to generate electricity from steam turbines, which cools the $CO_2$ to become warm $CO_2$. The warm $CO_2$ leaving the HRSG is sent to clinker coolers, where it cools hot clinker to become warm clinker, which heats the $CO_2$ to become medium-hot $CO_2$. The medium-hot $CO_2$ leaving the clinker coolers is sent to medium-temperature heat storage, which is part of the high-grade heat-storage system. It should be noted that this cooling process assures that no valuable heat is lost during the process of cooling the clinker, which reduces the fuel required to generate high-grade combustion heat. The medium-hot $CO_2$ transfers its heat to the granular media in the medium-temperature insulated heat-storage vessels, thereby being cooled before being compressed and sent by pipeline to a GCS reservoir.

Figure 13:
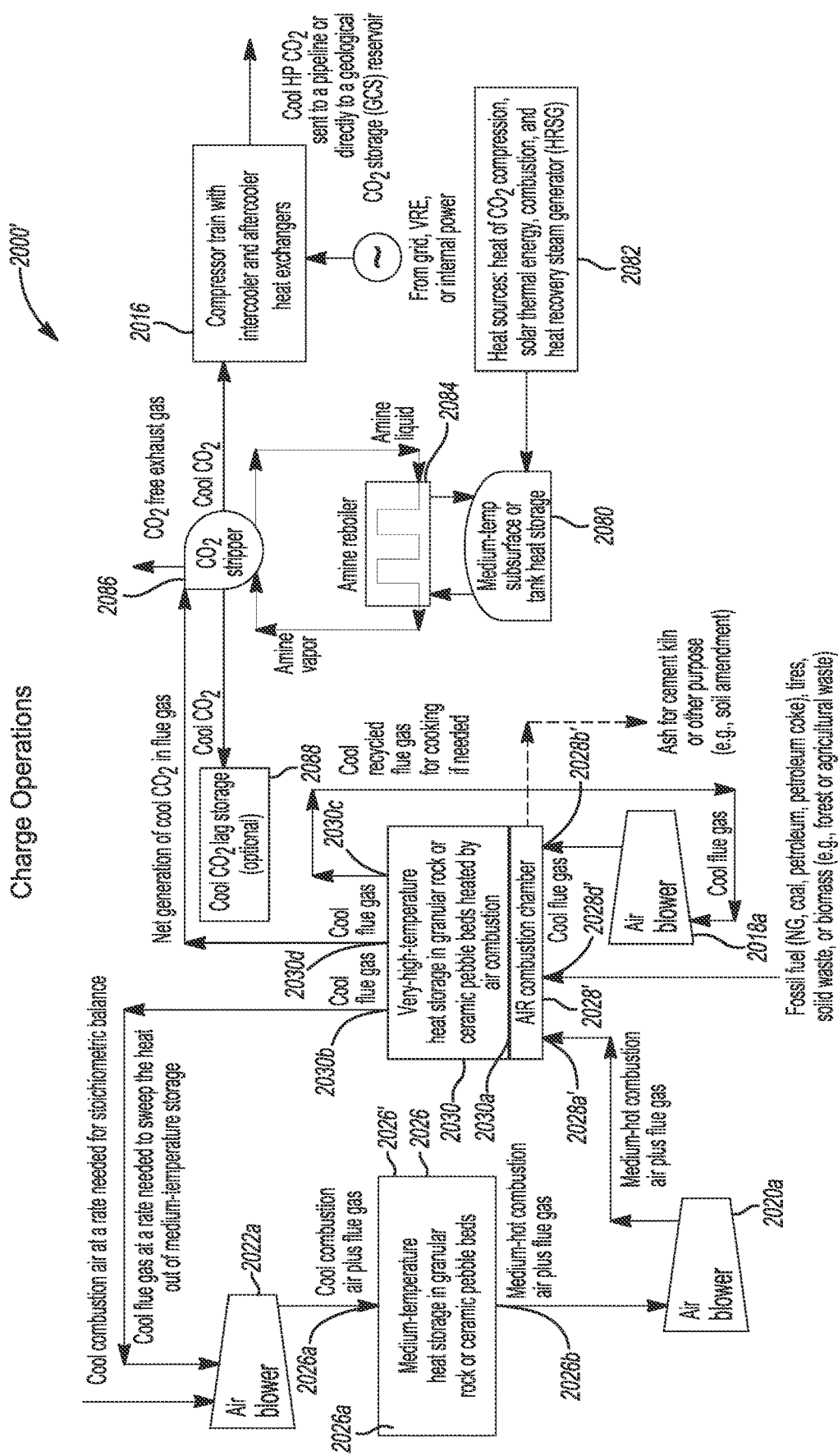
FIG. 13 is a high level block diagram of one embodiment of a system in accordance with the present disclosure, with operations labeled to explain a "charge" process with air combustion that the system carries out.

The systems and methods of this disclosure can be used to apply air-combustion of fossil fuel and/or biomass outside a power plant, rather than air-combustion of fossil fuel and/or biomass inside that power plant. For electricity generation, air-combustion is moved from furnaces inside a power plant to outside the power plant in air-combustion chambers sitting beneath insulated heat-storage vessels filled with granular-rock or ceramic pebble beds that store high-grade heat (FIG. 13, to be discussed below). Although in the present disclosure we show the air-combustion chambers sitting beneath the insulated heat-storage vessels, there may be situations where it is preferred that the air-combustion chambers sit above, or possibly adjacent to, the insulated heat-storage vessels. Electricity and excess electricity, including excess electricity from VRE and nuclear energy, may be used to power the $CO_2$ compressors needed to compress high-purity $CO_2$ after that $CO_2$ leaves $CO_2$ strippers (FIG. 13, to be discussed below). Solar thermal energy (STE) or excess STE may be used to supply the heat needed by amine reboilers used to strip $CO_2$ from flue gas. The combustion of biomass or MSW can also be used to supply heat to the amine reboilers. It should be appreciated that biomass or MSW combustion does not result in net $CO_2$ emissions because, had the biomass or MSW been allowed to naturally degrade, it would have released $CO_2$ and methane to the atmosphere.

Heat storage allows heat to be generated when it is advantageous, such as when there is excess STE to supply heat to the amine reboilers and/or when there is excess electricity from VRE or nuclear energy, and/or the price of electricity to power the $CO_2$ compressors is low. Heat storage allows high-grade heat to be delivered to the power plant to generate electricity when VRE electricity is not available, and/or the price of electricity is high. It is important to note that when the systems and methods of this disclosure are used to apply air-combustion of biomass or MSW outside a power plant to generate electricity, it is not necessary to capture any of the generated $CO_2$ in order to achieve zero $CO_2$ emissions because the $CO_2$ that is generated would have been emitted to the atmosphere as a result of natural decay processes. Regardless of whether oxy-combustion (FIG. 12) or air-combustion (FIG. 13) are used to charge (i.e., heat) the high-grade heat-storage system, the process of delivering high-grade heat to the electricity-generating power plant (FIG. 14) is exactly the same.

The systems and methods of this disclosure can be used to apply air-combustion of fossil fuel and/or biomass (for the purpose of generating high-grade heat for heavy industrial applications) outside an industrial plant, rather than air-combustion of fossil fuel and/or biomass inside that industrial plant. For cement manufacturing, air-combustion is moved from inside the cement kiln to outside the cement kiln in air-combustions chambers sitting beneath insulated heat-storage vessels filled with granular-rock or ceramic pebble beds that store high-grade heat (FIG. 13, to be discussed below). Electricity and excess electricity, including excess electricity from VRE and nuclear energy, may be used to power the $CO_2$ compressors needed to compress high-purity $CO_2$ after that $CO_2$ leaves $CO_2$ strippers (FIG. 13, to be discussed below). Solar thermal energy (STE) or excess STE may be used to supply the heat needed by amine reboilers used to strip $CO_2$ from flue gas. The combustion of biomass or MSW can also be used to supply heat to the amine reboilers.

Heat storage allows heat to be generated when it is advantageous, such as when there is excess STE to supply heat to the amine reboilers and/or when there is excess electricity from VRE and nuclear energy, and/or the price of electricity to power the $CO_2$ compressors is low. Heat storage allows high-grade heat to be delivered continuously, enabling uninterrupted cement-plant operations. It is important to note that when the systems and methods of this disclosure are used to apply air-combustion of biomass or MSW outside a heavy industrial plant to generate high-grade heat, it is not necessary to capture any of the generated $CO_2$ in order to achieve zero $CO_2$ emissions because the $CO_2$ that is generated would have been emitted to the atmosphere as a result of natural decay processes. Regardless of whether oxy-combustion (FIG. 12) or air-combustion (FIG. 13) are used to charge (i.e., heat) the high-grade heat-storage system, the process of delivering high-grade heat to the cement kiln (FIG. 15) is exactly the same.

Referring to FIG. 12, one embodiment of a system 2000 in accordance with the present disclosure is shown, which included a process flow description for carrying out a charge operation. For the charge operation, electricity, including excess electricity from a power grid 2012, or electricity from variable renewable energy (VRE) sources, nuclear energy, and excess electricity from the power plant itself, may be used to power at least one (but optionally more than one) air separation unit (ASU) 2014 and at least one (but optionally more than one) compressor train 2016. The compressor train 2016 typically may include one or more independent compressors, with each compressor followed by one or more independent intercooler or aftercooler heat exchangers. The ASU 2014 is used to obtain high-purity oxygen ($O_2$) from air. The high-purity oxygen (e.g., 95-99% pure) in this embodiment thus forms a "first gaseous medium".

The system 2000 also includes one or more $CO_2$ blower(s) 2018, 2020 and 2022. The $CO_2$ in this embodiment thus forms a "second gaseous medium". One or more $CO_2$ blower(s) 2022 assist in blowing cool $CO_2$ (e.g., 25-50° C.) into port 2026a of at least one (or optionally more than one) medium-temperature, insulated heat-storage vessel 2026, which is filled with a granular media such as granular-rock or ceramic-pebble beds, which had been heated to a medium-hot temperature (e.g., 320-360° C.) during an earlier discharge cycle, as discussed below. This operation drives medium-hot $CO_2$ (e.g., 320-360° C.) out of port 2026b at an opposite (medium-hot) end 26' of the vessel 2026 and, with the possible assistance of one or more $CO_2$ blower(s) 2020, into port 2028a of at least one (but optionally more than one) oxy-combustion chamber 2028. The oxy-combustion chamber 2028 is positioned beneath at least one (but optionally more than one) very-high-temperature insulated heat-storage vessel 2030. The very-high-temperature insulated heat-storage vessel 2030 is insulated and filled with a granular medium, for example and without limitation, granular-rock or ceramic-pebble beds.

With the assistance of one or more $CO_2$ blower(s) 2018, cool $CO_2$ (e.g., 25-50° C.), which leaves the top of the very-high-temperature insulated heat-storage vessel 2030 through port 2030c, is recirculated back into the oxy-combustion chamber 2028, through port 2028b, located at the bottom of the oxy-combustion chamber 2028, for temperature modulation of the flame temperature, as discussed below.

High-purity, cool O2 from the ASU 2014, entering through port 2028c, may be mixed with medium-hot $CO_2$ (e.g., 320-360° C.) entering through port 2028a, from the medium-temperature insulated heat-storage vessel 2026, and also with an additional fuel of choice (e.g., natural gas, coal, petroleum, petroleum coke, tires, solid waste, or biomass, such as forest biomass, forest-waste biomass, agricultural-residue biomass, and municipal solid waste, MSW) or a combination thereof, entering through port 2028d. Additionally, a sufficient amount of cool, recycled $CO_2$ is also blown into port 2028b, with the assistance of at least one $CO_2$ blower 2018, for temperature modulation of the flame temperature and thereby maintain the oxy-combustion chamber within a desired temperature range (e.g., 650° C.-700° C. for electricity generation and 1450° C.-1550° C. for cement manufacturing).

Fossil fuel, tires, solid waste, or biomass, or a combination thereof, enters through port 2028d and is combusted in high-purity $O_2$, which enters through port 2028c, inside the oxy-combustion chamber 2028 to create very-hot $CO_2$ and a very small quantity of water vapor within the desired temperature range (e.g., 650° C.-700° C. for electricity generation and 1450° C.-1550° C. for cement manufacturing), which is sent through port 2030a to at least one very-high-temperature, insulated heat-storage vessel 2030 to heat the one or more granular-rock or ceramic-pebble beds contained therein. The water vapor generated in the oxy-combustion process is easily separated from the $CO_2$ by condensation. This process advantageously creates a high-purity $CO_2$ stream and enables 100% of the combustion-generated $CO_2$ to be captured for geologic sequestration, without incurring a separation cost. It will be appreciated that for the present discussion, the terms "very-hot" and "highly heated" are intended to mean the same thing.

Combusting fossil fuel, solid waste, tires, or biomass, or a combination thereof, in high-purity $O_2$ creates a high flame temperature. To maintain a target combustion temperature (e.g., 700° C. for electricity, 1500° C. for cement manufacturing), additional $CO_2$ is recirculated through the one or more granular-rock or ceramic-pebble beds within the very-high-temperature insulated heat-storage vessel 2030 using the one or more $CO_2$ blower(s) 2018. Recirculation of $CO_2$ also helps to evenly distribute heat in the one or more granular-rock or ceramic-pebble beds contained within the very-high-temperature insulated heat-storage vessel 2030. The one or more granular-rock or ceramic-pebble beds are not fully heated during the high-grade, thermal-charging process. Heating continues until most (e.g., 80-85%) of the one or more granular-rock or ceramic-pebble beds have been heated to the target temperature (e.g., 700° C. for electricity, 1500° C. for cement manufacturing), which places the thermal front within 15-20% of the cool end (opposite the oxy-combustion chambers or adjacent ports 2030*b*, 2030*c*, and 2030*d*) of the one or more granular-rock or ceramic-pebble beds contained in the very-high-temperature insulated heat-storage vessel 2030. This assures that the downstream portion (e.g., 15-20%) of the one or more granular-rock or ceramic-pebble beds remains relatively unheated. This also ensures that $CO_2$ that exits the granular-rock or ceramic-pebble bed is relatively cool, thereby limiting the loss of heat as combustion-generated $CO_2$ is sent, through port 2030*d*, to the at least one compressor train 2016. The estimates of 80-85% and 15-20% cited above should be understood to be reasonable approximations. Cool combustion-generated $CO_2$ leaves the downstream portion of the one or more granular-rock or ceramic-pebble beds within the very-high-temperature insulated heat-storage vessel 2030 and is sent to the at least one compressor train 2016. The compressor train 2016 typically includes multiple compression stages and intercooler and aftercooler heat exchangers, placed after each compression stage, and produces $CO_2$ suitable for geologic sequestration. Cool high-pressure (HP) $CO_2$ (e.g., 25-50° C.) leaving the one or more aftercooler heat exchangers of the compressor train 2016 is either sent to a pipeline or sent directly to a geologic $CO_2$ storage (GCS) reservoir. If applicable, ash may be removed from the oxy-combustion chamber 2028 for use, if applicable and needed, in one or more cement kilns or for use for some other purpose, such as for soil amendment. Soil amendment may be applicable if agricultural-residue biomass, forest biomass, forest-waste biomass, or agricultural-residue biomass was used for oxy-combustion.

The system 2000 of the present disclosure also takes advantage of a closed-loop circulation path for the $CO_2$, which uses the $CO_2$ to transfer heat between the high-grade heat-storage system (shown in FIG. 12), which includes at least one medium-temperature insulated heat-storage vessel 2026, and at least one very-high-temperature insulated heat-storage vessel 2030, and either the electricity generation system (shown in FIG. 14), which includes at least one boiler plus heater assembly 2042 and, optionally, at least one booster heat exchanger 2044, or the cement-manufacturing system (shown in FIG. 15), which includes at least one cement kiln 2070 and at least one pre-heater 2072, both of which to be discussed below. Merely to avoid cluttering the drawing figure, only a single medium-temperature insulated heat storage-vessel 2026 and a single very-high-temperature insulated heat-storage vessel 2030 are shown. The purpose of this arrangement of medium-temperature and very-high-temperature insulated heat-storage vessels is for the closed $CO_2$ heat-transfer loop to operate between a high-grade temperature (e.g., 700° C. for electricity generation and 1500° C. for cement manufacturing) and a medium-grade temperature (e.g., 320-360° C. for electricity generation and 350-500° C. for cement manufacturing). When operated over this temperature range, more energy-efficient use of high-grade heat is possible for both electricity generation and heat-intensive industrial applications, such as cement manufacturing. The very-high-temperature insulated heat-storage vessel 2030 and the medium-temperature insulated heat-storage vessel 2026 are operated both in parallel and in series to allow the closed-loop recirculation of gaseous $CO_2$ to operate continuously during discharge operations. This makes it possible for medium-hot (e.g., 320-360° C.) gaseous $CO_2$ to always be returned to at least one of the medium-temperature insulated heat-storage vessels 2026. A separate, closed $CO_2$ temperature modulation loop is formed between the $CO_2$ blower 2018 and the very-high-temperature insulated heat-storage vessel 2030 which enables precise control over the temperature in the oxy-combustion chamber 2028.

Referring now to FIG. 13, the following description is for a charge operation with air-combustion. Thus, in this embodiment of FIG. 13, air forms the "first gaseous medium". Note that it has many similarities with a charge operation with oxy-combustion, described immediately above. Referring to FIG. 13, one embodiment of a system 2000' in accordance with the present disclosure is shown, which includes a process flow description for carrying out a charge operation using air. Components in common with the system 2000 have been denoted with the same reference numbers used in FIG. 12. For the charge operation, electricity, including excess electricity from the power grid 2012, or electricity from variable renewable energy (VRE) sources, nuclear energy, and excess electricity from the power plant itself, may be used by at least one (but optionally more than one) compressor train 2016. The compressor train 2016 typically may include one or more independent compressors, with each compressor followed by one or more independent intercooler or aftercooler heat exchangers. Additionally, medium-grade heat, such as from solar thermal energy (STE), including excess STE, may be used to heat amine re-boilers 2084, which heat amine liquid to form the amine vapor used by $CO_2$ strippers 2086 to strip $CO_2$ from flue gas.

The system 2000' also includes one or more air blower(s) 2018*a*, 2020*a* and 2022*a*. The air blower 2022*a* assist in blowing cool combustion air (e.g., 15-30° C.) into port 2026*a* of at least one (or optionally more than one) medium-temperature, insulated heat-storage vessel 2026, which is filled with a granular media such as granular-rock or ceramic-pebble beds, which had been heated to a medium-hot temperature (e.g., 320-360° C.) during an earlier discharge cycle, as discussed below. This operation drives medium-hot combustion air (e.g., 320-360° C.) out of port 2026*b* at an opposite (medium-hot) end 2026' of the vessel 2026 and, with the possible assistance of the air blower 2020*a*, into port 2028*a*' of at least one (but optionally more than one) air-combustion chamber 2028'. The air-combustion chamber 2028' is positioned beneath at least one (but optionally more than one) very-high-temperature insulated heat-storage vessel 2030. The very-high-temperature insulated heat-storage vessel 2030 is insulated and filled with a granular medium, for example and without limitation, granular-rock or ceramic-pebble beds.

With the possible assistance of the at least one air blower 2022*a*, a near-stoichiometric (or slightly greater) quantity of cool combustion air (e.g., 15-30° C.) is sent to port 2026*a* of the least one medium-temperature insulated heat-storage vessel 2026. The cool combustion air (e.g., 15-30° C.) is heated by the granular media contained therein to become medium-hot combustion air (e.g., 320-360° C.) that leaves port 2026*b* of the at least one medium-temperature storage vessel 2026.

The following describes the air-combustion process that occurs with the system 2000'. With the possible assistance of the at least one air blower 2020*a*, a near-stoichiometric (or slightly greater) quantity of medium-hot combustion air (e.g., 320-360° C.) leaving port 2026*b* of the at least one medium-temperature insulated heat-storage vessel 2026, is sent to port 2028*a'* of the least one air-combustion chamber 2028', where it is mixed with an additional fuel of choice (e.g., and without limitation, natural gas, coal, petroleum, petroleum coke, tires, solid waste, such as municipal solid waste (MSW), or biomass, such as forest biomass, forest-waste biomass, and agricultural-residue biomass) or a combination thereof, which has been sent to port 2028*d'* of the at least one air-combustion chamber 2028'. Additionally, with the possible assistance of the at least one air blower 2018*a*, a sufficient amount of cool, recycled flue gas (e.g., 25-50° C.) is also blown into port 2028*b'* for temperature modulation of the flame temperature to thereby help maintain the air-combustion chamber 2028' within a desired temperature range (e.g., 650° C.-700° C. for electricity generation and 1450° C.-1550° C. for cement manufacturing). If applicable, ash may be removed from the at least one air-combustion chamber 2028*a'* for use, if applicable and needed, in at least one cement kiln 70 (FIG. 4) or for use for some other purpose, for example and without limitation, soil amendment. Soil amendment may be applicable if agricultural-residue biomass, forest biomass, or forest-waste biomass was part of the fuel mix in the air-combustion process and no hazardous materials were included in the fuel mix.

Fossil fuel, tires, solid waste, or biomass, or a combination thereof, sent to port 2028*d'* of the at least one air-combustion chamber 2028' is combusted in a near-stoichiometric quantity of air. This creates very-hot flue gas and a very small quantity of water vapor within the desired temperature range (e.g., 650° C.-700° C. for electricity generation and 1450° C.-1550° C. for cement manufacturing), which is sent to port 2030*a* of the at least one very-high-temperature, insulated heat-storage vessel 2030 to heat at least one granular-rock or ceramic-pebble bed contained therein. The water vapor generated by the air-combustion process is easily separated from the flue gas by condensation. It should be noted that a near-stoichiometric quantity of air is desired for the air-combustion process in order to maximize the concentration of $CO_2$ in the flue gas and thereby enable the optional process of $CO_2$ stripping, which is described later, to be more efficient.

Combusting fossil fuel, solid waste, tires, or biomass, or a combination thereof, in a stoichiometric quantity of combustion air creates a high flame temperature. To maintain a target combustion temperature (e.g., 700° C. for electricity, 1500° C. for cement manufacturing), with the assistance of at least one air blower 2018*a*, additional cool flue gas (e.g., 20-30° C.) may be recirculated through at least one granular-rock or ceramic-pebble bed within the at least one very-high-temperature insulated heat-storage vessel 2030. Recirculation of flue gas also helps to evenly distribute heat in the at least one granular-rock or ceramic-pebble bed within the at least one very-high-temperature insulated heat-storage vessel 2030. The at least one granular-rock or ceramic-pebble bed is not fully heated during the high-grade, thermal-charging process. Heating continues until most (e.g., 80-85%) of the at least one granular-rock or ceramic-pebble bed within the at least one very-high-temperature insulated heat-storage vessel 2030 has been heated to the target temperature (e.g., 700° C. for electricity, 1500° C. for cement manufacturing). This places the thermal front within 15-20% of the cool end (opposite the air-combustion chambers or adjacent ports 2030*b*, 2030*c*, and 2030*d*) of the at least one granular-rock or ceramic-pebble bed contained in the at least one very-high-temperature insulated heat-storage vessel 2030. This assures that the downstream portion (e.g., 15-20%) of the granular-rock or ceramic-pebble bed remains relatively unheated. This also ensures that flue gas that exits port 2030*d* of the at least very-high-temperature insulated heat-storage vessel 2030 is cool (e.g., 20-30° C.), thereby limiting the loss of heat as flue gas is sent to at least one $CO_2$ stripper 2086.

It will be appreciated that the estimates of 80-85% and 15-20% cited above should be understood to be reasonable approximations. It shall also be noted that sending flue gas to at least one $CO_2$ stripper 2086 is an option. If biomass or MSW had been the fuel for air-combustion, it may have been deemed unnecessary to capture the generated $CO_2$ because that $CO_2$ would have been released to the atmosphere by natural degradational processes had that biomass and/or not been used for air-combustion.

With further reference to FIG. 13, a quantity of cool flue gas (e.g., 20-30° C.), corresponding to the net generation of flue gas from the at least one air-combustion chamber 2028', leaves port 2030*d*, which is at the downstream (cool) portion of the at least one granular-rock or ceramic-pebble bed within the at least one very-high-temperature insulated heat-storage vessel 2030, and is sent either to at least one $CO_2$ stripper 2086 or is exhausted to the atmosphere. The remaining portion of the cool flue gas (e.g., 20-30° C.) (if any) leaving the at least one very-high-temperature insulated heat-storage vessel 2030 exits through port 2030*b*. With the assistance of the at least one air blower 2022*a*, the cool flue gas (e.g., 20-30° C.) that leaves port 2030*b* is sent to port 2026*a* of the at least one medium-temperature, insulated, heat-storage vessel 2026, where the cool flue gas (e.g., 20-30° C.) is heated by the granular media contained therein to become medium-hot flue gas (e.g., 320-360° C.). The medium-hot flue gas is then mixed with medium-hot combustion air (e.g., 320-360° C.). Note that this process may not be necessary and that it is likely that the majority (if not all) of the gas leaving port 2026*b* of the at least one medium-temperature insulated heat-storage vessel 2026, will be medium-hot combustion air.

With further reference to FIG. 13, the following describes the optional process of stripping $CO_2$ from flue gas to form cool high-purity $CO_2$ (e.g., 20-30° C.). Medium-hot HP brine and/or water (e.g., 210-280° C.) from at least one of a subsurface reservoir and storage tank 2080, which contain stored heat from at least one of solar thermal energy and the heat of $CO_2$ compression, is sent to at least one amine reboiler 2084, where it is used to heat amine liquid to become amine vapor. Alternatively, heat can be sent directly to the at least one amine reboiler 2084 from a medium-temperature heat source 2082, for example and without limitation, solar thermal energy, heat of $CO_2$ compression, steam from a heat recovery steam generator, and the combustion of at least one of biomass and municipal solid waste. Amine vapor leaving the at least one amine reboiler 2084 is sent to at least one $CO_2$ stripper 2086, where it is used to strip $CO_2$ from flue gas. This process produces a stream of nearly $CO_2$-free exhaust gas, which is released to the atmosphere and a stream of cool high-purity $CO_2$ (e.g., 20-30° C.), which is sent to the at least one compression train 2016. The at least one compressor train 2016 typically includes multiple compression stages and intercooler and aftercooler heat exchangers, placed after each compression stage, and produces $CO_2$ suitable for geologic sequestration. Cool high-pressure (HP) $CO_2$ (e.g., 20-30° C.) leaving the one or more aftercooler heat exchangers of the at least one compressor train 2016 is either sent to a pipeline or sent directly to a geologic $CO_2$ storage (GCS) reservoir. A portion of the cool high-purity $CO_2$ (e.g., 20-30° C.) leaving the at least one $CO_2$ stripper 2086 may be sent to cool $CO_2$ lag storage 2088 for use during discharge operations, described later.

Figure 14:
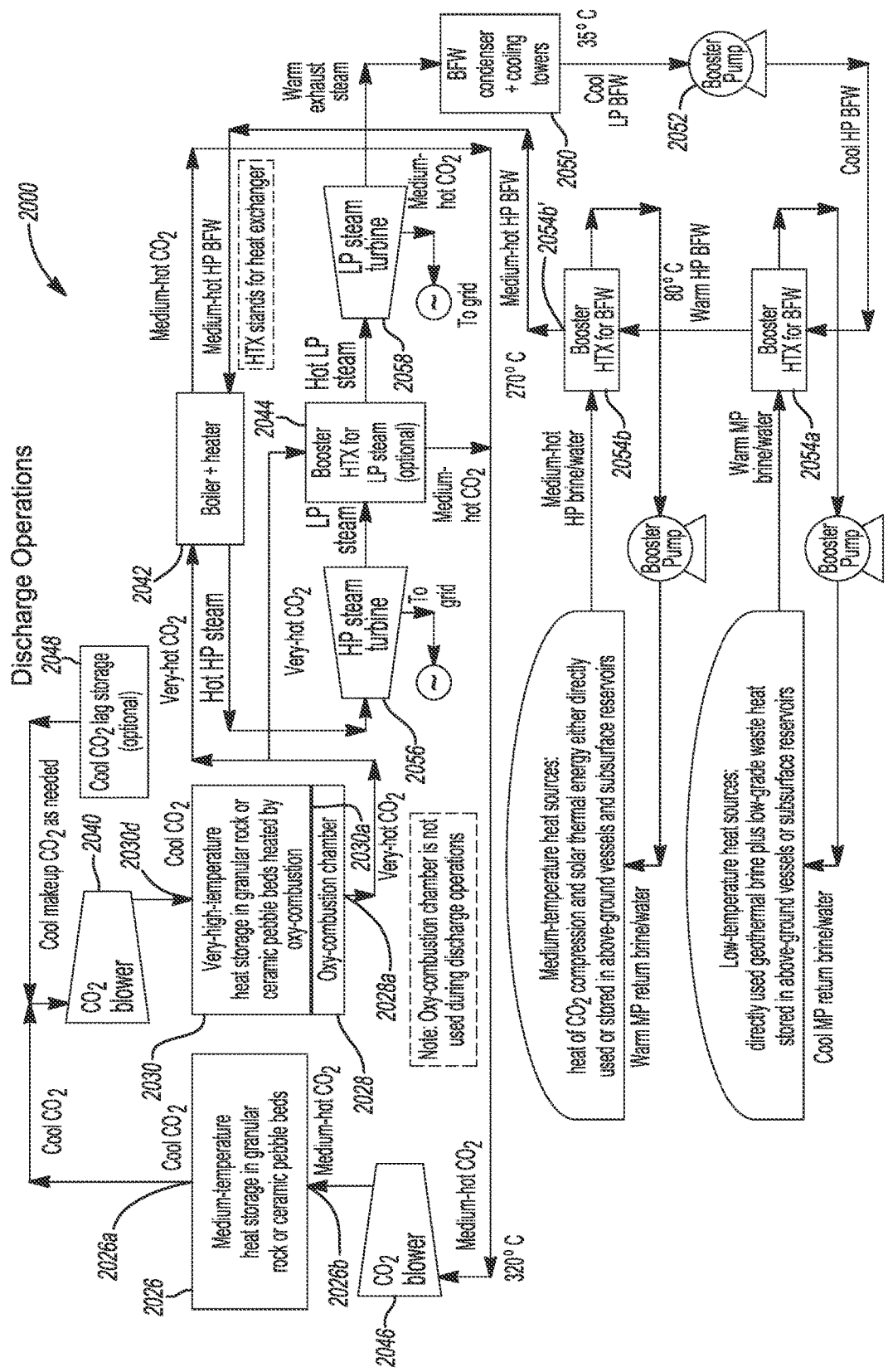
FIG. 14 shows additional components of the system to illustrate how a discharge operation may be carried out to generate electricity.

Referring now to FIG. 14, a process flow description will be provided for the $CO_2$ heat-transfer loop associated with a discharge operation for electricity generation using the system 2000. Initially, the high-grade, thermal-discharge process involves a gaseous-$CO_2$ heat-transfer loop and preferably using parallel sets of the very-high-temperature insulated heat-storage vessels 2030 filled with granular-rock or ceramic-pebble beds, and also preferably using parallel sets of the medium-temperature insulated heat-storage vessels 2026 filled with one or more granular-rock or ceramic-pebble beds. The very-high-temperature insulated heat-storage vessel 2030 and the medium-temperature insulated heat-storage vessel 2026 are operated both in parallel and in series to allow the closed-loop recirculation of gaseous $CO_2$ to operate continuously during discharge operations. This makes it possible for medium-hot (e.g., 320-360° C.) gaseous $CO_2$ to always be returned to at least one of the medium-temperature insulated heat-storage vessels 2026. Again, it will be appreciated that two or more of each of the vessels 2026 and 2030 may be employed, but FIG. 14 illustrates just one subsystem of each to avoid unnecessarily cluttering the figure.

With the assistance of at least one (possibly more than one) $CO_2$ blower 2040 and/or 2046, the high-grade, thermal-discharge process begins with cool $CO_2$ (e.g., 25-50° C.) being blown into the at least one very-high-temperature insulated heat-storage vessel 2030 through port 2030*d* thereof. This operation drives very hot $CO_2$ out through port 2030*a* of the opposite (very hot) end of the vessel 2030, where the oxy-combustion chamber 2028 is located. It also may drive very hot $CO_2$ out through port 2028*a*, which is located at the bottom of the oxy-combustion chamber 2028. Note that the cool $CO_2$ is blown into the end of the very-high-temperature insulated heat-storage storage vessel 2030 opposite the end with the oxy-combustion chamber 2028, which is not used during discharge operations. Because this is a closed-loop process, the cool $CO_2$ has already exited port 2026*a* at a cool end of the medium-temperature insulated heat-storage vessel 2026.

With the assistance of at least one (possibly more than one) $CO_2$ blower 2040 and/or 2046, cool $CO_2$ (e.g., 25-50° C.) continues to be blown into the very-high-temperature insulated heat-storage vessel 2030, through port 2030*d*, driving very-hot $CO_2$ out of port 2030*a* at the opposite (hot) end of the vessel, and possibly out of port 2028*a*, until only a small percentage (e.g., 15-20%) of the granular bed in the vessel is at the target temperature (e.g., 700° C.). This results in a large percentage (e.g., 80-85%) of the granular bed in the very-high-temperature insulated heat-storage storage vessel 2030 being cooled to less than the target temperature. The largely cool granular bed is now ready to be thermally charged during the subsequent charge operations. It will be understood that the estimates of 80-85% and 15-20% cited above are approximations and may be refined upon further analysis.

Very-hot $CO_2$ (e.g., 700° C.) that leaves the at least one very-high-temperature insulated heat-storage vessel 2030 is sent to a subsystem (i.e., collection of at least components 2042, 2056, 2044, 2058) that, in this embodiment uses the very-hot $CO_2$ to eventually generate electricity, as will be described in greater detail below. FIG. 15, to be described momentarily, shows another embodiment of the present disclosure in which the subsystem forms a system for making cement.

The subsystem shown in FIG. 14 includes at least one (but optionally more than one) boiler plus heater assembly 2042, where it heats hot high-pressure (HP) BFW, which cools the very-hot $CO_2$, causing it to become medium-hot (e.g., 320-360° C.) $CO_2$.

With the possible assistance of one or more $CO_2$ blower(s) 2046, medium-hot $CO_2$ (e.g., 320-360° C.) that leaves the boiler/heater assembly 2042 is sent back to the one or more medium-temperature insulated heat-storage vessels 2026. This completes the $CO_2$ heat-transfer loop, which as noted above is a closed loop operation.

Very-hot (e.g., 700° C.) $CO_2$ that leaves the very-high-temperature insulated heat-storage vessel 2030 may be sent to at least one (but optionally more than one) booster heat exchanger (HTX) 2044 where it heats low-pressure (LP) steam, causing very-hot $CO_2$ to become medium-hot (e.g., 320-360° C.) $CO_2$. It will be appreciated, however, that the use of the booster HTX 2044 is an option and is not required with the system 2000.

With the possible assistance of one or more CO2 blower(s) 2046, medium-hot (e.g., 320-360° C.) $CO_2$ that leaves the booster HTX 2044 is sent back to at least one medium-temperature insulated heat-storage vessel 2026, thereby completing the $CO_2$ heat-transfer loop.

With the possible assistance of at least one $CO_2$ blower 2046, medium-hot $CO_2$ (e.g., 320-360° C.) continues to be blown into port 2026*b* of the medium-temperature insulated heat-storage vessel 2026 until only a small percentage (e.g., 15-20%) of the granular media at the cool end (the end adjacent port 2026*a*) is cool (e.g., 20-30° C.). This results in a large percentage (e.g., 80-85%) of the granular bed at the medium-hot end of the medium-temperature insulated heat-storage vessel 2026 (i.e., the end adjacent port 2026*b*) having been heated to the target temperature (e.g., 320-360° C.). The largely medium-hot granular bed within the medium-temperature insulated heat-storage vessel 2026 is now ready to be thermally discharged during the subsequent charge operations.

With the possible assistance of the one or more $CO_2$ blower 2040, the cool $CO_2$ (e.g., 25-50° C.) leaving the medium-temperature insulated heat-storage vessel 2026 through port 2026*a* is blown into the very-high-temperature insulated heat-storage vessel 2030 through port 2030*d*. This operation drives very-hot $CO_2$ out of the opposite end (i.e., the hot end of the vessel 2030 adjacent the oxy-combustion chamber 2028), through port 2030*a*, and possibly out of port 2028*a* located at the bottom of the combustion chamber 2028, until only a small percentage (e.g., 15-20%) of the granular bed in the vessel 2030 is at the target temperature (e.g., 700° C.). Note that some cool makeup $CO_2$, taken from an optional cool $CO_2$ lag storage reservoir 2048, may be also blown into the very-high-temperature insulated heat-storage vessel 2030, through port 2030*d*.

Referring further to FIG. 14, the process flow description for the boiler feedwater (BFW) loop of the discharge operations will now be described. Initially, cool (e.g., 35-45° C.) low-pressure (LP) boiler feedwater (BFW) that leaves at least one (or optionally more than one) BFW condenser 2050, along with makeup BFW, if needed, is sent to at least one (or optionally more than one) more booster pump 2052. This causes the cool LP BFW to become cool high-pressure (HP) BFW. It shall be appreciated that for the purpose of this disclosure, what is meant by high-pressure (HP) BFW is boiler feedwater with a pressure high enough to prevent it from flashing to steam when heated to a desired temperature. So, for example, if HP BFW is to be heated to 270° C., then the pressure of that BFW must be at least 56 bar to prevent it from flashing to steam. Whenever HP BFW is referred to in the present disclosure, it is to be understood that the pressure is high enough to prevent the BFW from flashing to steam.

Cool (e.g., 35-45° C.) HP BFW is successively heated in a series of one or more booster heat exchangers (HTXs) 2054*a* and 2054*b* (two being shown in this example) for BFW. The HTXs 2054*a* and 2054*b* use progressively higher temperature heat sources, causing cool HP BFW to become medium-hot (e.g., 200-270° C.) HP BFW at output 2054*b*'. The heat sources may include, for example and without limitation, one or more of geothermal brine, low-grade waste heat, the heat of $CO_2$ compression, solar thermal energy (STE), combustion of biomass, and nuclear energy. The biomass may comprise, without limitation, forest biomass, forest-waste biomass, agricultural-residue biomass, and municipal solid waste (MSW).

Medium-hot (e.g., 200-270° C.) HP BFW that leaves the booster HTX 2054*b* for BFW is sent to the boiler/heater assembly 2042 where it is heated by very-hot (e.g., 650-700° C.) $CO_2$. This causes the medium-hot HP BFW (e.g., 200-270° C.) to become hot (e.g., 600-650° C.) HP steam. Hot (e.g., 600-650° C.) HP steam that leaves the boiler/heater assembly 2042 is sent to at least one (and optionally more than one) HP steam turbine 2056, which generates electricity for the grid. This causes the hot HP steam to become LP steam.

The LP steam that leaves the HP steam turbine 2056 may be sent to at least one booster HTX 2044 where it is heated by very-hot $CO_2$ (e.g., 650-700° C.). This causes the LP steam to become hot LP steam (e.g., 600-650° C.). Note that this is an option, however, and is not necessarily required for operation of the system 2000.

Hot (e.g., 600-650° C.) LP steam that leaves the booster HTX 2044 is sent to at least one (but optionally more than one) LP steam turbine 2058, which generates electricity for the grid. This process also causes the hot LP steam to become warm exhaust steam (e.g., 210° C.).

If the booster HTX 2044 is not used to reheat steam, then LP steam leaving the HP steam turbine 2056 is sent directly to the LP steam turbine 2058, which generates electricity for the grid. This process causes the hot LP steam to become warm exhaust steam (e.g., 50° C.).

Warm exhaust steam (e.g., 50-210° C.) that leaves the LP steam turbine 2058 may be sent directly to the BFW condenser 2050, where with the assistance of cooling towers, it becomes cool (e.g., 35-45° C.) BFW. The cool LP BFW is then recycled for the BFW-loop process. This process causes the pressure of the cool LP BFW to be less than 1 atm.

Referring to FIG. 15, the following process flow description is for the discharge operations for an embodiment 2000" of the present disclosure which is tailored specifically for cement production. While it may be possible that discharge operations occur intermittently with the system 2000", it is more likely that the discharge operations for a cement manufacturing plant will occur continuously. Note that the first three steps listed below are the same as those for discharge operations for electricity generation as explained for the system 2000 of FIG. 14. Also note that components in common with those described for FIG. 13 have been designated with the same reference numbers used in FIG. 14.

In FIG. 15, the high-grade, thermal-discharge process using the system 2000" involves a gaseous-$CO_2$ heat-transfer loop and the at least one medium-temperature insulated heat-storage vessel 2026, and the at least one very-high-temperature insulated heat-storage vessel 2030, but preferably more parallel sets of such storage vessels. Merely to avoid cluttering the drawing figure, only a single medium-temperature insulated heat storage-vessel 2026 and a single very-high-temperature insulated heat-storage vessel 2030 are shown. The very-high-temperature insulated heat-storage vessel 2030 is filled with, without limitation, one or more granular-rock or ceramic-pebble beds. At least one medium-temperature insulated heat-storage vessel 2026 is used, although parallel sets of such vessel are even more preferred. The medium-temperature insulated heat-storage vessel 2026 is filled with, without limitation, granular-rock or ceramic-pebble beds. The very-high-temperature insulated heat-storage vessel 2030 and the medium-temperature insulated heat-storage vessel 2026 are operated both in parallel and in series to allow the closed-loop recirculation of gaseous $CO_2$ to operate continuously during discharge operations. This makes it possible for medium-hot (e.g., 350-500° C.) gaseous $CO_2$ to always be returned to at least one of the medium-temperature insulated heat-storage vessels 2026.

With the assistance of at least one (possibly more than one) $CO_2$ blower(s) 2040 and/or 2046, the high-grade, thermal-discharge process begins with cool $CO_2$ (e.g., 25-50° C.) being blown into port 2030*d* of the very-high-temperature insulated heat-storage vessel 2030. This operation drives very-hot $CO_2$ (e.g., 1450° C.-1550° C.) out of port 2030*a* at the opposite (very hot) end of the vessel 2030 where the oxy-combustion chamber 2028 is located. It may also drive very hot $CO_2$ out of port 2028*a*, located at the bottom of the oxy-combustion chamber 2028. Note that the oxy-combustion chamber 2028 is not used during discharge operations. Because this is a closed-loop process, the cool $CO_2$ has already exited port 2026*a* at the cool end 2026' of the medium-temperature insulated heat-storage vessel 2026.

With the assistance of at least one (possibly more than one) $CO_2$ blower(s) 2040 and/or 2046, cool $CO_2$ (e.g., 25-50° C.) continues to be blown into port 2030*d* of the very-high-temperature insulated heat-storage vessel 2030. This operation drives very-hot $CO_2$ (typically 1450° C.-1550° C.) out of port 2030*a* at the opposite (hot) end of the vessel 2030, and possibly out of port 2028*a*, located at the bottom of the oxy-combustion chamber 2028, until only a small percentage (e.g., 15-20%) of the granular media bed in the vessel is at the target temperature (e.g., 1500° C.). This results in a large percentage (e.g., 80-85%) of the granular media bed in the very-high-temperature insulated heat-storage vessel 2030 having been cooled to less than the target temperature. The largely-cool granular media bed in the very-high-temperature insulated heat-storage vessel 2030 is now ready to be thermally charged during the subsequent charge operations.

Very-hot $CO_2$ (e.g., 1450° C.-1550° C.) that leaves port 2030a of at least one very-high-temperature insulated heat-storage vessel 2030, and possibly out of port 2028a, located at the bottom of the oxy-combustion chamber 2028, is sent to at least one cement kiln 2070. As noted above, in this embodiment 2000'' the subsystem comprises the cement kiln 2070 and may also include one or more components 2072, 2076, 2078, 2090, 2092, and 2074 (to be discussed momentarily). Optionally, a plurality of cement kilns 2070 may be used, but for simplicity only one is shown in FIG. 15. The very-hot $CO_2$ enters the cement kiln 2070 where it heats and sinters the raw materials. The raw materials used in the sintering process may include, without limitation, limestone, clay or shale, ash, or other waste products.

The sintering process generates hot clinker (1400-1500° C.), which leaves an upstream end 2070a of the at least one cement kiln 2070 and enters at least one clinker cooler 2078, where it is cooled by warm $CO_2$ (e.g., 70-90° C.), which has left the at least one heat recovery steam generator (HRSG) plus condensing steam-turbine power system 2076 (as discussed momentarily). In the at least one clinker cooler 2078, hot clinker (1400-1500° C.) transfers its heat to the warm $CO_2$ (e.g., 70-90° C.) to form warm clinker (e.g., 90-110° C.) and medium-hot $CO_2$ (e.g., 350-500° C.). Warm clinker (e.g., 90-110° C.) leaves the at least one clinker cooler 2078 and is sent to at least one clinker crusher 2090, where it is crushed into cement.

The sintering process also generates "process" $CO_2$ (primarily from the thermal decomposition of limestone), which flows out of the at least one cement kiln 2070, along with the "heat-transfer" $CO_2$, which is used in the high-grade $CO_2$ heat-transfer loop between the at least one very-high-temperature insulated heat-storage vessel 2030 and the at least one cement kiln 2070.

Hot $CO_2$ (800-900° C.), which includes "heat-transfer" $CO_2$ and "process" $CO_2$, leaving the cement kiln 2070 is sent to at least one pre-heater 2072 (or optionally a plurality of pre-heaters 2072 coupled in series or parallel) where it is used to pre-heat the raw materials before the raw materials are fed into the at least one kiln 2070. Pre-heating the raw materials cools the hot $CO_2$ (e.g., 800-900° C.), causing it to become medium-hot $CO_2$ (e.g., 350-500° C.).

With the assistance of at least one $CO_2$ blower 2092, medium-hot $CO_2$ (e.g., 350-500° C.) leaving the pre-heater 2072 is sent to port 2076a of at least one heat recovery steam generator HRSG plus condensing steam-turbine power system 2076, where it supplies heat to generate steam for process heat and/or steam for at least one condensing LP steam turbine used to generate power for the cement plant and/or the grid. The HRSG 2076, cools medium-hot $CO_2$ (e.g., 350-500° C.) to become warm $CO_2$ (e.g., 70-90° C.), which leaves port 2076b and is sent to at least one clinker cooler 2078, where it cools hot clinker (e.g., 1400-1500° C.) to become warm clinker (e.g., 90-110° C.), as previously described. This process creates medium-hot $CO_2$ (e.g., 350-500° C.), which leaves the at least one clinker cooler 2078 and is sent to port 2026b of at least one medium-temperature insulated heat-storage vessel 2026, where it heats the granular media contained therein. The purpose is for medium-hot $CO_2$ to transfer its heat to the granular media within the medium-temperature insulated heat-storage vessel 2026, thereby cooling the $CO_2$ before the cool $CO_2$ leaves port 2026a of the medium-temperature insulated heat-storage vessel and is sent to a compressor train 2074, which typically includes multiple compression stages and multiple intercooler and aftercooler heat exchangers, placed after each compression stage, and produces $CO_2$ suitable for geologic sequestration. The compressor train preferably includes one or more compression stages and one or more each of intercooler and aftercooler heat exchangers. Stored medium-grade heat in the granular media of the medium-temperature insulated heat-storage vessel 2026 is subsequently sent, via medium-hot $CO_2$, to the very-high-temperature insulated heat-storage vessel 2030 during charging operations. This reduces, typically by 20% or possibly more, the fuel required to generate high-grade heat.

With the assistance of at least one $CO_2$ blower 2040 and/or 2046, medium-hot $CO_2$ (e.g., 350-500° C.) continues to be blown into port 2026b of at least one medium-temperature insulated heat-storage vessel 2026 until only a relatively small percentage (e.g., 15-20%) of the granular media at a cool end 2026' of the medium-temperature insulated heat-storage vessel 2026 is cool (e.g., 25° C.). This results in a large percentage (e.g., 80-85%) of the granular media bed at the medium-hot end of the medium-temperature insulated heat-storage vessel 2026, adjacent to port 2026b having been heated to the target temperature (e.g., 350-500° C.). This process assures that cool $CO_2$ (e.g., 25-50° C.) leaves port 2026a at the cool end 2026' of the medium-temperature insulated heat-storage vessel 2026 before being sent to the one or more $CO_2$ compressor trains 2074.

With the assistance of at least one $CO_2$ blower 2040 and/or 2046, a portion (corresponding to the "heat-transfer" $CO_2$ used to deliver heat to the kilns) of the cool $CO_2$ (e.g., 25-50° C.) leaving port 2026a of at least one medium-temperature insulated heat-storage vessels 2026 is blown into port 2030d of at least one very-high-temperature insulated heat-storage vessels 2030. This operation drives very-hot $CO_2$ (e.g., 1450° C.-1550° C.) out of port 2030a at the opposite (very hot) end 2030' of the vessel, and possibly out of port 2028a, until only a small percentage (e.g., 15-20%) of the granular media bed in the vessel is at the target temperature (e.g., 1500° C.). Note that to assist in this process some cool makeup $CO_2$, taken from cool $CO_2$ lag storage vessel 2048, may be also blown into the very-high-temperature insulated heat-storage vessel 2030 through port 2030d. This completes the $CO_2$ heat-transfer loop.

With the assistance of at least one $CO_2$ blower 2040 and/or 2046, a portion (corresponding to the "process" $CO_2$ that primarily results from the thermal decomposition of limestone) of the cool $CO_2$ (e.g., 25-50° C.) leaving port 2026a of at least one medium-temperature insulated heat-storage vessel 2026 is sent to the at least one compressor train 2074, which as noted may contain one or more compressor(s) followed by one or more heat exchangers.

In conventional cement manufacturing plants, the heat in the flue gas that leaves the pre-heaters is sometimes wasted. The heat removed from hot clinker is also sometimes released to the atmosphere and wasted. The systems and methods of the present disclosure assure that 100% of the heat leaving the pre-heaters is used to assist in the cement manufacturing process, such as in providing additional process heat to the cement plant and to generate electricity needed to power the cement-plant infrastructure, such as the grinders. The systems and methods of the present disclosure also assure that 100% of the heat removed from the clinker-cooling operations is returned to medium-grade heat storage, which is part of the high-grade heat-storage system. Altogether, the systems and methods of this disclosure can reduce fuel consumption by 20% or possibly more, which reduces fuel cost and the quantity of $CO_2$ generated by combustion. The reduction in generated $CO_2$ reduces the cost of $CO_2$ compression and geological sequestration. Because both combustion and process $CO_2$ are high-purity, the $CO_2$ can be compressed and sent to a GCS reservoir without incurring an additional $CO_2$ separation cost. With 100% of the generated $CO_2$ being sent to a GCS reservoir, it is unnecessary to modify cement composition or use alternative materials to reduce the $CO_2$ intensity of cement. This allows cement manufacturers to optimize the composition of their cement for strength, durability, and cost. It should be noted that fundamental changes to the composition of cement could have a disruptive impact on cement manufacturers because it may require replacing core components of their facilities. The systems and methods of the present disclosure allow cement manufacturers to continue to use the major core components of their facilities, which is less disruptive than the potential impact that fundamental changes in cement composition may result in. Because much of the $CO_2$ intensity associated with construction projects is derived from the $CO_2$ intensity of cement, it is expected that there will be a high demand for zero-carbon and/or negative-carbon cement manufactured using the systems and methods of the present disclosure. There are also Federal tax credits under the U.S. Federal tax code for $CO_2$ capture and geologic sequestration that may apply to cement manufacturers who use the technology covered by the systems and methods disclosed herein. Altogether, it is expected that the systems and methods described herein are likely to find strong interest among cement manufacturers, as well as in other industries which require large amounts of high-grade heat to produce a product or to carry out an industrial process.

The systems and methods of the present disclosure enable cement to be manufactured with near-zero $CO_2$ emissions, transforming cement from a $CO_2$-intensive material to a green building material. When biomass is used, cement can be manufactured with negative $CO_2$ emissions, and cement becomes environmentally competitive with sustainable building materials, such as wood. The record-setting 2020 year wildfires in the United States have burnt millions of acres across much of the western United States. The huge inventory of forest-waste biomass resulting from those wildfires and forest-thinning projects planned by the U.S. Forest Service creates a synergistic opportunity for create negative-carbon, cement plants throughout the western U.S., using the systems and methods of the present disclosure, for producing "green" or "sustainable" cement. The use of agricultural-residue biomass can also increase the opportunity for manufacturing negative-carbon cement.

The large inventory of forest-waste biomass in the United States also creates a synergistic opportunity to generate electricity with negative $CO_2$ emissions, using the systems and methods of the present disclosure.

It will be appreciated that the foregoing discussion has used various terms (e.g., "warm $CO_2$") in explaining the operation of the various embodiments. For this purpose, it may be understood that "cool $CO_2$" may be, for example and without limitation, $CO_2$ between 25° C. and about 50° C. For this purpose, it may be understood that "cool combustion air" may be, for example and without limitation, combustion air between 15° C. and about 30° C. For this purpose, it may be understood that "cool recycled flue gas" may be, for example and without limitation, recycled flue gas between 20° C. and about 30° C. For this purpose, it may be understood that "warm $CO_2$" may be, for example and without limitation, $CO_2$ between 70° C. and about 90° C. For this purpose, it may be understood that "medium-hot $CO_2$" may be, for example and without limitation, $CO_2$ between 320° C. and about 360° C. for the generation of electricity. For this purpose, it may be understood that "medium-hot flue gas" may be, for example and without limitation, flue gas between 320° C. and about 360° C. for the generation of electricity. For this purpose, it may be understood that "medium-hot $CO_2$" may be, for example and without limitation, $CO_2$ between 350° C. and about 500° C. for manufacturing cement. For this purpose, it may be understood that "hot $CO_2$" may be, for example and without limitation, $CO_2$ between 800° C. and about 900° C. for manufacturing cement.

It will be appreciated that for the foregoing discussion, the terms "very-hot" and "highly-heated" are intended to mean the same thing. For this purpose, it may be understood that "very-hot $CO_2$" may be, for example and without limitation, $CO_2$ between about 650° C. and about 700° C. for the generation of electricity. It may be also understood that "very-hot flue gas" may be, for example and without limitation, flue gas between about 650° C. and about 700° C. for the generation of electricity. It may be also understood that "very-hot $CO_2$" may be, for example and without limitation, $CO_2$ between about 1450° C. and about 1550° C. for cement manufacturing. It may be also understood that "very-hot flue gas" may be, for example and without limitation, flue gas between about 1450° C. and about 1550° C. for cement manufacturing.

With regard to the terminology "high-purity" oxygen, it will be appreciated that the embodiments of the system 2000, 2000' and 2000" can tolerate less than pure $O_2$ or $CO_2$. This is principally an economic consideration that requires a technological-economic analysis as to how pure one wishes the oxygen to be. The question to be considered is if the incremental cost of obtaining even higher purity cost $O_2$ or $CO_2$ justifies the incremental benefits. So, the question of how pure the $O_2$ or $CO_2$ should is one that preferably is addressed through a cost/benefit analysis for a particular implementation of the system 2000, 2000' or 2000". But with these considerations in mind, it is expected that in most implementations, the "high-purity" $O_2$ may be at least about 95% pure $O_2$ for acceptable system operation, but again, the exact value should be arrived at through a suitably detailed engineering and cost analysis.

It will be appreciated that for the foregoing discussion on cement manufacturing, "very-hot clinker" may be, for example and without limitation, clinker between about 1400° C. and about 1500° C. It will also be understood that "warm clinker" may be, for example and without limitation, clinker between about 90° C. and about 110° C.

It will also be understood that for the foregoing discussion on the boiler feedwater (BFW) loop, that "cool LP BFW" may be, for example and without limitation, low-pressure BFW between about 35° C. and about 50° C. It will also be understood that "cool HP BFW" may be, for example and without limitation, high-pressure BFW between about 35° C. and about 50° C. It will also be understood that "medium-hot HP BFW" may be, for example and without limitation, high-pressure BFW between about 200° C. and about 270° C. It will also be understood that "medium-hot HP brine may be, for example and without limitation, high-pressure brine between about 210° C. and about 280° C. It will also be understood that "medium-hot HP water" may be, for example and without limitation, high-pressure water between about 210° C. and about 280° C. It will also be understood that "high pressure BFW" corresponds to BFW at a pressure high enough to prevent the BFW from flashing to steam. It will also be understood that "hot HP steam" may be, for example and without limitation, high-pressure steam between about 600° C. and about 650° C. It will also be understood that "hot LP steam" may be, for example and without limitation, low-pressure steam between about 600° C. and about 650° C. It will also be understood that "warm exhaust steam" may be, for example and without limitation, steam between about 50° C. and about 210° C.

Figure 16:
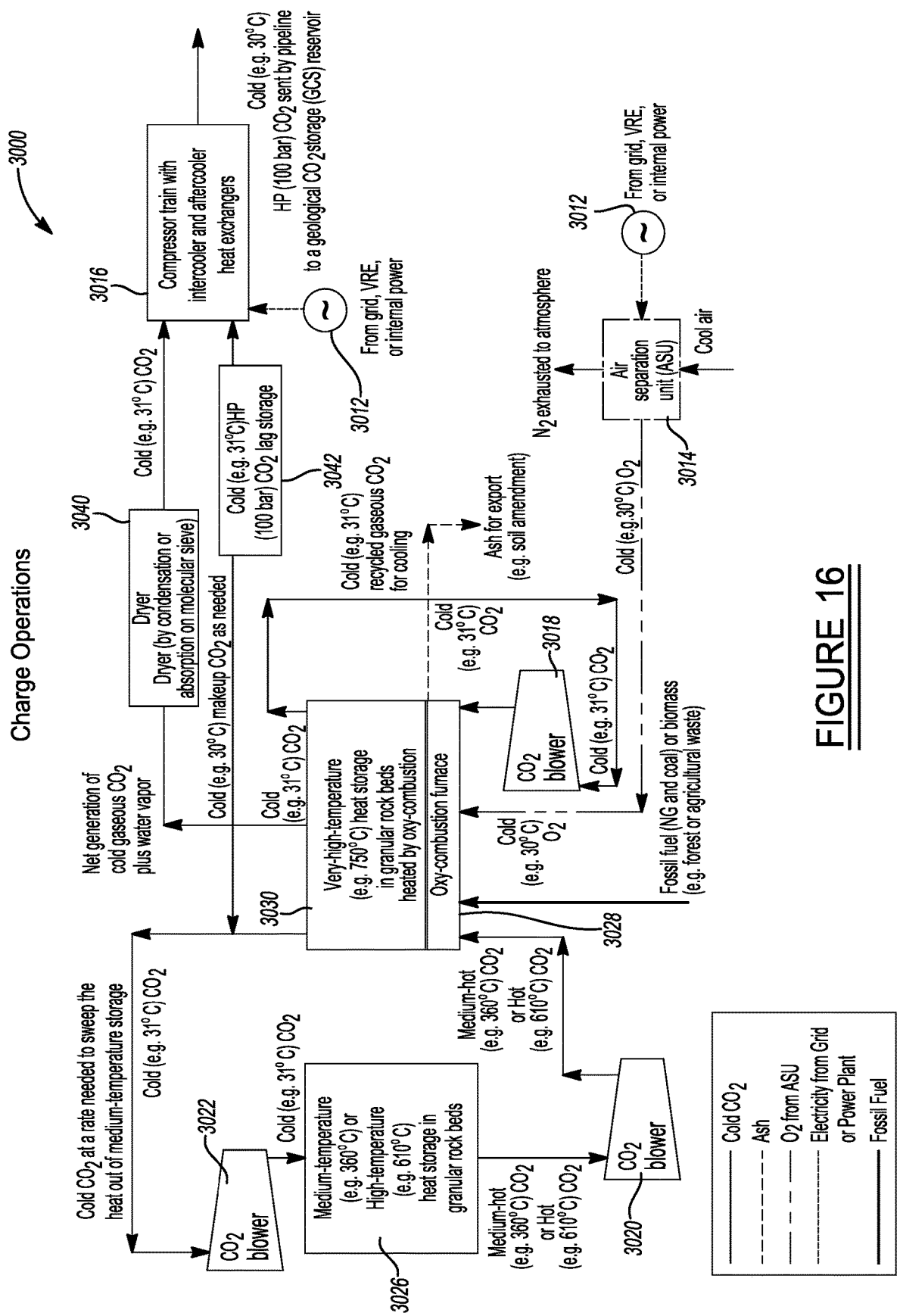
FIG. 16 is a high level block diagram of major components of another embodiment of a heat storage and time shifting system that makes use of supercritical $CO_2$ as a working fluid, and where the components shown in FIG. 16 are used during a charge cycle of operation of the system.
Figure 17:
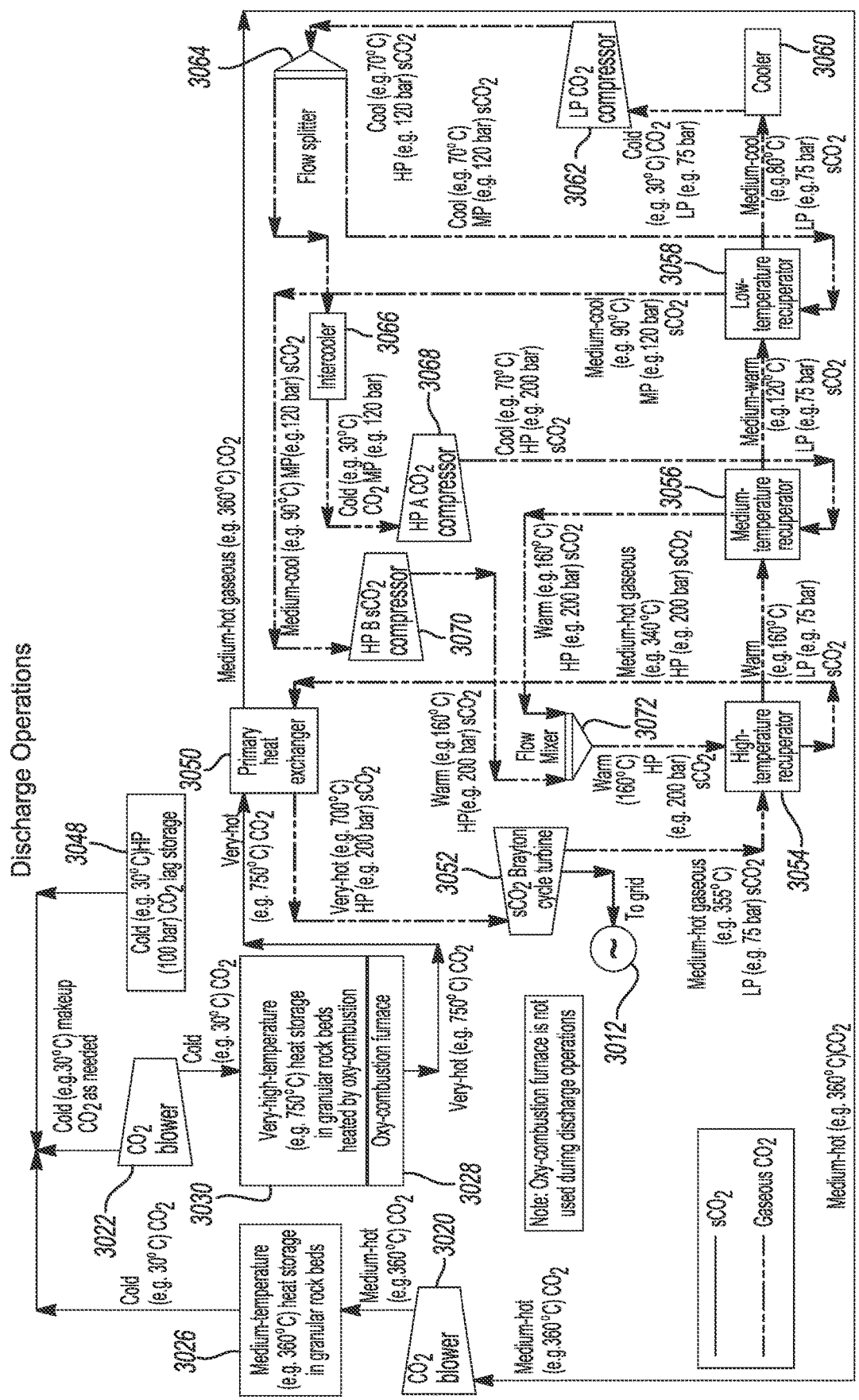
FIG. 17 is a high level block diagram of the system of FIG. 16 showing various additional components that are during a discharge cycle of operation, and which form a heat recuperation subsystem for assisting in driving a Brayton-cycle turbine using heated $sCO_2$ for a one-stage $sCO_2$-heating process.
Figure 18:
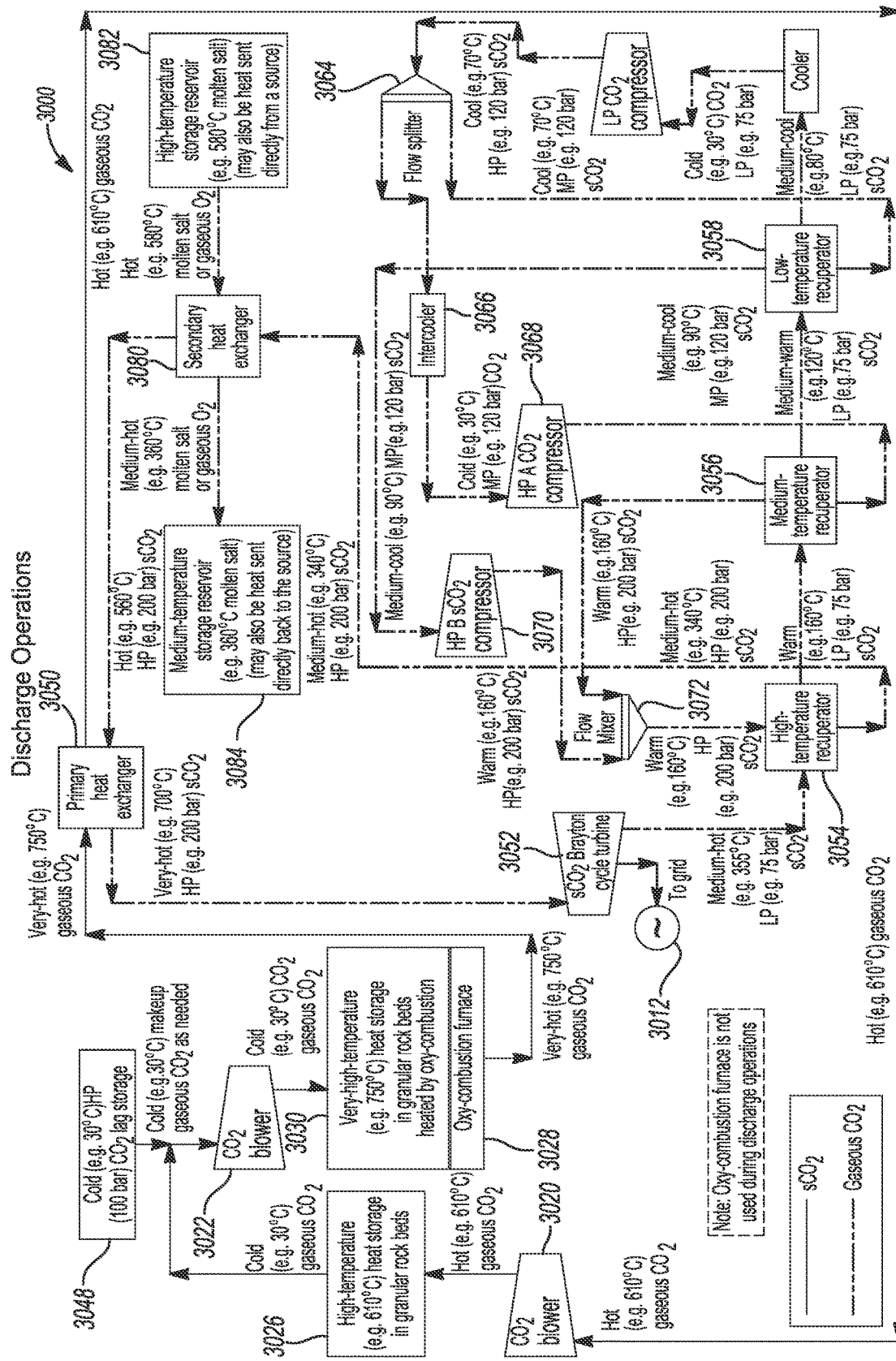
FIG. 18 is a high level block diagram of the system of FIG. 16 showing various additional components that are during a discharge cycle of operation, and which form a heat recuperation subsystem for assisting in driving a Brayton-cycle turbine using heated $sCO_2$ for a two-stage $sCO_2$-heating process.

Referring now to FIGS. 16, 17, and 18, a system 3000 and method in accordance with another embodiment of the present disclosure will be discussed. The system 3000 of FIGS. 16, 17, and 18, rather than being applied to Rankine-cycle, steam turbines, makes use of Brayton-cycle turbines that use supercritical $CO_2$ ($sCO_2$) as the working fluid. Power cycles based on $CO_2$ as the working fluid have the potential to yield even higher thermal efficiencies at lower capital cost than state-of-the-art, steam-based, power cycles, such as those used in advanced, ultra-supercritical (AUSC) power plants. When $CO_2$ is held above its critical temperature and pressure, it acts like a gas, yet has the density of a liquid. In this supercritical state, small changes in temperature or pressure cause dramatic shifts in density, which results in $sCO_2$ being a highly efficient working fluid in generating power. It should be appreciated that while we refer to supercritical $CO_2$ as being the working fluid, at some points in the power cycle, it is possible that the either the temperature or the pressure, or both, could be below their corresponding critical values.

As with the previously disclosed embodiments and methods, the embodiment of FIGS. 16, 17, and 18 enables combustion heat to be time-shifted from when it is created to when it is needed to generate electricity. Excess electricity, such as from variable renewable energy (VRE) sources, can be time-shifted by directly using the excess electricity to power the infrastructure needed to generate power with near-zero $CO_2$ emissions with fossil fuel, or even with negative $CO_2$ emissions when using biomass as the fuel source. That infrastructure includes $O_2$ generators, such as air separation units (ASUs), which generate high-purity $O_2$ for oxy-combustion, and compressors used to compress gaseous $CO_2$ to $sCO_2$ for pipeline transportation to a geologic $CO_2$ storage (GCS) site.

Oxy-combustion creates a mixture of very-hot $CO_2$ and steam, which is sent to heat granular rock beds in insulated vessels (FIG. 16) until most of the beds reach a target storage temperature. Although in the following description, reference is made to granular rock beds, it should be appreciated that the granular material may also be comprised of manufactured granular material, such as ceramic pebbles. The cooled mixture of $CO_2$ and water vapor leaving the beds is dried to yield high-purity $CO_2$, which is then compressed and sent by pipeline to a GCS reservoir. The embodiment of FIGS. 16, 17, and 18 avoids the capital and operating costs of post-combustion $CO_2$ capture. It also involves indirect heating of the power cycle. When power is needed, very-hot, high-purity, gaseous $CO_2$ is sent from storage to primary heat exchangers, where it heats $sCO_2$ that is sent to a Brayton-cycle turbine (to be discussed in connection with FIGS. 17 and 18). A heat-recuperation process, which may involve one or more heat recuperation stages, enables medium-hot, gaseous $CO_2$ to be sent back to storage. Increasing the number of heat recuperation stages reduces the temperature difference between the very-hot and medium-hot $sCO_2$, which improves thermal efficiency. Compared to an AUSC steam-turbine plant with a steam temperature of 700° C., this process can reduce fuel use and the quantity of $CO_2$ generated by up to about 24%, or possibly even more.

With reference to FIG. 16, the various components, and subsystems of the system 3000 are shown, which can be seen to be similar to system 2000 of FIG. 12. Components of the system 3000 in common with those of the system 2000 are denoted with reference numbers increased by 1000. The system 3000 in FIG. 16 includes the components used during a "charge" cycle of operation and includes a dryer subsystem 3040 formed in one example by a molecular sieve. The molecular sieve 3040 provides a drying action on received cold, gaseous $CO_2$, which includes water vapor which is created during the charge cycle of operation. The dryer subsystem 3040 outputs cold (e.g., about 31° C.) $CO_2$ for use by the compressor train 3016, and optionally also sent to a cool $CO_2$ lag storage structure 3042, which would typically consist of a high-pressure steel tank. The components shown in FIG. 16 thus may be understood as forming components of a "charge" subsystem for the system 3000.

FIG. 17 shows additional components used by the system 3000 during the discharge cycle of operation for the case of one-stage heating of $sCO_2$. These components include one or more primary heat exchangers 3050, which receive very-hot (e.g., 750° C.) gaseous $CO_2$ from the one or more very-high-temperature, insulated heat-storage vessel(s) 3030, which are filled with granular rock beds. The one or more primary heat exchangers 3050 also receive medium-hot, high-pressure (e.g., 340° C. at 200 bar) $sCO_2$ from the one or more high-temperature recuperators 3054. This heat-transfer process provides very-hot, high-pressure (e.g., 700° C. at 200 bar) $sCO_2$ as an input to one or more $sCO_2$ Brayton-cycle turbines 3052. The one or more $sCO_2$ Brayton-cycle turbines 3052 provide an output to the AC power grid 3012, and also produce an output of medium-hot, low-pressure (e.g., 355° C. at 75 bar) $sCO_2$, which is directed to an input of one or more high-temperature recuperators 3054, which are heat exchangers used to recover otherwise wasted heat. The one or more high-temperature recuperators generate a first quantity of warm, low-pressure $sCO_2$ (e.g., 160° C. at 75 bar) output that is directed to an input of one or more medium-temperature recuperators 3056, which are heat exchangers used to recover otherwise wasted heat. A second quantity of medium-hot, high-pressure (e.g., 340° C. at 200 bar) $sCO_2$ is directed to an input of the one or more primary heat exchangers 3050.

The one or more medium-temperature recuperators 3056 similarly provide a first quantity of medium-warm, low-pressure (e.g., 120° C. at 75 bar) $sCO_2$ to one or more low-temperature recuperators 3058. The one or more low-temperature recuperators produce a quantity of medium cool, low-pressure (e.g., 80° C. at 75 bar) $sCO_2$ which is output to one or more cooler subsystems 3060.

It should be appreciated that three recuperation stages may not be required for the System 3000 and that two recuperation stages (high- and low-temperature) may be sufficient. It may even be possible that only one recuperation stage could be used, but that may waste too much heat to be useful.

With further reference to FIG. 17, the one or more cooler subsystems 3060 provide a cold, low-pressure (e.g., 30° C. at 75 bar) $CO_2$ output to an input of one or more low-pressure $CO_2$ compressor(s) 3062. The one or more low-pressure $CO_2$ compressor(s) 3062 provide cool, medium pressure (e.g., 70° C. at 120 bar) $sCO_2$ to one or more flow splitters 3064. The one or more flow splitters 3064 provide a first output quantity of the cool, medium-pressure (e.g., 70° C. at 120 bar) $sCO_2$ to one or more intercoolers 3066, and a second to an input of the one or more low-temperature recuperators 3058. The one or more intercoolers 3066 provide an output of cold, medium-pressure (e.g., 30° C. at 120 bar) $CO_2$ to an input to one or more first (labeled HP A $CO_2$ compressor) high-pressure $CO_2$ compressor(s) 3068, which in turn provide an output of cool, high-pressure $sCO_2$ (e.g., 70° C. at 200 bar) to an input of the one or more medium-temperature recuperators 3056. One or more second (labeled "HP B $sCO_2$ Compressor") high-pressure $sCO_2$ compressor(s) 3070 is/are used to receive on an input thereof a second quantity of medium-cool, medium-pressure $sCO_2$ (e.g., 90° C. at 120 bar) output from the one or more low-temperature recuperators 3058. The one or more second high-pressure $sCO_2$ compressor(s) 3070 provide a first output quantity of warm, high-pressure $sCO_2$ (e.g., 160° C. at 200 bar) to a first input of one or more flow mixers 3072. A second input of the one or more flow mixers 3072 receives a quantity of warm, high-pressure $sCO_2$ (e.g., 160° C. at 200 bar) from the one or more medium-temperature recuperators 3056. The one or more flow mixers 3072 provide an output of warm, high-pressure (e.g., 160° C. at 200 bar) $sCO_2$ back to an input of the one or more high-temperature recuperators 3054. The components 3050-3072 may be viewed as forming a "discharge" subsystem of the system 3000. Components 3054-3072 may also be viewed as forming a "recuperator" subsystem portion of the discharge subsystem.

FIG. 18 shows additional components used by the system 3000 during the discharge cycle of operation for the case of two-stage heating of $sCO_2$. It should be pointed out that these components are the same as those for FIG. 17, with the addition of three components: (1) one or more secondary heat exchanger(s) 3080, which are used to pre-heat medium-hot high-pressure (e.g., 340° C. at 200 bar) $sCO_2$, which results in an output of hot high-pressure (e.g., 560° C. at 200 bar) $sCO_2$ that is then sent to the primary heat exchangers, (2) one or more high-temperature (e.g., 580° C.) storage reservoir(s) 3082, and (3) one or more medium-temperature (e.g., 360° C.) storage reservoir(s) 3084. The heat stored in the one or more high-temperature storage reservoir(s) 3082 may have been derived from renewable heat from solar thermal energy (STE) collectors or it may have been derived from nuclear energy. The one or more secondary heat exchanger(s) 3080 may also directly receive high-temperature (e.g., 580° C.) heat-transfer fluid from a heat source, including a solar thermal energy (STE) facility, with medium-temperature (e.g., 360° C.) heat-transfer fluid being returned directly back to that heat source, which could be a STE facility. The use of these three components by the system 3000 is described in greater detail later in this disclosure.

Charge Operation

Referring further to FIG. 16, a charge operation of the system 3000 will now be described. Initially, electricity, including excess electricity from the power grid 3012, and/or electricity from variable renewable energy (VRE) sources, and/or nuclear energy, and/or excess electricity from the power plant itself, is used to power one or more of the air separation units (ASUs) 3014 and the one or more compressor trains 3016 (containing one or more compressor(s), followed by intercooler and aftercooler heat exchangers). The one or more ASUs 3014, or other form of oxygen-generation devices, are used to obtain high-purity (e.g., 95%-99%) $O_2$ from air. It should be appreciated that other forms of oxygen-generation devices could include those that involve the electrolysis of water, which use electricity to decompose water into pure oxygen gas and pure hydrogen gas. For the rest of this charge operation description, $O_2$-generation devices will be referred to simply as the ASUs 3014. Cold (e.g., 30° C.), high-purity (e.g., 95%-99%) $O_2$ from the one or more ASUs 3014, the fuel of choice, and enough cold $CO_2$ (e.g., 31° C.) for temperature modulation are sent to the one or more oxy-combustion furnaces 3028.

Cool (e.g., 30° C.), high-purity (e.g., 95%-99%) $O_2$ from the one or more ASU(s) 3014, may be mixed with medium-hot (e.g., 360° C.) $CO_2$ from the one or more insulated, medium-temperature heat-storage vessel(s) 3026, and also with an additional fuel of choice (e.g., natural gas, coal, coke, petroleum, petroleum coke, tires, solid waste, or biomass, or a combination thereof.) It should be appreciated that mixing medium-hot (e.g., 360° C.) $CO_2$ with cool (e.g., 30° C.), high-purity (e.g., 95%-99%) $O_2$ and the fuel of choice reduces the amount of fuel required to attain the target temperature (.g., 750° C.).

The fuel of choice is combusted in cool (e.g., 30° C.) high-purity (e.g., 95%-99%) $O_2$ inside the one or more oxy-combustion furnace(s) 3028 to generate very-hot (e.g., 750° C.), high-purity (e.g., 95%-99%) gaseous $CO_2$ and a small quantity of steam. Very-hot (e.g., 750° C.), high-purity (e.g., 95%-99%) gaseous $CO_2$ created in the one or more oxy-combustion furnace(s) 3028 is sent to the one or more insulated, very-high-temperature vessel(s) 3030 to heat the one or more granular rock beds contained therein.

Combusting fossil fuel or biomass in high-purity $O_2$ creates a high flame temperature. To maintain a target combustion temperature (e.g., 750° C.), additional cold (e.g., 31° C.) gaseous $CO_2$ is recirculated through the one or more granular rock beds inside the one or more very-high-temperature vessel(s) 3030 with the assistance of the one or more $CO_2$ blower(s) 3018 and/or 3020. Recirculation of $CO_2$ also helps to evenly distribute heat in the one or more granular rock beds.

The one or more granular rock beds are not fully heated during thermal-charging operations. Heating continues until most (e.g., 90%) of the one or more granular rock beds has been heated to the target, storage temperature (e.g., 750° C.), which places the thermal front within 10% of the cold end of the one or more granular rock beds. This assures that the downstream portion (e.g., 10%) of the granular rock beds remains relatively unheated, so gaseous $CO_2$ that exits the one or more granular rock beds is cold (e.g., 31° C.), thereby limiting the loss of heat, as gaseous $CO_2$ is sent to the one or more compressor trains 3016. Note that this temperature is preferably chosen to be just above the dew point of the $CO_2$/steam mixture, which is a function of the fuel used, along with the stoichiometry of the input fuel/oxidant mixture. This prevents condensation and moisture buildup in the one or more granular rock beds within the one or more very-high-temperature heat storage vessel(s) 3030.

The cold (e.g., 31° C.) mixture of gaseous $CO_2$ and water vapor, which is just above its dew point, leaves the downstream portion of the one or more granular rock beds within the one or more very-high-temperature heat storage vessel(s) 3030. The portion of the cold (e.g., 31° C.) $CO_2$ that was generated by oxy-combustion is sent to the dryer subsystem 3040. The dryer subsystem 3040 separates the water vapor from the $CO_2$ by condensation or by adsorption on to a suitable medium, such as a molecular sieve. The cold (e.g., 31° C.) dry $CO_2$ is then sent to the one or more compressor trains 3016 to produce high-pressure (e.g., 100 bar) $CO_2$ suitable for transportation in a pipeline to a GCS site.

With the assistance of one or more $CO_2$ blower(s) 3022, the portion of the cold (e.g., 31° C.) $CO_2$ leaving the one or more insulated, very-high-temperature heat-storage vessel(s) 3030 that was not generated by oxy-combustion is sent to the cold end of the one or more insulated, medium-temperature (360° C.) heat-storage vessel(s) 3026, where it cools the granular rock beds contained therein. This process drives medium-hot (360° C.) $CO_2$ out of the hot end of the one or more insulated, medium-temperature (360° C.) heat-storage vessel(s), which, with the assistance of one or more $CO_2$ blower(s) 3020, is sent to the one or more oxy-combustion furnaces 3028, as described earlier. This process prepares the one or more insulated, medium-temperature (360° C.) heat-storage vessel(s) 3026 to receive medium-hot (360° C.) $CO_2$ during the following discharge operation.

It should be appreciated that the one or more insulated, medium-temperature (e.g., 360° C.) storage vessels 3026 pertain to the case of one-stage heating of $sCO_2$, shown in FIG. 17. For the case of two-stage heating of $sCO_2$, shown in FIG. 18, hot (e.g., 610° C.) gaseous $CO_2$ will leave the one or more primary heat exchanger(s) 3050 during the discharge operation. In that case, the one or more insulated medium-temperature (e.g., 360° C.) storage vessel(s) 3026 operate at a higher temperature (e.g., 610° C.) because they receive hot (e.g., 610° C.) gaseous $CO_2$ from the one or more primary heaters. For that case, during charge operations, hot (e.g., 610° C.) gaseous $CO_2$ will be sent to the one or more oxy-combustion furnace(s), where it is mixed with cool (e.g., 30° C.), high-purity (e.g., 95%-99%) $O_2$ and the fuel of choice.

Discharge Operation

Referring again to FIG. 17, the process flow description for the discharge operation of the system 3000 for one-stage heating of $sCO_2$ will now be provided. Note that this description is shown for a specific $sCO_2$ Brayton-cycle process, involving three heat-recuperation stages. There are similar $sCO_2$ Brayton-cycle processes, such as with two recuperation stages, for which the present system and method, using a process of indirect heating with gaseous $CO_2$, is equally applicable to. An important distinction is that the $sCO_2$ loop in the Brayton-cycle process operates between a very-hot (e.g., 750° C.) $sCO_2$ temperature and a medium-hot (e.g., 360° C.) $sCO_2$ temperature.

The high-grade, thermal-discharge process may typically involve using the one or more insulated, medium-temperature and very-high-temperature heat storage vessel(s) 3026 and 3030, respectively, which as described above are each filled with one or more granular rock beds. These vessels 3026 and 3030 may be operated in parallel to allow the closed-loop recirculation of very-hot (e.g., 750° C.) gaseous $CO_2$ to medium-hot (e.g., 360° C.) gaseous $CO_2$ to continuously operate during discharge operations. This makes it possible for medium-hot (e.g., 360° C.) gaseous $CO_2$ to always be returned to at least one of the insulated, medium-temperature vessels 3026 containing the one or more granular rock beds.

With the assistance of the one or more of the $CO_2$ blower(s) 3022, the thermal-discharge process begins with cold (e.g., 30° C.) gaseous $CO_2$ from the cold end of the one or more insulated, medium-temperature vessel(s) 3026, containing the one or more granular rock beds, being blown into the cold end of the one or more insulated, very-high-temperature vessel(s) 3030, containing the one or more granular rock beds. Because this is a closed-loop process, the one or more granular rock beds contained in the one or more insulated, medium-temperature vessel(s) 3026 have already been cooled during the charge cycle. Cold (e.g., 31° C.) gaseous $CO_2$ that had left the one or more insulated, very-high-temperature vessel(s) 3030 had cooled the one or more medium-temperature vessel(s) 3026 to prepare it for the discharge cycle.

Cold (e.g., 30° C.) gaseous $CO_2$ flows from the cool end to the hot end of the one or more insulated, very-high-temperature vessel(s) 3030, where it is heated by the one or more granular rock beds contained therein, to become very-hot (e.g., 750° C.) gaseous $CO_2$, which leaves the hot end of the one or more insulated, very-high-temperature vessel(s) 3030.

With the assistance of the one or more $CO_2$ blower(s) 3022, cold (e.g., 30° C.), gaseous $CO_2$ continues to be blown into the cool end of the one or more insulated, very-high-temperature vessel(s) 3030, where it is heated by the very hot granular rock beds contained therein. This process displaces very hot (e.g., 750° C.) gaseous $CO_2$ out of the hot end of the one or more insulated, very-high-temperature vessel(s) 3030 until only a relatively small percentage (e.g., 10%) of the one or more granular rock beds contained therein remains at the target, high-grade temperature (e.g., 750° C.).

Very hot (e.g., 750° C.) gaseous $CO_2$ that leaves the one or more insulated, very-high-temperature vessel(s) 3030, which contain the one or more granular rock beds, is sent to the one or more primary heat exchanger(s) 3050. This heat-transfer process causes the very-hot (e.g., 750° C.) gaseous $CO_2$ to become medium-hot (e.g., 360° C.) gaseous $CO_2$. This process also transfers heat to the medium-hot, high-pressure (e.g., 340° C. at 200 bar) $sCO_2$, which has left the one or more high-temperature recuperators 3054, causing it to become very-hot, high-pressure (e.g., 700° C. at 200 bar) $sCO_2$, which is sent to the one or more $sCO_2$ Brayton-cycle turbines 3052.

Very-hot, high-pressure (e.g., 700° C. at 200 bar) $sCO_2$ enters the one or more $sCO_2$ Brayton-cycle turbines 3052 where it is used to generate electricity for the grid 3012. This process creates medium-hot, low-pressure (e.g., 355° C. at 75 bar) $sCO_2$ that exits the one or more $sCO_2$ Brayton-cycle turbines 3052, which is then sent to the one or more high-temperature recuperators 3054.

Medium-hot, low-pressure (e.g., 355° C. at 75 bar) $sCO_2$ is sent from the one or more Brayton-cycle turbines 3052 to the one or more high-temperature recuperators 3054, which transfer heat from the medium-hot, low-pressure (e.g., 355° C. at 75 bar) $sCO_2$ to the warm, high-pressure (e.g., 160° C. at 200 bar) $sCO_2$ that has left the one or more flow mixers 3072. The warm, high-pressure (e.g., 160° C. at 200 bar) $sCO_2$ is heated to become medium-hot, high-pressure (e.g., 340° C. at 200 bar) $sCO_2$, which is sent to the one or more primary heat exchanger(s) 3050. This process also cools the medium-hot, low-pressure (e.g., 355° C. at 75 bar) $sCO_2$ to become warm, low-pressure (e.g., 160° C. at 75 bar) $sCO_2$, which is sent to the one or more medium-temperature recuperators 3056 if a three-stage recuperation process is being used (as shown in FIG. 17). If a two-stage recuperation process is used, the warm, low-pressure (e.g., 160° C. at 75 bar) $sCO_2$ is sent directly to the one or more low-temperature recuperators 3058. However, the following description will be directed to the use of the three-stage recuperation system (recuperators 3054, 3056 and 3058) shown in FIG. 17.

Warm, low-pressure (e.g., 160° C. at 75 bar) $sCO_2$ that leaves the one or more high-temperature recuperators 3054 is sent to the one or more medium-temperature recuperators 3056, which transfer heat from the warm, low-pressure (e.g., 160° C. at 75 bar) $sCO_2$ to the cool, high-pressure (e.g., 70° C. at 200 bar) $sCO_2$ that has left the one or more first high-pressure $sCO_2$ compressor(s) 3068. The cool, high-pressure (e.g., 70° C. at 200 bar) $sCO_2$ is heated to become warm, high-pressure (e.g., 160° C. at 200 bar) $sCO_2$, which is sent to the one or more flow mixers 3072. This process cools the warm, low-pressure (e.g., 160° C. at 75 bar) $sCO_2$ to become medium-warm, low-pressure (e.g., 120° C. at 75 bar) $sCO_2$, which is sent to the one or more low-temperature recuperators 3058.

Medium-warm, low-pressure (e.g., 120° C. at 75 bar) $sCO_2$ that leaves the one or more medium-temperature recuperators 3056 is sent to the one or more low-temperature recuperators 3058. The one or more low-temperature recuperators 3058 transfer heat from the medium-warm, low-pressure (e.g., 120° C. at 75 bar) $sCO_2$ to the cool, medium-pressure (e.g., 70° C. at 120 bar) $sCO_2$ that has left the one or more flow splitters 3064. The cool, medium-pressure (e.g., 70° C. at 120 bar) $sCO_2$ is heated to become medium-cool, medium-pressure (e.g., 90° C. at 120 bar) $sCO_2$, which is sent to the one or more second high-pressure $sCO_2$ compressor(s) 3070. This process also causes the low-temperature recuperator 3058 to cool the medium-warm, low-pressure (e.g., 120° C. at 75 bar) $sCO_2$ to become medium-cool, low-pressure (e.g., 80° C. at 75 bar) $sCO_2$, which is then sent to the one or more coolers 3060.

Medium-cool, low-pressure (e.g., 80° C. at 75 bar) $sCO_2$ that leaves the one or more low-temperature recuperators 3058 is sent to the one or more coolers 3060, where the medium-cool, low-pressure (e.g., 80° C. at 75 bar) $sCO_2$ is cooled to become cold, low-pressure (e.g., 30° C. at 75 bar) $CO_2$, which is then sent to the one or more low-pressure $CO_2$ compressor(s) 3062.

The cold, low-pressure (e.g., 30° C. at 75 bar) $CO_2$ that leaves the one or more coolers 3060 is sent to the one or more low-pressure $CO_2$ compressor(s) 3062, where it becomes cool, medium-pressure (e.g., 70° C. at 120 bar) $sCO_2$, which is then sent to the one or more flow splitters 3064.

The cool, medium pressure (e.g., 70° C. at 120 bar) $sCO_2$ that leaves the one or more low-pressure $sCO_2$ compressor(s) 3062 is split into two streams by the one or more flow splitters 3064. One stream is sent to the one or more low-temperature recuperators 3058 where it is heated by medium-warm, low-pressure (e.g., 120° C. at 75 bar) $sCO_2$, which causes the cool, medium-pressure (e.g., 70° C. at 120 bar) $sCO_2$ to become medium-cool, medium-pressure (e.g., 90° C. at 120 bar) $sCO_2$, which is then sent to the one or more second high-pressure $sCO_2$ compressor(s) 3070. The other stream is sent to the one or more intercoolers 3066 where it is cooled to become cold, medium-pressure (e.g., 30° C. at 120 bar) $CO_2$, before being sent to the one or more first high-pressure $CO_2$ compressor(s) 3068.

Medium-cool, medium-pressure (e.g., 90° C. at 120 bar) $sCO_2$ that leaves the one or more low-temperature recuperators 3058 is sent to the one or more second high-pressure $sCO_2$ compressor(s) 3070, where it becomes warm, high-pressure (e.g., 160° C. at 200 bar) $sCO_2$, which is then sent to one or more flow mixers.

Cold, medium-pressure (e.g., 30° C. at 120 bar) $CO_2$ that leaves the one or more intercoolers is sent to the one or more HP "A" $CO_2$ compressor(s) 3068, where it becomes cool, high-pressure (e.g., 70° C. at 200 bar) $sCO_2$, before being sent to the one or more medium-temperature recuperators 3056.

Warm, high-pressure (e.g., 160° C. at 200 bar) $sCO_2$ that leaves the one or more second high-pressure $sCO_2$ compressor(s) 3070 is sent to the one or more flow mixers 3072.

Cool, high-pressure (e.g., 70° C. at 200 bar) $sCO_2$ that leaves the one or more first high-pressure $CO_2$ compressor(s) 3068 is sent to the one or more medium-temperature recuperators 3056, where it is heated by warm, low-pressure (e.g., 160° C. at 75 bar) $sCO_2$ to become warm, high-pressure (e.g., 160° C. at 200 bar) $sCO_2$, before being sent to the one or more flow mixers. As stated earlier, this process cools the warm, low-pressure (e.g., 160° C. at 75 bar) $sCO_2$, which has left the one or more high-temperature recuperators 3054, to become medium-warm, low-pressure (e.g., 120° C. at 75 bar) $sCO_2$. This $sCO_2$ is then sent to the one or more low-temperature recuperators 3058.

The two streams of warm, high-pressure (e.g., 160° C. at 200 bar) $sCO_2$ that enter the one or more flow mixers 3072 are combined into one stream of warm, high-pressure (e.g., 160° C. at 200 bar) $sCO_2$, which is then sent to the one or more high-temperature recuperators 3054.

The combined stream of warm, high-pressure (e.g., 160° C. at 200 bar) $sCO_2$ enters the one or more high temperature recuperators 3054 where it is heated by medium-hot, low-pressure (e.g., 355° C. at 75 bar) $sCO_2$ that has left the one or more $sCO_2$ Brayton-cycle turbines 3052. This process causes the warm, high-pressure (e.g., 160° C. at 200 bar) $sCO_2$ to become medium-hot, high-pressure (e.g., 340° C. at 200 bar) $sCO_2$, which is sent to the one or more primary heat exchanger(s) 3050, thereby completing the $sCO_2$ loop for the one-stage $sCO_2$-heating process.

Referring to FIG. 18, the process flow description for the discharge operation of the system 3000 for two-stage heating of $sCO_2$ will now be provided. It should be noted that the process described above for the one-stage $sCO_2$-heating process also applies to the two-stage $sCO_2$-heating process, with the minor exception of the source of the high-pressure (e.g., 200 bar) $sCO_2$ feeding the one or more primary heat exchanger(s) 3050. The $sCO_2$ loop for the two-stage $sCO_2$-heating process includes the use of one or more secondary heat exchanger(s) 3080, which function as pre-heaters that are used to pre-heat warm high-pressure (e.g., 340° C. at 200 bar) $sCO_2$ before that warm high-pressure $sCO_2$ enters the one or more primary heat exchanger(s) 3050 to become very-hot, high-pressure (e.g., 700° C. at 200 bar) $sCO_2$. The one or more secondary heat exchanger(s) 3080 are used to pre-heat the medium-hot high-pressure (e.g., 340° C. at 200 bar) $sCO_2$ to become hot high-pressure (e.g., 560° C. at 200 bar) $sCO_2$, before hot high-pressure $sCO_2$ is sent to the one or more primary heat exchanger(s) 3050 to become very-hot high-pressure (e.g., 700° C. at 200 bar) $sCO_2$. Because the description of the recuperation subsystem presented for the one-stage $sCO_2$-heating process also applies to two-stage heating of $sCO_2$, we do not repeat that description here.

Referring again to FIG. 18, a quantity of warm high-pressure (e.g., 340° C. at 200 bar) $sCO_2$ leaving the one or more high-temperature recuperators 3054 is sent to the one or more secondary heat exchanger(s) 3080.

A quantity of hot (e.g., 580° C.) heat-transfer fluid, such as hot molten salt or hot gaseous $CO_2$, leaves the one or more high-temperature (e.g., 580° C.) storage reservoir(s) 3082, which may be comprised of one or more high-temperature molten salt tanks or one or more insulated high-temperature storage vessel(s) that contain granular rock beds. The hot (e.g., 580° C.) heat-transfer fluid may have also been sent directly from a heat source, including a solar thermal energy (STE) facility or a nuclear power plant.

A quantity of hot (e.g., 580° C.) heat-transfer fluid, such as hot molten salt or hot gaseous $CO_2$, leaving the one or more high-temperature (580° C.) storage reservoir(s) 3082, is sent to the one or more secondary heat exchanger(s) 3080, where it is used to heat a quantity of warm high-pressure (e.g., 340° C. at 200 bar) $sCO_2$ leaving the one or more high-temperature recuperators 3054. This process results in a quantity of hot high-pressure (e.g., 560° C. at 200 bar)

$sCO_2$ and a quantity of medium-hot (e.g., 360° C.) heat-transfer fluid, such as medium-hot molten salt or medium-hot gaseous $CO_2$.

A quantity of medium-hot (e.g., 360° C.) heat-transfer fluid, such as medium-hot molten salt or medium-hot gaseous $CO_2$, leaving the one or more secondary heat exchanger(s) 3080 is sent to the one or more medium-temperature (e.g., 360° C.) storage reservoir(s) 3084, which may be comprised of either one or more medium-temperature molten salt tanks or one or more insulated medium-temperature storage vessel(s) that contain granular rock beds. The medium-hot (e.g., 360° C.) heat-transfer fluid may also be sent directly back to the source of the hot (e.g., 580° C.) heat-transfer fluid, including a solar thermal energy (STE) facility or a nuclear power plant.

A quantity of hot, high-pressure (e.g., 560° C. at 200 bar) $sCO_2$ leaving the one or more secondary heat exchanger(s) 3080 is sent to the one or more primary heat exchanger(s). This process results in a quantity of very-hot hot high-pressure (e.g., 700° C. at 200 bar) $sCO_2$ and a quantity of hot (e.g., 610° C.) gaseous $CO_2$.

With the assistance of one or more $CO_2$ blower(s) 3020, a quantity of hot (e.g., 610° C.) gaseous $CO_2$ leaving the one or more primary heat exchanger(s) 3050 is sent to the one or more insulated high-temperature (e.g., 610° C.) storage vessel(s) that are filled with granular rock beds, which have been cooled during the previous charge operation, as described earlier in this disclosure.

A quantity of hot (e.g., 610° C.) gaseous $CO_2$ transfers its heat to the granular rock beds contained within the one or more insulated high-temperature (e.g., 610° C.) storage vessel(s) 3026. This process results in cool (e.g., 30° C.) gaseous $CO_2$ that leaves the cool end of the one or more insulated high-temperature (e.g., 610° C.) storage vessel(s) 3026 that are filled with granular rock beds.

With the assistance of one or more $CO_2$ blower(s) 3022, a quantity of cold (e.g., 30° C.) gaseous $CO_2$ is sent to the one or more insulated very-high-temperature (e.g., 750° C.) storage vessel(s) 3030 that contain granular rock beds. This completes the $sCO_2$ loop for the two-stage $sCO_2$-heating process.

It will be appreciated that all the temperatures and pressures mentioned throughout the present disclosure are approximate and used for the purpose of illustrating and explaining operation of the various embodiments described herein. It is, of course, possible to use different combinations of temperature and pressure to suit the needs of a specific application.

The compact size of $sCO_2$ turbines enables deployment over a wide range of scales: from micro-grid-scale (1-10 MWe) power plants to large, utility-scale, (50-500 MWe or more) power plants. When biomass is a potential fuel source, micro-grid-scale power plants can be distributed to be in closer proximity to those sources. Using two or more fuels at a power plant, including waste biomass stored on-site, plus pipeline-supplied natural gas, can increase its resiliency in withstanding a failure of fuel supply (FSS) scenario, such as might be caused by a power-grid cyber-attack. The systems and methods of the present disclosure may enable such power plants to continue to provide reliable power at critical facilities, such as data centers, hospitals, and military installations, which could prevent power failures in the local grid, regardless of the cause, from affecting those facilities.

While various embodiments have been described, those skilled in the art will recognize modifications or variations which might be made without departing from the present disclosure. The examples illustrate the various embodiments and are not intended to limit the present disclosure. Therefore, the description and claims should be interpreted liberally with only such limitation as is necessary in view of the pertinent prior art.

What is claimed is:

1. A system for storing and time-shifting at least one of excess electrical power from an electrical power grid, excess electrical power from a power plant, or heat from a heat generating source, in the form of pressure and heat, for future use in assisting with a production of electricity, the system comprising:
    a reservoir system containing a quantity of a thermal storage medium, the thermal storage medium including at least one of sand, rocks, manufactured granular material including at least one of ceramic pebbles, or a mixture of manufactured granular material, sand, and rocks, and being configured to be heated using a combustible fuel source;
    an oxy-combustion furnace for heating the thermal storage medium during a charge operation using $O_2$, and at least one of natural gas, coal, coke, petroleum, petroleum coke, tires, solid waste, biomass, or electricity supplied from the electrical power grid or the power plant;
    a discharge subsystem including:
        a heat exchanger having a first input configured to receive heated $CO_2$ from the reservoir system during a discharge operation of the system and to generate a first quantity of supercritical $CO_2$ ($sCO_2$) at a first temperature and a first pressure, at a first output thereof;
        a power generating component for receiving the first quantity of $sCO_2$ from the first output of the heat exchanger and generating electricity therefrom at a first output thereof for transmission to the power grid, the power generating component also configured to produce a second quantity of $sCO_2$ having a second temperature and a second pressure at a second output thereof, the second temperature and the second pressure each being lower than the first temperature and the first pressure; and
        a recuperator subsystem for circulating the second quantity of $sCO_2$ to reheat and re-pressurize the second quantity of $sCO_2$ to create a third quantity of $sCO_2$, for reapplication to the heat exchanger, to be further reheated by the heat exchanger to create a quantity of $sCO_2$ which is output to the power generating component to further assist in powering the power generating component.

2. The system of claim 1, wherein the third quantity of $sCO_2$ has a third temperature and a third pressure; and
    the heat exchanger having a second input for receiving the third quantity of $sCO_2$ from the recuperator subsystem and using the third quantity of $sCO_2$ to help produce the re-heated third quantity of $sCO_2$ with a temperature and pressure similar to that of the first quantity of $sCO_2$.

3. The system of claim 2, wherein the recuperator subsystem comprises:
    a plurality of recuperators for sequentially extracting heat from the second quantity of $sCO_2$ in a plurality of stages.

4. The system of claim 3, wherein the plurality of recuperators comprise:
    a first recuperator configured to receive the second quantity of $sCO_2$ and to output the second quantity of sCO2 as the third quantity of sCO2 with a reduced temperature and having a reduced pressure;

a second recuperator configured to receive an additional quantity of sCO2 and to reduce at least one of a pressure or a temperature of the additional quantity of sCO2 to create a first output therefrom for further use by the system.

5. The system of claim 4, further comprising a third recuperator configured to receive the first output of the sCO$_2$ from the second recuperator and to generate a quantity of cool sCO$_2$.

6. The system of claim 5, wherein the recuperator subsystem includes a cooler for receiving and cooling the quantity of cool sCO$_2$ from the third recuperator to produce a quantity of cold CO$_2$.

7. The system of claim 6, further comprising a low-pressure compressor for receiving the quantity of cold CO$_2$ and generating a fifth output of sCO$_2$ with a fourth pressure between the second and third pressures.

8. The system of claim 7, wherein the recuperator subsystem includes a flow splitter for receiving and splitting the fifth output of sCO$_2$ from the low-pressure compressor into first and second subquantities of sCO$_2$ and providing the first and second subquantities of sCO$_2$ to different ones of the second and third recuperators.

9. The system of claim 8, further comprising a first high-pressure compressor for receiving one of the first and second subquantities of sCO$_2$ from the flow splitter, further pressurizing the received one of the first and second subquantities of sCO$_2$ and providing a sixth quantity of sCO$_2$ back to the second recuperator.

10. The system of claim 9, further comprising an intercooler interposed between the flow splitter and the first high-pressure compressor for cooling the one of the first and second subquantities of sCO$_2$ from the flow splitter before passing the one of the first and second subquantities of sCO$_2$ to the first high-pressure compressor.

11. The system of claim 10, further comprising a second high-pressure compressor for receiving a quantity of sCO$_2$ from the third recuperator and generating a pressurized quantity of sCO$_2$.

12. The system of claim 11, further comprising a flow mixer for receiving the pressurized quantity of sCO$_2$ from the second high-pressure compressor and providing a quantity of highly pressurized sCO$_2$ to the first recuperator.

13. The system of claim 1, further comprising:
a dryer subsystem for receiving a mixture of gaseous CO$_2$ and water vapor from the reservoir system and generating therefrom CO$_2$ during the charging operation;
a compressor for receiving the CO$_2$ and pressurizing the CO$_2$ for transmission to a CO$_2$ storage reservoir.

14. The system of claim 1, wherein the recuperator subsystem comprises a closed loop subsystem.

15. A system for storing and time-shifting at least one of excess electrical power from an electrical power grid, excess electrical power from a power plant itself, or heat from a heat generating source, in a form of pressure and heat, for future use in assisting with a production of electricity, the system comprising:
a reservoir system containing a quantity of a thermal storage medium, the thermal storage medium including at least one of sand, rocks, manufactured granular material including at least one of ceramic pebbles, or a mixture of manufactured granular material, sand, and rocks, and being configured to be heated;
an oxy-combustion furnace for heating the thermal storage medium during a charge operation using O$_2$ and at least one of natural gas, coal, coke, petroleum, petroleum coke, tires, solid waste, or biomass, or electricity supplied from the power grid or the power plant;
a dryer subsystem for receiving a mixture of gaseous CO$_2$ and water vapor from the reservoir system and generating therefrom CO$_2$ during a charging operation;
a compressor for receiving the CO$_2$ and pressurizing the CO$_2$ for transmission to a CO$_2$ storage reservoir;
a discharge subsystem including:
a heat exchanger having a first input configured to receive heated CO$_2$ from the oxy-combustion furnace during a discharge operation of the system and to generate a first quantity of supercritical CO$_2$ (sCO$_2$) at a first temperature and a first pressure, at a first output thereof;
a Brayton-cycle turbine for receiving the first quantity of sCO$_2$ from the first output of the heat exchanger and generating electricity therefrom at a first output thereof for transmission to the power grid, the Brayton-cycle turbine also configured to produce a second quantity of sCO$_2$ having a second temperature and a second pressure at a second output thereof, the second temperature and the second pressure each being lower than the first temperature and the first pressure; and
a recuperator subsystem for circulating the second quantity of sCO$_2$ in a closed loop to reheat and re-pressurize the second quantity of sCO$_2$ to create a third quantity of sCO$_2$ and feeding the third quantity of sCO$_2$ back into the heat exchanger, wherein the heat exchanger further heats the third quantity of sCO$_2$ to produce a re-heated third quantity of sCO$_2$ which is output to the Brayton-cycle turbine to assist in powering the Brayton-cycle turbine.

16. The system of claim 15, wherein the recuperator subsystem forms a multistage recuperator subsystem.

17. The system of claim 16, wherein the recuperator subsystem includes:
a first recuperator for receiving the second quantity of sCO$_2$ from the Brayton-cycle turbine and extracting a first degree of heat therefrom to produce a fifth quantity of sCO$_2$ having a temperature less than the second temperature;
a second recuperator serially coupled to the first recuperator for receiving the fifth quantity of sCO$_2$ and extracting heat therefrom to produce a sixth quantity of sCO$_2$ having a temperature less than a temperature of the fifth quantity of sCO$_2$;
a third recuperator serially coupled to the second recuperator for receiving the sixth quantity of sCO$_2$ and extracting heat therefrom to produce a seventh quantity of sCO$_2$ which is lower in temperature than the sixth quantity of sCO$_2$; and
where heat extracted from the second and third recuperators is used by the first recuperator to help produce the third quantity of sCO$_2$.

18. A method for storing and time-shifting at least one of excess electrical power from an electrical power grid, excess electrical power from a power plant, or heat from a heat generating source, in a form of pressure and heat, for future use in assisting with a production of electricity, the method comprising:
using a reservoir to contain a quantity of a thermal storage medium, the thermal storage medium including at least one of sand, rocks, manufactured granular material including ceramic pebbles, or a mixture of manufactured granular material, sand, and rocks;

feeding a furnace, operably associated with the reservoir, with a combustible fuel source to heat the thermal storage medium during a charge phase of operation;

performing a discharge operation including:
    using a heat exchanger having a first input configured to receive heated $CO_2$ from the reservoir during the discharge operation to generate a first quantity of supercritical $CO_2$ ($sCO_2$) at a first temperature and a first pressure, at a first output thereof;
    using a Brayton-cycle turbine to receive the first quantity of $sCO_2$ from the first output of the heat exchanger and to generate electricity therefrom at a first output thereof for transmission to the power grid;
    using the Brayton-cycle turbine to also produce a second quantity of $sCO_2$ having a second temperature and a second pressure at a second output thereof, the second temperature and the second pressure each being lower than the first temperature and the first pressure;
    using a recuperator subsystem to circulate the second quantity of $sCO_2$ to reheat and re-pressurize the second quantity of $sCO_2$ to create a third quantity of $sCO_2$;
    feeding the third quantity of $sCO_2$ to the heat exchanger to be further reheated by the heat exchanger to create a re-heated third quantity of $sCO_2$ similar in temperature and pressure to the first quantity of $sCO_2$; and
    feeding the re-heated third quantity of $sCO_2$ to the Brayton-cycle turbine to further assist in powering the Brayton-cycle turbine.

19. The method of claim 18, wherein using the recuperator subsystem comprises using a plurality of serially coupled recuperators to successively remove heat from the second quantity of $sCO_2$.

20. The method of claim 19, further comprising configuring the recuperator subsystem to operate in a closed loop configuration.

21. A system for storing and time-shifting at least one of excess electrical power from an electrical power grid, excess electrical power from a power plant, or heat from a heat generating source, in the form of pressure and heat, for future use in assisting with a production of electricity, the system comprising:
    a first reservoir system containing a quantity of a first thermal storage medium, the first thermal storage medium including at least one of sand, rocks, manufactured granular material including at least one of ceramic pebbles, or a mixture of manufactured granular material, sand, and rocks, and being configured to be heated during a charge operation;
    a second reservoir system containing a quantity of a second thermal storage medium, the second thermal storage medium including at least one of molten salt, sand, rocks, manufactured granular material including ceramic pebbles or a mixture of manufactured granular material, sand, and rocks, for storing heat;
    an oxy-combustion furnace for heating the first thermal storage medium during the charge operation using oxygen ($O_2$), and at least one of natural gas, coal, coke, petroleum, petroleum coke, tires, solid waste, biomass, or the electricity supplied from the power grid or the power plant;
    a discharge subsystem including:
        a primary heat exchanger having a first input, and first and second outputs, the primary heat exchanger configured to receive heated CO2 from the first reservoir system during a discharge operation of the system and to generate a second quantity of supercritical $CO_2$ ($sCO_2$) at a second temperature and a second pressure, at the second output thereof;
        a secondary heat exchanger, located upstream of the primary heat exchanger, and which operates in series with the primary heat exchanger, having a second input configured to receive a heat-transfer fluid from the second reservoir system during the discharge operation of the system to generate a first quantity of supercritical $CO_2$ ($sCO_2$) at a first temperature, the first temperature being lower than the second temperature, and at a first pressure, the first pressure being substantially the same as the second pressure, at a first output thereof;
        a Brayton-cycle turbine for receiving the second quantity of $sCO_2$ from the second output of the primary heat exchanger and generating electricity therefrom at a first output thereof for transmission to the power grid, the Brayton-cycle turbine also configured to produce a third quantity of $sCO_2$ having a third temperature and a third pressure at a second output thereof, the third temperature and the third pressure each being lower than the second temperature and the second pressure; and
        a recuperator subsystem for circulating the third quantity of $sCO_2$ to reheat and re-pressurize the third quantity of $sCO_2$ to create a re-heated and re-pressurized third quantity of $sCO_2$, for reapplication to the secondary heat exchanger, to be further reheated by the secondary heat exchanger for reapplication to the primary heat exchanger, and to be subsequently further reheated by the primary heat exchanger and then output therefrom to the Brayton-cycle turbine to further assist in powering the Brayton-cycle turbine.

* * * * *